United States Patent
Seo et al.

(10) Patent No.: US 8,326,291 B2
(45) Date of Patent: Dec. 4, 2012

(54) FAST CHANNEL SWITCHING METHOD AND APPARATUS FOR DIGITAL BROADCAST RECEIVER

(75) Inventors: Jeong Wook Seo, Daegu Metropolitan (KR); Wei Jin Park, Daegu Metropolitan (KR); Jong Kerl Lee, Gumi-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1015 days.

(21) Appl. No.: 11/811,430

(22) Filed: Jun. 8, 2007

(65) Prior Publication Data

US 2007/0287451 A1     Dec. 13, 2007

(30) Foreign Application Priority Data

Jun. 13, 2006   (KR) .................. 10-2006-0052983
Jun. 13, 2006   (KR) .................. 10-2006-0052984

(51) Int. Cl.
*H04W 4/00*   (2009.01)
(52) U.S. Cl. .................. 455/434; 348/385.1; 348/438.1; 348/726
(58) Field of Classification Search .................. 348/725, 348/705, 385, 385.1, 699, E05.066, 731, 348/732, E5.003, E5.097, E5.108, E7.061; 455/550.1, 434; 375/240.15; 370/441, 442; 725/131, 151, 38, 61
See application file for complete search history.

(56) References Cited

U.S. PATENT DOCUMENTS

| | | | | |
|---|---|---|---|---|
| 5,345,437 A * | 9/1994 | Ogawa | ..................... | 370/228 |
| 5,828,423 A * | 10/1998 | Serizawa et al. | .............. | 348/699 |
| 6,175,595 B1 | 1/2001 | Keesman | ................. | 375/240.25 |
| 6,356,555 B1 * | 3/2002 | Rakib et al. | .................... | 370/441 |
| 6,930,808 B2 * | 8/2005 | Otani | ............................ | 358/515 |
| 2003/0149675 A1 * | 8/2003 | Ansari et al. | ..................... | 706/2 |
| 2004/0120693 A1 | 6/2004 | Kawai | | |
| 2005/0073610 A1 * | 4/2005 | Akiyama et al. | .............. | 348/705 |
| 2006/0085828 A1 * | 4/2006 | Dureau et al. | ................ | 725/100 |
| 2006/0087585 A1 * | 4/2006 | Seo et al. | .................... | 348/385.1 |
| 2007/0093263 A1 | 4/2007 | Song et al. | | |

FOREIGN PATENT DOCUMENTS

| | | |
|---|---|---|
| EP | 1 107 601 A2 | 6/2001 |
| EP | 1463316 A2 | 9/2004 |
| JP | 2002-232794 | 8/2002 |
| KR | 10-2003-0027514 A | 4/2003 |
| KR | 2004-13905 | 2/2004 |
| KR | 10-2004-0038280 A | 5/2004 |
| KR | 2005-120968 | 12/2005 |
| KR | 2006-22942 | 3/2006 |

* cited by examiner

*Primary Examiner* — Lana N Le
*Assistant Examiner* — Golam Sorowar
(74) *Attorney, Agent, or Firm* — Cha & Reiter, LLC

(57) ABSTRACT

A fast channel switching method and apparatus for a digital broadcast receiver having a single tuner are disclosed. The fast channel switching method includes setting an ongoing service channel and at least one standby service channel, buffering broadcast data received through the ongoing and standby service channels, outputting the buffered broadcast data of the ongoing service channel, determining whether the ongoing service channel is switched to one of the standby service channels, outputting, if the ongoing service channel is switched to one of the standby service channels, the buffered broadcast data of the switched standby service channel and resetting the ongoing and standby service channels.

27 Claims, 26 Drawing Sheets

FAST CHANNEL SWITCHING METHOD AND APPARATUS FOR DIGITAL BROADCAST RECEIVER

CLAIM OF PRIORITY

This application claims the benefit of the earlier filing date, under 35 U.S.C. §119(a), to Korean Patent Applications filed in the Korean Intellectual Property Office on Jun. 13, 2006, and assigned Serial No. 2006-52983, and on Jun. 13, 2006, and assigned Serial No. 2006-52984, the entire disclosure of which are hereby incorporated by reference.

BACKGROUND OF THE INVENTION

1. Field of the Invention

The present invention relates to a digital broadcast receiver and, in particular, to a fast channel switching method and apparatus for a digital broadcast receiver having a single tuner.

2. Description of the Related Art

A digital broadcast receiver is an apparatus that restores original digital data from a broadcast signal transmitted by a broadcast station. The digital data is coded and modulated so as to be broadcast in the form of a broadcast signal by the broadcast station. The digital broadcast receiver demodulates and decodes the broadcast signal for recovering the original digital data. The digital broadcast receiver is provided at least with a tuner, a demodulator, and a decoder.

Digital broadcast systems are classified into a digital multimedia broadcast (DMB) system or a digital video broadcasting (DVB) system. These digital broadcast systems provide a plurality of service channels in a frequency band and each service channel is structured with multiplexed sub-channels of video, audio, and program information data.

Current mobile devices are typically powered by multimedia processors that support various multimedia functions including digital broadcast reception. With the integration of the multimedia functions, the mobile devices are becoming much complex in physical configuration and execution procedures. Here, the mobile devices include mobile phones, Smartphone, laptop computers, Personal Digital Assistants (PDAs), etc.

A digital broadcast channel is divided into a number of service channels for delivery of audio, video, data, and multimedia, such that a broadcast receiver scan the broadcast channel for retrieving the service channels. Since the digital broadcast channel consists of a plurality of service channels, channel navigation for searching a target channel may be a cumbersome labor.

In digital broadcasting, particularly, the digital data is highly compressed and thus it takes a considerable amount of time for a screen to become stable after switching to a service channel. This is unlike switching channels in an analog broadcasting system. This is because of a processing delay caused by demodulation and decoding of the broadcast signals of the selected service channel. Accordingly, the broadcast data corresponding to the delay time are lost or an out-of time image is displayed on the screen.

In the case of DVB, data bursts come up every 1 to 4 seconds. Accordingly, if a channel switching event occurs while receiving a service channel, the screen shows nothing before the data burst assigned to the target channel comes up, resulting in inconvenient to subscribers.

SUMMARY OF THE INVENTION

The present invention has been made in an effort to solve the above problems, by providing a fast channel switching method and apparatus for a digital broadcast receiver that are capable of reducing channel switching delay.

It is another aspect, a fast channel switching method and apparatus for a digital broadcast receiver that are capable of reducing channel switching delay by buffering broadcast data on neighbor service channels of an ongoing service channel and displaying, when a channel switching event occurs, the buffered broadcast data.

It is another aspect, there is provided a fast channel switching method and apparatus for a digital broadcast receiver that are capable of reducing channel switching delay by buffering broadcast data on the ongoing service channel and at least one favorite service channels and displaying, when the favorite channel is selected, the buffered broadcast data.

It is another aspect, there is provided a fast channel switching method and apparatus for a digital broadcast-enabled mobile phone that are capable of reducing channel switching delay by buffering broadcast data on at least one the neighbor service channels of an ongoing service channel and displaying, when the neighbor service channel is selected, the buffered broadcast data on the selected neighbor service channel.

It is another aspect, there is provided a fast channel switching method and apparatus for a digital broadcast enable mobile phone that are capable of reducing channel switching delay by buffering broadcast data on the ongoing service channel and at least one favorite service channels and displaying, when the favorite channel is selected, the buffered broadcast data.

In accordance with another aspect of the present invention, the above is accomplished by a fast channel switching apparatus for a digital broadcast receiver. The fast channel switching apparatus includes a tuner for receiving service channels of a frequency channel; a broadcast demodulator for demodulating the service channels and outputting an ongoing service channel and at least one standby service channel among the service channels, a storage for storing broadcast data of the ongoing and standby service channels output from the broadcast demodulator into corresponding buffers and reading out the broadcast data buffered in a buffer of the ongoing service channel, a decoder for decoding the broadcast data read out of the storage and output video and audio data, a display for displaying the video data output from the decoder and a speaker for outputting the audio data output from the decoder, wherein the storage reads out, when the ongoing service channel is switched to one of the standby service channels, the broadcast data buffered for the standby service channel.

In one aspect, the fast channel switching apparatus further includes a channel switching controller for resetting, when the ongoing service channel is switched to another service channel, the broadcast demodulator and storage with new ongoing and standby service channels.

In one aspect, the broadcast demodulator includes a demodulator for demodulating the service channels and an identifier filter set with identifiers of the ongoing and standby service channels for filtering the demodulated broadcast data of the ongoing and candidate service channels.

In one aspect, the identifier is a program identifier (PID).

In one aspect, the storage includes a plurality of buffers for buffering the broadcast data of the ongoing and standby service channels, a first selector for writing the broadcast data of the ongoing and standby service channels into corresponding buffers and a second selector for reading out the broadcast data of the ongoing service channel buffered in the corresponding buffer.

In one aspect, the standby service channels include a lower neighbor service channel and an upper neighbor service channel of the ongoing service channel in channel number.

In one aspect, the channel switching controller controls, when the ongoing service channel is switched to one of the standby service channels, the storage to read out the buffered broadcast data of the standby service channel as a new ongoing service channel, controls the broadcast demodulator and the storage, if the standby service channel is the upper neighbor service channel, to delete the PID of the lower neighbor service channel and add a PID of the upper neighbor service channel of the new ongoing service channel and controls the broadcast demodulator and the storage, if the standby service channel is the lower neighbor service channel, to delete the PID of the upper neighbor service channel of the ongoing service channel and add the PID of the lower neighbor service channel of the new ongoing service channel.

In one aspect, the standby service channels include favorite service channels selected in consideration of a user preference.

In one aspect, the channel switching controller controls, when the ongoing service channel is switched to one of the favorite service channels, the storage to read out the buffered broadcast data of the favorite service channel as a new ongoing service channel and controls, if the ongoing service channel is one of the favorite service channel, the broadcast demodulator and the storage to maintain the ongoing service channel as a favorite service channel.

In one aspect, the standby service channels include neighbor service channels of the ongoing service channel and favorite service channels selected in consideration of a user preference.

In accordance with another aspect of the present invention, the above a fast channel switching apparatus for a digital broadcast receiver is disclosed. The fast channel switching apparatus includes a tuner for receiving service channels of a frequency channel, a broadcaster demodulator for demodulating the service channels, a demultiplexer set with identifiers of an ongoing service channel and at least one standby service channel for demultiplexing broadcast data of the ongoing and standby service channels service channels, a storage for buffering the broadcast data output from the demultiplexer into buffers corresponding to the service channels and reading out the broadcast data buffered within the buffer of the ongoing service channel, a broadcast decoder for decoding the broadcast data read out of the storage, a display for displaying video data output from the decoder and a speaker for outputting audio data output from the decoder, wherein the storage reads out, when the ongoing service channel is switched to one of the standby service channels, the broadcast data buffered for the standby service channel.

In one aspect, the fast channel switching apparatus further includes a channel switching controller for resetting, when the ongoing service channel is switched to another service channel, the demultiplexer and storage with new ongoing and standby service channels.

In one aspect, the demultiplexer checks an identifier contained a header of a packet carrying the broadcast data of the service channel, and performs, if the identifier is one of the identifier set in the demultiplexer, demultiplexing on the broadcast data so as to output video and audio data.

In one aspect, the identifier is a program identifier (PID).

In one aspect, the storage includes a plurality of buffers for buffering the broadcast data of the ongoing and standby service channels, a first selector for writing the broadcast data of the ongoing and standby service channels into corresponding buffers and a second selector for reading out the broadcast data of the ongoing service channel buffered in the corresponding buffer.

In one aspect, the standby service channels include a lower neighbor service channel and an upper neighbor service channel of the ongoing service channel in channel number.

In one aspect, the channel switching controller controls, when the ongoing service channel is switched to one of the standby service channels, the storage to read out the buffered broadcast data of the standby service channel as a new ongoing service channel, controls the demultiplexer and the storage, if the standby service channel is the upper neighbor service channel, to delete the PID of the lower neighbor service channel and add a PID of the upper neighbor service channel of the new ongoing service channel, and controls the demultiplexer and the storage, if the standby service channel is the lower neighbor service channel, to delete the PID of the upper neighbor service channel of the ongoing service channel and add the PID of the lower neighbor service channel of the new ongoing service channel.

In one aspect, the standby service channels include favorite service channels selected in consideration of a user preference.

In one aspect, the channel switching controller controls, when the ongoing service channel is switched to one of the favorite service channels, the storage to read out the buffered broadcast data of the favorite service channel as a new ongoing service channel; and controls, if the ongoing service channel is one of the favorite service channel, the demultiplexer and the storage to maintain the ongoing service channel as a favorite service channel.

In one aspect, the standby service channels include neighbor service channels of the ongoing service channel and favorite service channels selected in consideration of a user preference.

In accordance with another aspect of the present invention, a fast channel switching method for a digital broadcast receiver is disclosed. The fast channel switching method includes setting an ongoing service channel and at least one standby service channel, buffering broadcast data received through the ongoing and standby service channels, outputting the buffered broadcast data of the ongoing service channel, determining whether the ongoing service channel is switched to one of the standby service channels, outputting, if the ongoing service channel is switched to one of the standby service channels, the buffered broadcast data of the switched standby service channel and resetting the ongoing and standby service channels.

In one aspect, the standby service channels include an upper neighbor service channel and a lower neighbor service channel of the ongoing service channel in channel number.

In one aspect, resetting the ongoing and standby service channels includes setting the switched standby service channel as a new ongoing service channel, deleting, if the switched service channel is the upper neighbor service channel of the previous ongoing service channel, the lower neighbor service channel of the previous ongoing service channel from the standby service channels, deleting, if the switched service channel is the lower neighbor service channel of the previous ongoing service channel, the upper neighbor service channel of the previous ongoing service channel from the standby service channels.

In one aspect, buffering broadcast data received through the ongoing and standby service channels includes checking an identifier attached to the broadcast data, determining whether the identifier is of the ongoing service channel or one of standby service channels and starting buffering, if the identifier is of the ongoing service channel or one of the standby service channels, the broadcast data.

In one aspect, the standby service channels include favorite service channels selected in accordance with a user preference.

In one aspect, resetting the ongoing and standby service channels includes setting, if the ongoing service channel is switched to a non-standby service channel, the non-standby service channel as a new ongoing service channel, stopping, if the previous ongoing service channel is not one of the favorite service channels, buffering the broadcast data of the previous ongoing service channel and maintaining, if the previous ongoing service channel is one of the favorite service channels, buffering the broadcast data of the previous ongoing service channel as one of the standby service channels.

In one aspect, buffering broadcast data received through the ongoing and standby service channels includes checking an identifier attached to the broadcast data, determining whether the identifier is of the ongoing service channel or one of standby service channels and starting buffering, if the identifier is of the ongoing service channel or one of the standby service channels, the broadcast data.

In one aspect, the standby service channels include neighbor service channels of the ongoing service channel and favorite service channels selected in consideration of a user preference.

In one aspect, resetting the ongoing and standby service channels includes setting the switched standby service channel as a new ongoing service channel, determining, if the switched service channel is a neighbor service channel of the previous ongoing service channel, whether the switched service channel is the lower or upper neighbor service channel, deleting, if the switched service channel is the upper neighbor service channel of the previous ongoing service channel, the lower neighbor service channel of the previous ongoing service channel from the standby service channels, deleting, if the switched service channel is the lower neighbor service channel of the previous ongoing service channel, the upper neighbor service channel of the previous ongoing service channel from the standby service channels, determining, if the switched service channel is not a neighbor service channel of the previous ongoing service channel, whether the switched service channel is one of the favorite service channels, determining, if the switched service channel is one of the favorite service channels, whether the previous ongoing service channel is one of the favorite service channels, stop, if the previous ongoing service channel is not one of the favorite service channels, buffering the broadcast data of the previous ongoing service channel, and maintain, if the previous ongoing service channel is one of the favorite service channels, buffering the broadcast data of the previous ongoing channel as one of the standby service channels.

In one aspect, resetting the ongoing and standby service channels includes setting the switched standby service channel as a new ongoing service channel, determining, if the switched service channel is a neighbor service channel of the previous ongoing service channel, whether the switched service channel is the lower or upper neighbor service channel; determining, if the switched service channel is the upper neighbor service channel, whether the lower neighbor service channel of the previous ongoing service channel is one of the favorite service channels, stopping, if the lower neighbor service channel of the previous ongoing service channel is not one of the favorite service channels, the buffering of the broadcast data of the lower neighbor service channel; determining whether the upper neighbor service channel of the witched service channel is one of the favorite service channel, setting, if the upper neighbor service channel of the switched service channel is not one of the favorite service channel, the upper neighbor service channel as a standby service channel; determining, if the lower neighbor service channel is the lower neighbor service channel, whether the upper neighbor service channel of the previous ongoing service channel is one of the favorite service channels; stopping, if the upper neighbor service channel of the previous ongoing service channel is not one of the favorite service channels, the buffering of the broadcast data of the upper neighbor service channel; determining whether the lower neighbor service channel of the switched service channel is one of the favorite service channel; setting, if the lower neighbor service channel of the switched service channel is not one of the favorite service channel, the lower neighbor service channel as a standby service channel; determining, if the switched service channel is not a neighbor service channel of the previous ongoing service channel, whether the previous ongoing service channel is one of the favorite service channels; stopping, if the previous ongoing service channel is not one of the favorite service channels, the buffering of the broadcast data of the previous ongoing service channel; and maintaining, if the previous ongoing service channel is one of the favorite service channels, the buffering of the broadcast data of the previous ongoing service channels as the favorite service channel.

In accordance with another aspect of the present invention, a mobile phone is disclosed that includes a radio frequency unit for radio communication of the mobile phone; a digital broadcast receiver comprising a tuner for receiving service channels of a frequency channel, a broadcast demodulator for demodulating the service channels and outputting an ongoing service channel and at least one standby service channels among the service channels, a storage for storing broadcast data of the ongoing and standby service channels output from the broadcast demodulator into corresponding buffers and reading out the broadcast data buffered in a buffer of the ongoing service channel, a decoder for decoding the broadcast data read out of the storage and output video and audio data, a controller for controlling the broadcast demodulator to demodulate the broadcast data, the storage to buffer broadcast data of the ongoing and standby service channels and output the buffered broadcast data of the ongoing service channel, and the radio frequency unit to process calls in a broadcast mode; a display for displaying the video data output from the decoder; and a speaker for outputting the audio data output from the decoder.

In one aspect, the controller controls the storage to read out, when the ongoing service channel is switched to one of the standby service channels, the buffered broadcast data of the switched standby service channel, and resets the broadcast demodulator and the storage with identifier of new ongoing and standby service channels.

In one aspect, controller controls the display to display, when an incoming call is received in the broadcast mode, an incoming call alert message with caller information on the display.

In one aspect, the controller controls the radio frequency unit to transmit, when an outgoing call event occurs, the outgoing call through an antenna.

In accordance with another aspect of the present invention, a mobile phone is disclosed that includes a radio frequency unit for radio communication of the mobile phone; a digital broadcast receiver comprising a tuner for receiving service channels of a frequency channel, a broadcaster demodulator for demodulating the service channels, a demultiplexer set with identifiers of an ongoing service channel and at least one standby service channel for demultiplexing broadcast data of the ongoing and standby service channels service channels, a storage for buffering the broadcast data output from the demultiplexer into buffers corresponding to the service channels and reading out the broadcast data buffered within the buffer of the ongoing service channel, a broadcast decoder for decoding the broadcast data read out of the storage, a controller for controlling the demultiplexer to demultiplex the broadcast data, the storage to buffer broadcast data of the ongoing and standby service channels and output the buffered broadcast data of the ongoing service channel, and the radio frequency unit to process calls in a broadcast mode, a display for displaying the video data output from the decoder and a speaker for outputting the audio data output from the decoder.

In one aspect, the controller controls the storage to read out, when the ongoing service channel is switched to one of the standby service channels, the buffered broadcast data of the switched standby service channel, and resets the broadcast demodulator and the storage with identifier of new ongoing and standby service channels.

In one aspect, the controller controls the display to display, when an incoming call is received in the broadcast mode, an incoming call alert message with caller information on the display.

In one aspect, the controller controls the radio frequency unit to transmit, when an outgoing call event occurs, the outgoing call through an antenna.

In accordance with another aspect of the present invention, a fast channel switching apparatus of a broadcast receiver is disclosed. The fast channel switching apparatus includes a tuner for receiving service channels of a frequency channel, a broadcast demodulator for demodulating the service channels and outputting an ongoing service channel and at least one standby service channel identified by preset identifiers, a storage unit for storing broadcast data of the ongoing and standby service channels output from the broadcast demodulator in corresponding buffers and reading out the broadcast data if the buffer set with the identifier of the ongoing service channel, a broadcast decoder for decoding the broadcast data read out from the storage unit; a display for displaying the video data output from the decoder and a speaker for outputting the audio data output from the decoder, wherein the fast channel apparatus sets, if a channel switching command indicating a service channel is detected, the service channel as a new ongoing service channel and playing the broadcast data buffered in the buffer assigned the identifier of the new ongoing service channel.

In accordance with another aspect of the present invention, a fast channel switching apparatus of a broadcast receiver is disclosed. The fast channel switching apparatus includes a tuner for receiving service channels of a frequency channel, a broadcast demodulator for demodulating the service channels; a demultiplexer set with identifiers of an ongoing service channel and at least one standby service channel for demultiplexing broadcast data received with the identifiers, a storage unit for buffering the broadcast data output from the demultiplexer in buffers set with corresponding identifiers and reading out the broadcast data buffered in the buffer assigned the identifier of the ongoing service channel, a broadcast decoder for decoding the broadcast data read out from the storage unit, a display for displaying video data output from the decoder, and a speaker for outputting audio data output from the decoder, wherein the storage unit reads out, when a channel switching command is detected, the broadcast data buffered in the buffer assigned the identifier of switched service channel.

In accordance with another aspect of the present invention, a fast channel switching method for a broadcast receiver is disclosed. The fast channel switching method includes checking service channels received through a frequency channel on the basis of identifiers attached to the service channels, buffering ongoing and standby service channels, of which identifiers are set as ongoing and standby service channel identifiers, in corresponding buffers, respectively, playing the ongoing service channel, switching, if a channel switching command is detected, the ongoing service channel to the a new ongoing service channel indicated by the channel switching command, playing the new ongoing service channel buffered in the corresponding buffer and updating the ongoing and standby service channel identifiers.

In accordance with another aspect of the present invention, a mobile phone is disclosed that includes a radio frequency unit for processing incoming and outgoing radio signals, a digital broadcast receiver comprising a tuner for receiving service channels of a frequency channel given for a broadcast system, a broadcast demodulator set with service channel identifiers for demodulating the service channels received with the service channel identifiers, a storage unit having a plurality of buffers for buffering the service channels output from the broadcast demodulator with reference to the service channel identifiers, and a broadcast decoder for decoding the service channel selectively read out from the storage unit. a controller for controlling to play the ongoing service channel, buffer the ongoing and standby service channels in the corresponding buffers, set the broadcast demodulator and storage unit with the service channel identifiers, switch, if a channel switching command being detected, the ongoing service channel to a new ongoing service channel indicated by the channel switching command, play the new ongoing service channel, update the ongoing and standby service channel identifiers, reset the broadcast demodulator and storage unit with the updated ongoing and standby service channel identifier, and process incoming and outgoing calls while playing the ongoing service channel, a display for displaying video data decoded from the ongoing service channel; and a speaker for outputting audio data decoded from the ongoing service channel.

In accordance with another aspect of the present invention, a mobile phone is disclosed that includes a radio frequency unit for processing incoming and outgoing radio signals, a digital broadcast receiver comprising a tuner for receiving service channels of a frequency channel given for a broadcast system, a broadcast demodulator for demodulating the service channels output from the tuner, a demultiplexer set with service channel identifiers for demultiplexing the service channels with reference to the service channel identifiers, a storage unit having a plurality of buffers for buffering the service channels output from the demultiplexer on the basis of the service channel identifiers and reading out broadcast data buffered in the buffer assigned the identifier of the ongoing service channel, and a broadcast decoder for decoding the broadcast data output from the storage unit, a controller for controlling to play the ongoing service channel, buffer the ongoing and standby service channel in the corresponding buffers, set the broadcast, update next service channel identifier at every data bursts for the service channels, switch, if a channel switching command being detected, the ongoing service channel to a new ongoing service channel indicated by the channel switching command, play the broadcast data stored in the buffer assigned the service channel identifier of the new ongoing service channel, and process incoming and outgoing calls while playing the ongoing service channel; a display for displaying video data decoded from the ongoing service channel; and a speaker for outputting audio data decoded from the ongoing service channel.

BRIEF DESCRIPTION OF THE DRAWINGS

The above and other, features and advantages of the present invention will be more apparent from the following detailed description in conjunction with the accompanying drawings, in which.

DETAILED DESCRIPTION OF THE INVENTION

Figure 1:
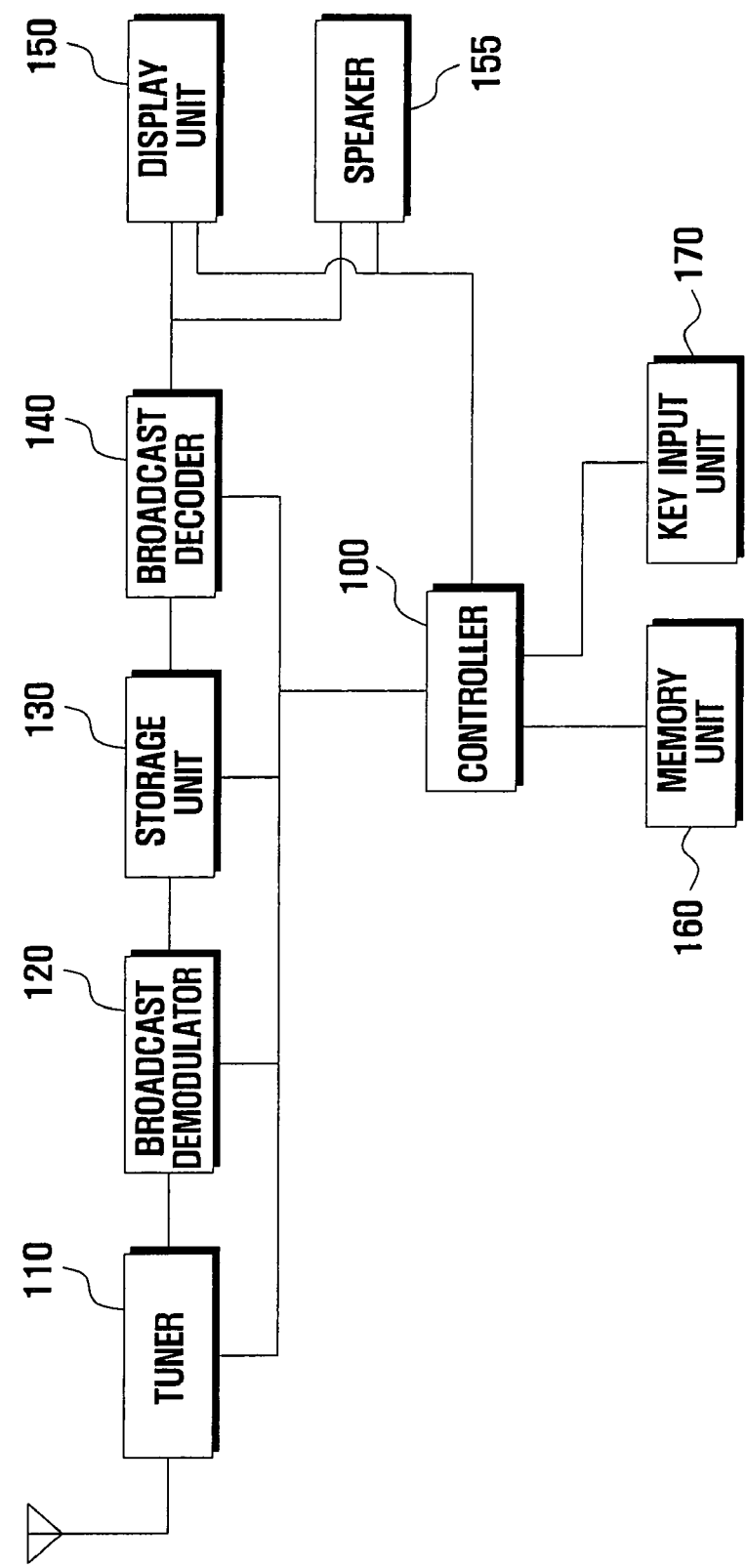
FIG. 1 is a block diagram illustrating a configuration of a digital broadcast receiver including a fast channel switching method and apparatus according to an exemplary embodiment of the present invention.

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In order to help understanding the present invention, general descriptions on the components of the digital broadcast systems including DVB, such as burst channel time and a number of service channel to be buffered. Nevertheless, it would be recognized by those skilled in the art that the present invention is not limited thereto but can be modified within the scope of the appended claims.

In the following embodiments, a digital broadcast receiver adopting the fast channel switching method and apparatus of the present invention buffers broadcast data on the ongoing service channel and at least one other service channel in preparation for an expected channel switching. Digital broadcast systems can be generally classified into Digital Multimedia Broadcasting (DMB) or a Digital Video Broadcasting (DVB). The DVB is further classified into DVB-terrestrial (DVB-T) and DVB-Handheld (DVB-H). Particularly, the DVB-H transmits broadcasts data in the form of IP datagrams as data bursts in small timeslots. In the following embodiment, the fast channel switching technique of the present invention is described with regard to a DVB-H receiver. However, the present invention can be adopted to both the DVB and DMB.

A "Channel" denotes a frequency bandwidth given for the broadcast system and the broadcast channel consists of a plurality of time-division multiplexed "service" channels that are distinguished by a program identifier or product identifier (PID). An "event" denotes a program provided through each service channel.

In the following embodiment, a term "physical channel" is interchangeably used with the broadcast channel, and each time-division multiplexed timeslot are called "service channel. A digital broadcast system transmits a plurality of service channels in one physical channel. The physical channel means a frequency band set for a tuner such that the service channels are identified by PID in the frequency band of the physical channel. In the following embodiment, the digital broadcast receiver includes a single tuner that switches between the service channels.

An "ongoing service channel" denotes a service channel that is selected so as to be on-air. A "standby service channel" denotes a service channel that is likely to be selected at an expected channel switch. A "previous service channel" is the service channel that was on-air right before switching to the current ongoing service channel. A "neighbor service channel" is a service channel positioned right before or after the ongoing service channel in time line. An "upper neighbor service channel" is the neighbor service channel having a channel number greater than that of the ongoing service channel, and a "lower neighbor service channel" is the neighbor service channel having a channel number less than that of the ongoing service channel. A "preference service channel" denotes a service channel that is frequently selected by a subscriber. The neighbor service channels and preference service channels are represented by "buffering service channels" on which broadcast data are buffered while the broadcast data of the ongoing service channel are displayed on a screen.

FIG. 1 is a block diagram illustrating a configuration of a digital broadcast receiver adopting the fast channel switching method and apparatus according to an exemplary embodiment of the present invention.

Referring to FIG. 1, the digital broadcast receiver includes a controller 100, a tuner 110, a broadcast demodulator 120, a storage unit 130, a broadcast decoder 140, a display unit 150, a speaker 155, a memory unit 160, and a key input unit 170.

The controller 100 controls general operations of the digital broadcast receiver. The key input unit 170 generates a key signal in response to a user key input and transfers the key signal to the controller 100. The key signal includes a channel selection command, channel navigation command, and playback command, etc. The controller 100 controls the buffering of broadcast data on at least one predetermined service channel while playing the broadcast data of an ongoing service channel and plays, if the buffering service channel is selected, the buffered broadcast data. The memory unit 160 includes a program memory for storing application programs for performing service channel switching and buffering the broadcast data on the predetermined buffering service channel, and a data memory for storing the buffered data. The controller 100 analyzes the user commands input through the key input unit 170 and controls the operation of the digital broadcast receiver in response to the user's commands. The controller 100 controls the operation of the digital broadcast receiver in response to the command input provided through the key input unit 170.

The tuner 110 sets the burst time (timeslot) and switches on for the data bursts corresponding to service channels selected by a subscriber. The broadcast demodulator 120 performs demodulation on the broadcast signals output from the tuner 110. The broadcast demodulator 120 can demodulate broadcast signals for multiple service channels. The storage unit 130 buffers the broadcast data of the ongoing service channel and at least one preset standby service channel. The broadcast decoder 140 is implemented with a video decoder and audio decoder such that the video decoder decodes video data and delivers the decoded video data to the display unit 150 and the audio decoder decodes audio data and delivers the decoded audio data to the speaker 155.

The broadcast demodulator 120 and broadcast decoder 140 can be implemented in different structures according to the type of the digital broadcast system. The digital broadcast receiver can be one of DMB, DVB-T, and DVB-H receivers.

The broadcast data of the DMB and DVB are broadcasted in the form of a Motion Picture Experts Group 2 transport stream (MPEG2-TS) packet stream and each MPEG2-TS packet consists of a header and payload. The packet header contains a PID as an identifier assigned to a service channel such that the digital broadcast receiver can recognize the service channel referring to the PID.

The payload of the MPEG2-TS packet for the DMB or DVB-T is filled with the broadcast data, and the payload of the MPEG2-TS packet (DVB-H IP encapsulated packet) for DVB-H is filled with Internet Protocol (IP) datagrams. In the case of DVB-T or DMB, the broadcast demodulator 120 is implemented to demodulate broadcast data of a service channel, and the broadcast decoder 140 is implemented with a demultiplexer for decoding the demodulated broadcast data and video and audio decoders.

In the case of DVB-H, the broadcast demodulator 120 is implemented with a demodulator for demodulating the broadcast data, a PID filter for filtering the broadcast data of a selected service channel, and a demodulation controller for controlling the cooperation of the demodulator and the tuner 110. Also, the broadcast decoder 140 includes a protocol processing unit for processing IP information and video and audio decoders.

In this embodiment, the digital broadcast receiver plays the broadcast data stream on the ongoing service channel while buffering at least one standby service channel, which is likely to be selected at an expected channel switching, and plays, when switched to the standby service channel, the broadcast data buffered on the standby service channel, whereby it is possible to reduce the channel switching delay. Accordingly, seamless channel switching can be achieved.

In this embodiment, the digital broadcast receiver buffers broadcast data on at least one preset service channel, e.g. a neighbor service channel, in order to reduce processing delay at a next channel switching operation. The channel switching can be performed in two kinds of manners. That is, the user may select a service channel by navigating the service channels using up/down keys or by pressing a specific number key corresponding to a service channel. In the case of the channel switching with navigation key manipulation, the service channels neighboring the ongoing service channel are preferably selected as the standby service channels. In the case of the channel switching with preset channel number key, favorite service channels, e.g. the service channels registered by the user or frequently played, are set for the standby service channels.

In the navigation key-based channel switching method, the user navigates the service channels for selecting a service channel using the navigation keys. In this case, the digital broadcast receiver buffers the broadcast data on the ongoing service channel and neighbor service channels that are positioned right before and after the ongoing service channel in channel numbers. The broadcast demodulator 120 demodulates the broadcast data on the ongoing and neighbor service channels, and the storage unit 130 buffers the demodulated broadcast data received on the demodulated ongoing service channel and at least one neighbor service channel. The broadcast decoder 140 decodes the demodulated broadcast data of the ongoing service channel and outputs decoded video and audio data through the display unit 150 and the speaker 155, while buffering the broadcast data on the neighbor service channels. A size of the storage 130 can be changed in consideration of the channel switching pattern of the user. If a channel switching signal is input through an up/and down key while playing the broadcast data on the ongoing service channel, the controller 100 detects the switching signal and delivers the broadcast data of the service channel buffered in the storage unit 130 to the broadcast decoder 140. The broadcast decoder 140 decodes the broadcast data of the selected service channel and outputs the decoded video and audio data through the display unit 150 and the speaker 155 without recognition of the change of the ongoing broadcast channel. Here, upon detecting the switching signal input, the control unit 100 controls the broadcast demodulator 120 and storage unit 130 so as to prepare next channel switching operation.

In this switching method, the user can register favorite service channels so as to navigate to the registered service channels when the channel switch signal is input through the up/down key. At this time, the controller 100 controls the storage unit 130 to buffer the broadcast data on service channels neighboring the ongoing service channel in a list of the favorite service channels.

In the number key-based channel switching method, the service channel switching is triggered by a specific number key input through the key input unit 170. In this case, the digital broadcast receiver buffers the broadcast data received through the ongoing service channel and at least one favorite service channel as the standby service channel. The broadcast demodulator 120 demodulates the broadcast data on the ongoing and standby service channel and the storage unit 130 buffers the demodulated broadcast data on the ongoing and standby service channels. The broadcast decoder 140 decodes the broadcast data of the ongoing service channel output from the storage unit 130 and outputs video and audio data decoded from the broadcast data through the display unit 150 and speaker 155. Buffer size of the storage unit 130 can be set in consideration of the time taken for channel switching. If a channel selection signal is input through the key input unit 170, the controller 100 detects the channel selection signal and determines the channel number corresponding to the channel selection signal that matches one of the standby service channels buffered in the storage unit 130. If the selected service channel matches one of the standby service channels, the controller 100 directs the storage unit 130 to deliver the buffered broadcast data of the selected service channel to the broadcast decoder 140 such that the broadcast decoder 140 decodes the broadcast data of the changed service channel and outputs the decoded video and audio data through the display unit 150 and the speaker 155. Next, the controller 100 analyzes the user's preferences on the service channels, e.g. frequency of channel selection, and determines the standby service channels of which data to be buffered. The information on the service channels to be buffered is provided to the broadcast demodulator 120 and the storage unit 130 such that the broadcast demodulator 120 and the storage unit 130 prepare for the next channel switching operation.

As described above, the digital broadcast receiver having a signal tuner according to the first embodiment of the present invention buffers broadcast data on at least one neighbor service channel of the ongoing service channel while playing the broadcast data received through the ongoing service channel, and displays, when the neighbor service channel is selected, the buffered broadcast data without switching delay.

According to a second embodiment of the present invention, a digital broadcast receiver having a signal tuner buffers broadcast data on at least one favorite service channel frequently selected by the user while playing the broadcast data received through the ongoing service channel, and displays, when the favorite channel is selected, the buffered broadcast data without switching delay.

In the fast channel switching methods according to the first and second embodiments, when the ongoing service channel is switched to a preset standby service channel, the digital broadcast receiver plays buffered standby service channel broadcast data such that the channel switching is performed seamlessly with minimized data processing delay.

In the description of the digital broadcast receiver of FIG. 1 a DVB-H receiver is assumed.

Figure 2:
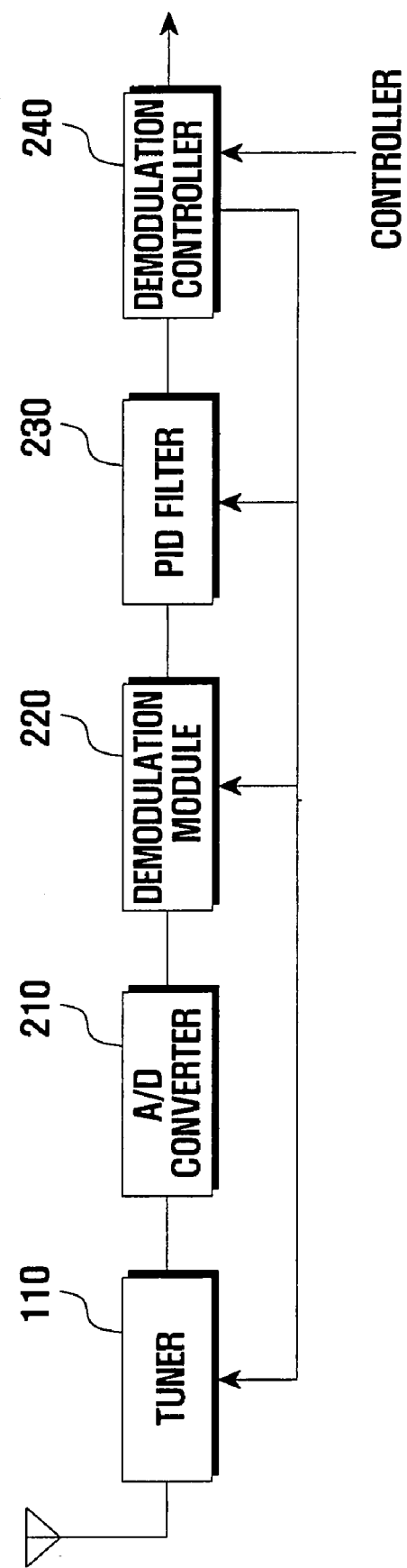
FIG. 2 is a block diagram illustrating a configuration of the broadcast demodulator 120 of FIG. 1.

FIG. 2 is a block diagram illustrating a configuration of the broadcast demodulator 120 of FIG. 1, and FIGS. 5A to 5F are diagrams illustrating a frame format of a DVB-H system.

Referring to FIG. 5A to 5F, DVB-H uses MPEG2-TS packets. Each TS packet has a length of 188 bytes consisting of a 4-byte header and a 184 byte payload. The packet header contains packet synchronization information and packet identifier (PID). The PID is a channel identifier and can be used for identifying data contained in the payload. The payload consists of multi protocol encapsulation (MPE) sections. Each MPE section includes a table identifier (table_ID), MPE forward error correction (MPE-FEC) information for correcting errors of the received data, information for slicing the received data in time. Each MPE contains at least one IP datagram. In FIG. 5A to 5F, IPv6 datagram is depicted as an example. The IP datagram includes an IP version information, source IP address, and destination address. The IP datagram consists of user datagram protocol (UDP) units and each UDP unit includes port addresses of the transmitter and receiver (Scr Prt and Dst Prt). The UDP unit contains FLUTE/ALC units and a real-time transport protocol (RTP) unit. The FLUTE/ALC unit includes the Electronic Service Guide (ESG) and files and the RTP unit includes audio and video data.

Referring to FIG. 2, the broadcast demodulator 120 is connected to the tuner 110 and includes an analog/digital (A/D) converter 210, a demodulation module 220, a PID filter 230, and a demodulation controller 240. The tuner 110 includes a phase-locked loop (PLL) circuit for generating a frequency for the physical channel, a mixer for mixing the received signal and the signal generated by the PLL, and a band-pass filter for passing the frequency of the physical channel.

The demodulation controller 240 controls the tuner 200 on the basis of control signals received from the control unit 100 so as to set the physical channel frequency and the PID of the service channel selected by the PID filter 230. At this time, the controller 100 analyzes information such as Program Specific Information/Stream Information (PSI/SI) and Session Description Protocol (SDP) that are processed by the broadcast demodulator and the broadcast decoder 140 and checks the PIDs of the ongoing and standby service channels. Accordingly, the broadcast data on the service channels having the PIDs are played or buffered. In this embodiment, the controller 100 can control the service channel switching operation.

The A/D converter 210 converts the output of the tuner 110 into digital data, the demodulation module 220 demodulates the digital data output from the A/D converter 210. The demodulation module 220 can be implemented with an Orthogonal Frequency Division Multiplexing (OFDM) or Coded OFDM (COFDM) demodulator. The data demodulated by the demodulation module 220 can be a TS packet 5A.

The TS packet contains a PID as an identifier for identifying the service channel. The PID filter 230 passes the data having the PID of the selected service channel from the demodulated IP datagram and transports the PSI/SI to the controller 100. The TS packet passed to the PID filter 230 may include the MPE-FEC and time slicing information in FIG. 5B.

If the TS packet contains the MPE section (FIG. 5B), the demodulation controller 240 performs time slicing control on the received burst data. That is, the demodulation controller 240 controls power supplied to the tuner 110 and demodulation module 220 on the basis of the time slicing information contained in the MPE section. The time slicing information contains information on the burst-on time of the selected and buffered service channel such that the demodulation controller 240 can control the power supplied to the tuner 110 and the demodulation module 220 in the burst data durations of the ongoing and standby service channels on the basis of the time slicing information. The demodulation controller 240 also can perform the MPE-FEC function on the data of the selected and buffered broadcast data output from the PID filter 230 using the MPE section information.

As described above, the demodulation controller 240 controls the tuner 110 on the basis of the channel control data output from the controller 100 to set the selected service channel and sets the PID filter 230 with the PIDs of the ongoing and standby service channels. The demodulation controller 240 controls the timing slicing operation for reducing the power consumption of the digital broadcast receiver on the basis of the MPE section information (FIG. 5B) and performs the MPE-FEC function for improving reception rate by compensating the reception errors. At this time, the data output from the demodulation controller 240 can be an IP datagram (FIG. 5C).

Figure 5A:
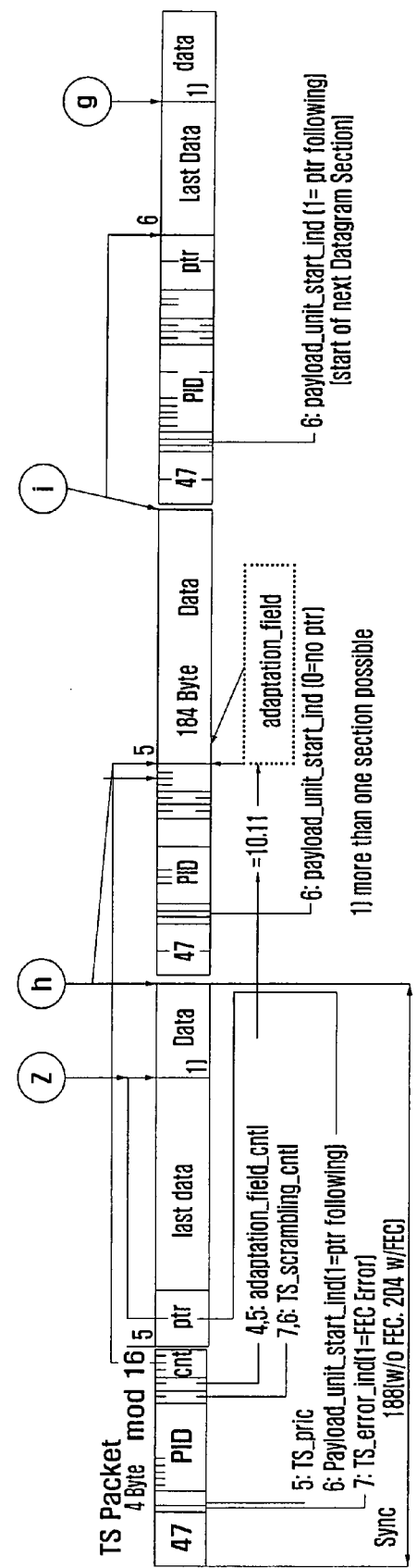
FIGS. 5A to 5F are diagrams illustrating a frame format of a DVB-H system.
Figure 5B:
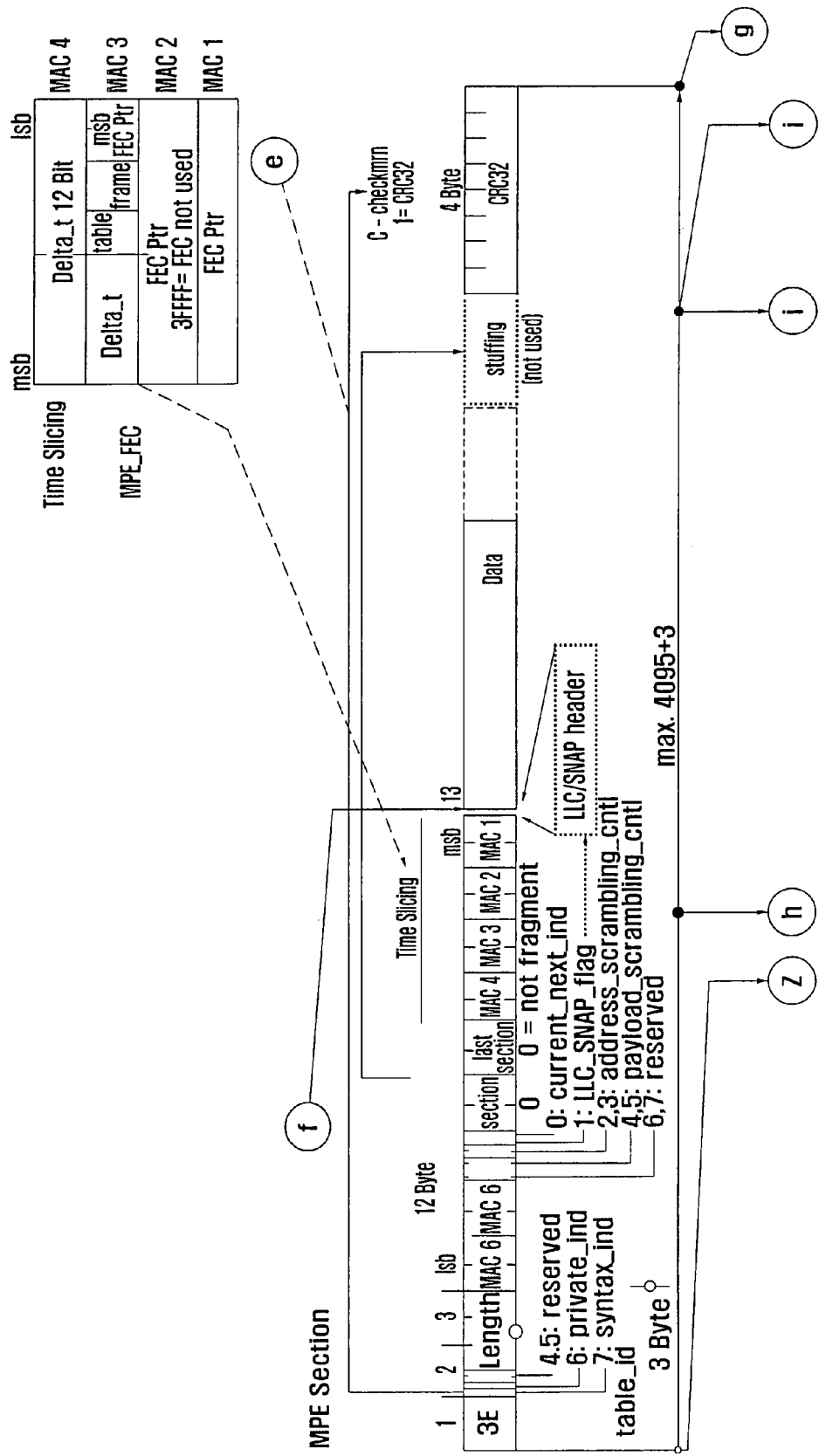
Figure 5C:
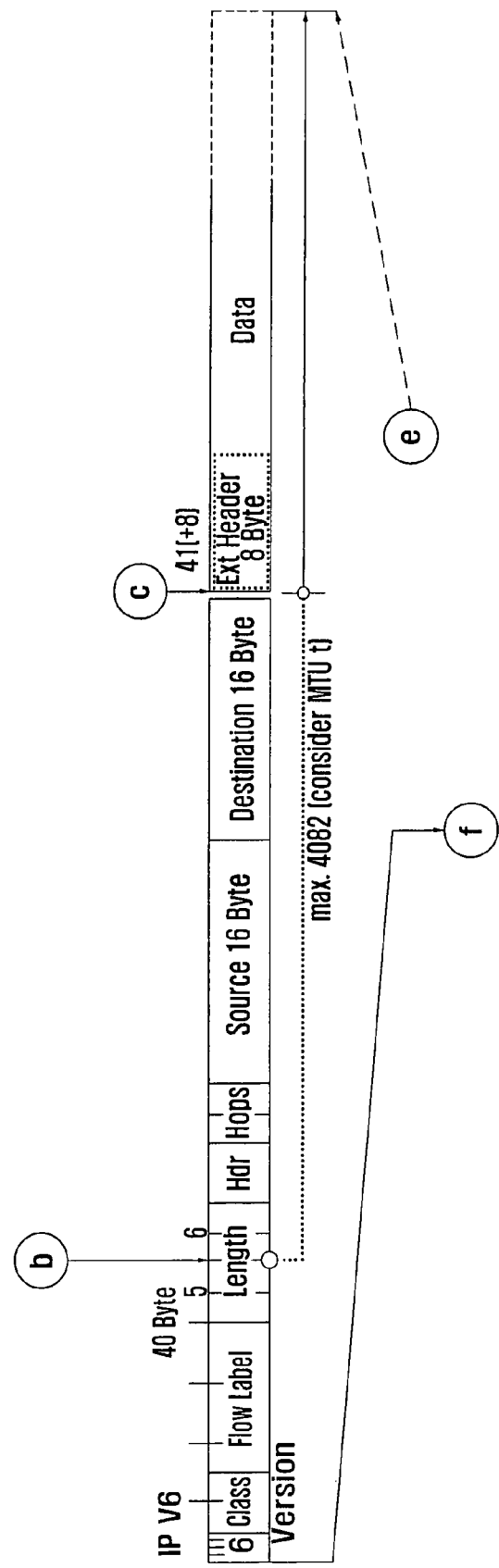
Figure 5E:
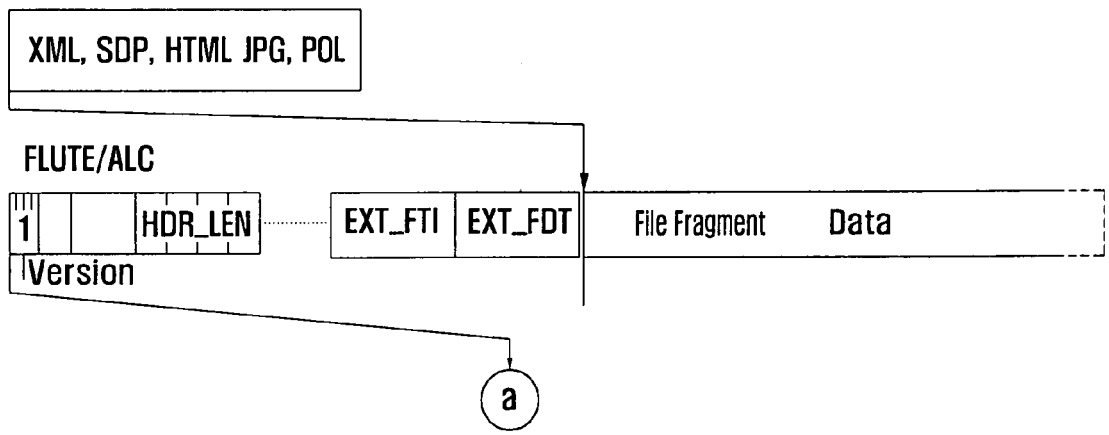
Figure 5D:
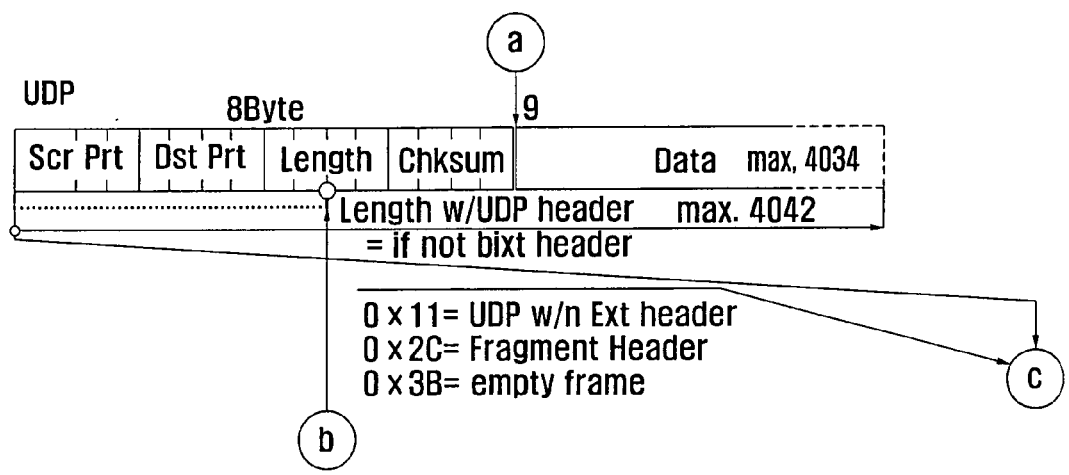
Figure 5F:
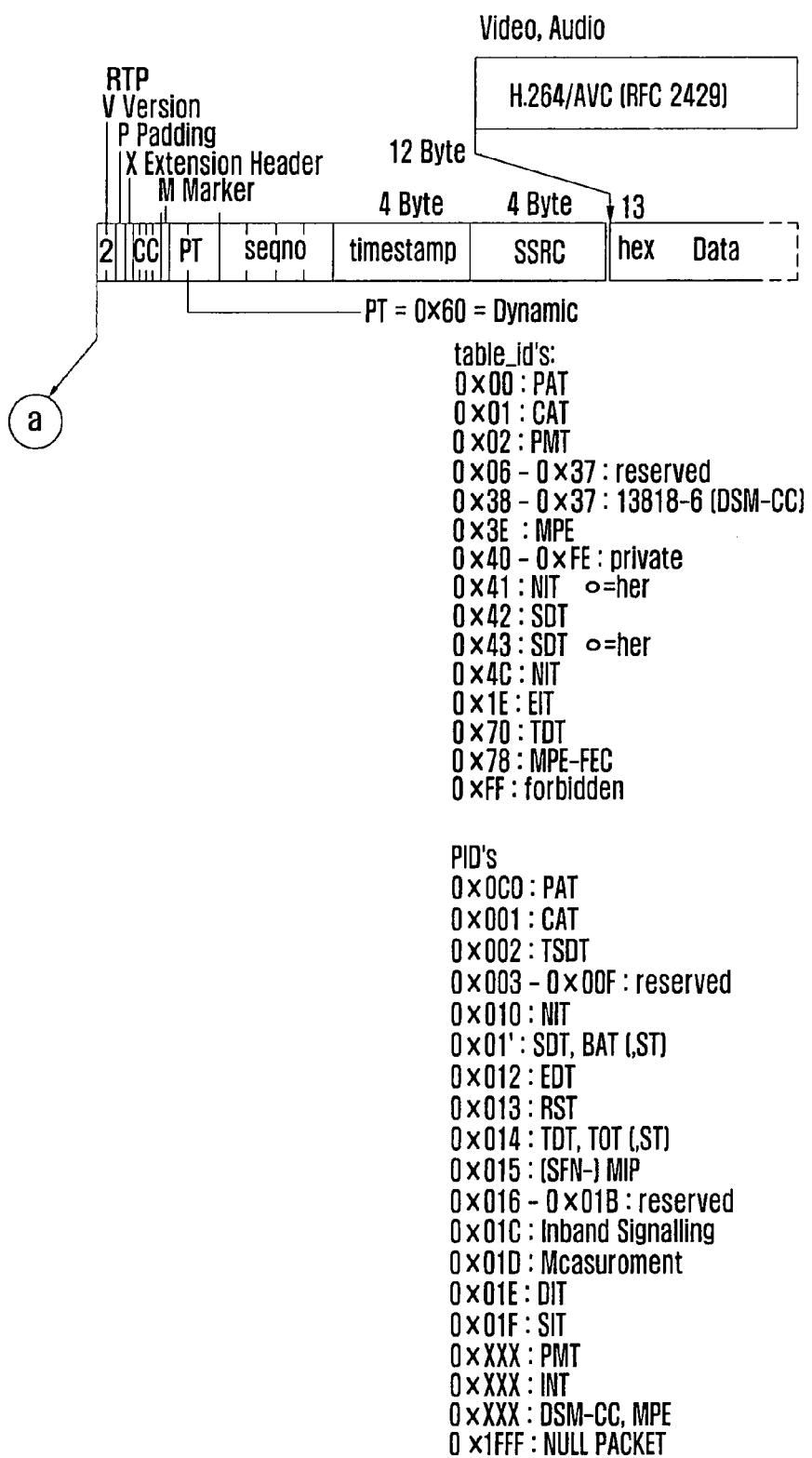

The broadcast demodulator 120 delivers the IP datagram having a structure shown in FIG. 5C to the storage unit 130, and the storage unit 130 stores the broadcast data on the standby service channels into respective buffers while outputting the broadcast data of the ongoing service channel. The broadcast decoder 140 processes the IP datagrams delivered from the storage unit 130 and outputs the video and audio data.

Figure 3:
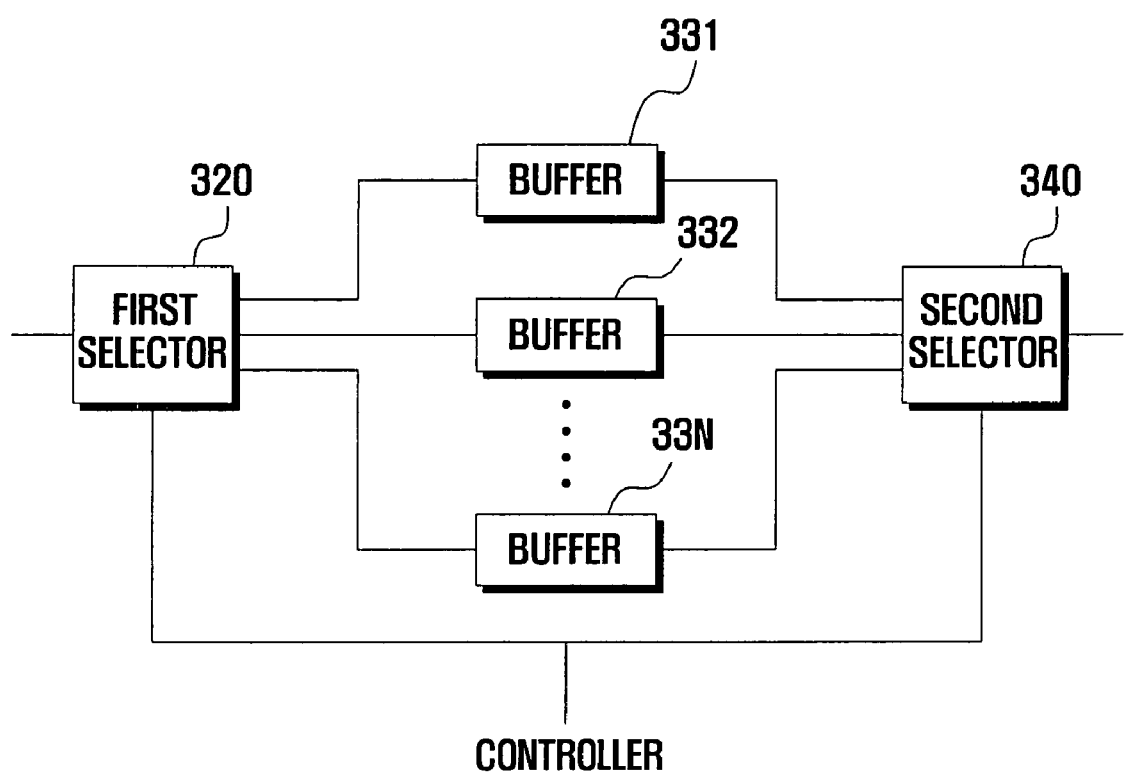
FIG. 3 is a block diagram illustrating a configuration of the storage unit 130 of the digital broadcast receiver of FIG. 1.

FIG. 3 is a block diagram illustrating a configuration of the storage unit 130 of the digital broadcast receiver of FIG. 1.

Referring to FIG. 3, the storage unit 130 includes a plurality of buffers 331, 332, . . . , 33N for buffering the broadcast data of the ongoing and standby service channels while playing the broadcast data output from the broadcast demodulator 120. The number of the buffers is greater than the number of the standby service channels. For example, if the number of standby service channels is 2, the number of buffers N is equal to or greater than 3. This is because the broadcast data on the ongoing service channel is buffered together with the broadcast data on the standby service channels. Also, the buffers 331 to 33N can be implemented as such number of the service channels in the broadcast channel and corresponding service channels. The storage unit 130 also includes a first selector 320 connected to input nodes of the buffers 331 to 33N and a second selector 340 connected to output nodes of the buffers 331 to 33N. The controller 100 generates selection control signals for delivering the broadcast data of the ongoing and standby service channels to the corresponding buffers. The first selector 320 delivers the broadcast data output from the broadcast demodulator 120 to corresponding buffers under the control of the controller 100, and the second selector 340 delivers the broadcast data output from a buffer matched to the ongoing service channel to the broadcast decoder 140 under the control of the controller 100. The first selector 320 can be implemented with a demultiplexer, and the second selector 340 can be implemented with a multiplexer.

The buffers 331 to 33N are provided as such number of the service channels such that the buffers 331 to 33N are mapped to the respective service channels. The controller 100 generates control signals for controlling the delivery of the broadcast data of the ongoing and standby service channels to the respective buffers 331 to 33N. The first selector 320 selects the broadcast data output from the broadcast demodulator 120 and forwards the broadcast data to the corresponding buffer under the control of the controller 100. The second selector 340 selects the broadcast data output from the buffer of the ongoing service channel and forwards the broadcast data to the broadcast decoder 140. The storage unit 130 can be implemented as a random access memory that assigns buffering regions having predetermined sizes. In this case, the first selector 320 is implemented with a write address generator, and the second selector 340 is implemented with a read address generator. That is, the buffering regions are assigned as such number of the ongoing and standby service channels and matching the ongoing and standby service channels to the specific buffering regions. If the broadcast data of the standby service channel is output from the broadcast demodulator 120, the controller 100 generates a write address such that the broadcast data are stored in the region of the write address. Also, the controller 100 generates a read address of the buffering region and informs the second selector 340 of the read address. When the storage 130 is implemented with a memory, the first and second selectors 320 and 240 are implemented with the write and read addressing mechanism, respectively.

The operation of the above structured storage unit 130 is described hereinafter. The controller 100 knows the PID of the ongoing service channel and the states of the buffers 331 to 33N buffering the broadcast data of the ongoing and standby service channel. Accordingly, the controller 100 checks the PID of the ongoing service channel and controls the first selector 320 to store the received broadcast data to the corresponding buffer. The controller 100 also controls the second selector 340 to deliver the broadcast data of the service channel to the broadcast decoder 140 on the basis of the PID. The sizes of the buffers 331 to 33N can be set in consideration of the time to be taken for processing channel switching operation, i.e. obtaining and processing the broadcast data. In the case of DVB-H, since the burst interval is 1 to 4 seconds, the size of each buffer is preferably set for buffering the broadcast data during this time interval.

The controller 100 also controls the first selector 320 in accordance with the standby service channel designation schemes. In the case that the neighbor service channels are designated for the standby service channels, the controller 100 controls the first selector 320 to buffer the broadcast data on the ongoing service channel and neighbor service channels within corresponding buffers 331 to 33N. The neighbor service channels are service channels neighboring the ongoing service channel upper and lower in channel number. If the neighbor service channels are the lower and upper service channels right before and after the ongoing service channel, buffering is carried out in an order of the lower neighbor service channel, ongoing service channel, and upper neighbor service channel. In this case, the controller 100 controls the first selector 320 to deliver broadcast data of the lower neighbor service channel, ongoing service channel, and upper neighbor service channels to the corresponding buffers in a sequential order.

In a case that the frequently selected service channels are designated for the standby service channels, the controller 100 sets a number of the candidate channels and checks the service channels having high user preferences such that the first selector 320 writes the broadcast data of the ongoing service channel and the service channels having higher user preferences to the corresponding 331 to 33N.

In a case that the standby service channels are selected in accordance with both the neighbor channel-based and favorite channel-based standby service channel designation schemes, the controller 100 creates a favorite service channel list and designates the neighbor favorite service channels for the standby service channels such that the first selector 320 writes the broadcast data of the ongoing and neighbor favorite service channels to the corresponding buffers 331 to 33N.

The controller 100 also controls the second selector 340 to output the broadcast data of the ongoing service channel to the broadcast decoder 140.

If a channel switching signal is detected for switching to one of the standby service channel while playing the broadcast data on the ongoing service channel, the controller 100 controls the second selector 340 to output the broadcast data buffered on the switched standby service channel to the broadcast decoder 140.

If the channel switching is completed, the controller 100 resets the standby service channels with reference to the new ongoing service channel. That is, the standby service channels are reset in accordance with the standby service channel designation scheme, i.e. neighbor-based or favorite channel-based standby service channel designation scheme. Next, the controller 100 resets the broadcast demodulator 120 with the PIDs of the new standby service channels (in the case of DVB-H, the broadcast demodulator 120 is set with the PIDs and the broadcast demodulator sets the PID filter 230 with the PIDs of the standby service channels), and controls the first selector 320 to write the broadcast data of the standby service channels into the corresponding buffers of the storage unit 130.

In another aspect, since the controller 100 has the information on the PID of the ongoing and standby service channels and the status of the buffers 331 to 33N set up with the PIDs, the controller 100 checks the PIDs of the received broadcast data and controls the first selector 320 to store the broadcast data in the corresponding buffers on the basis of the PIDs. The controller 100 also controls the second selector 340 to read out the broadcast data having the PID of the ongoing channels to the broadcast decoder 140. The size of each buffer is set up in consideration of the time to be taken for obtaining the broadcast data of the service channel switched thereto after channel switching is triggered. In the case of DVB-H, since the burst interval is 1 to 4 seconds, the size of each buffer is preferably set up to buffer an amount of broadcast data corresponding to 4 seconds.

In another aspect, since the controller 100 has the information on the PID of the ongoing and standby service channels and the status of the buffers 331 to 33N set up with the PIDs, the controller 100 checks the PIDs of the received broadcast data and controls the first selector 320 to store the broadcast data in the corresponding buffers on the basis of the PIDs. The controller 100 also controls the second selector 340 to read out the broadcast data having the PID of the ongoing channels to the broadcast decoder 140. Accordingly, the second selector 340 selects an output buffer that is storing the broadcast data of the ongoing service channel, and reads out the broadcast data stored in the buffer to the broadcast decoder 140 under the control of the controller 100. The first selector 320 forwards the broadcast data output from the broadcast demodulator 120 to the storage unit so as to be stored in the respective buffers identified by PID.

If the channel switching is completed in the above manner, the controller 100 controls the first selector 320 to select the broadcast data of the new ongoing and standby service channels to be buffered. The second selector 340 reads out the broadcast data buffered in the ongoing service channel buffer of storage unit 130 to the broadcast decoder 140 under the control of the controller 100, in the broadcast playback mode. While playing the broadcast data of the ongoing service channel, the first selector 320 selects the broadcast data of the standby service channels such that the broadcast data of the standby service channels are buffered. In the case that the favorite channel-based service channel designation scheme is adopted, the controller 100 controls the first selector 320 to select the broadcast data of the favorite service channels such that the broadcast data of the favorite service channels are stored in the corresponding buffers. In the case that the neighbor-based service channel designation scheme is adopted, the controller 100 controls the first selector 320 to select the broadcast data of the neighbor service channels such that the broadcast data of the neighbor service channels are stored in the corresponding buffers.

If a channel switching command is detected in the broadcast playback mode, the controller 100 controls the second selector 340 to read out the broadcast data, stored in the buffer mapped to the switched-to service channel to the broadcast decoder 140 and resets the standby service channels of which broadcast data are to be buffered.

After the channel switching is completed, the controller 100 can change the buffering order of the service channels. That is, the buffering order of the service channels is set in accordance of the new standby service channels. Even if the buffering order of the service channels is not changed, the buffering performance is not changed. That is, since the buffering is performed in a predetermined order (sequential order or directional order), the broadcast data of a standby service channel is updated every burst interval. For this reason, the buffering order has no effect to the buffering efficiency.

Figure 4:
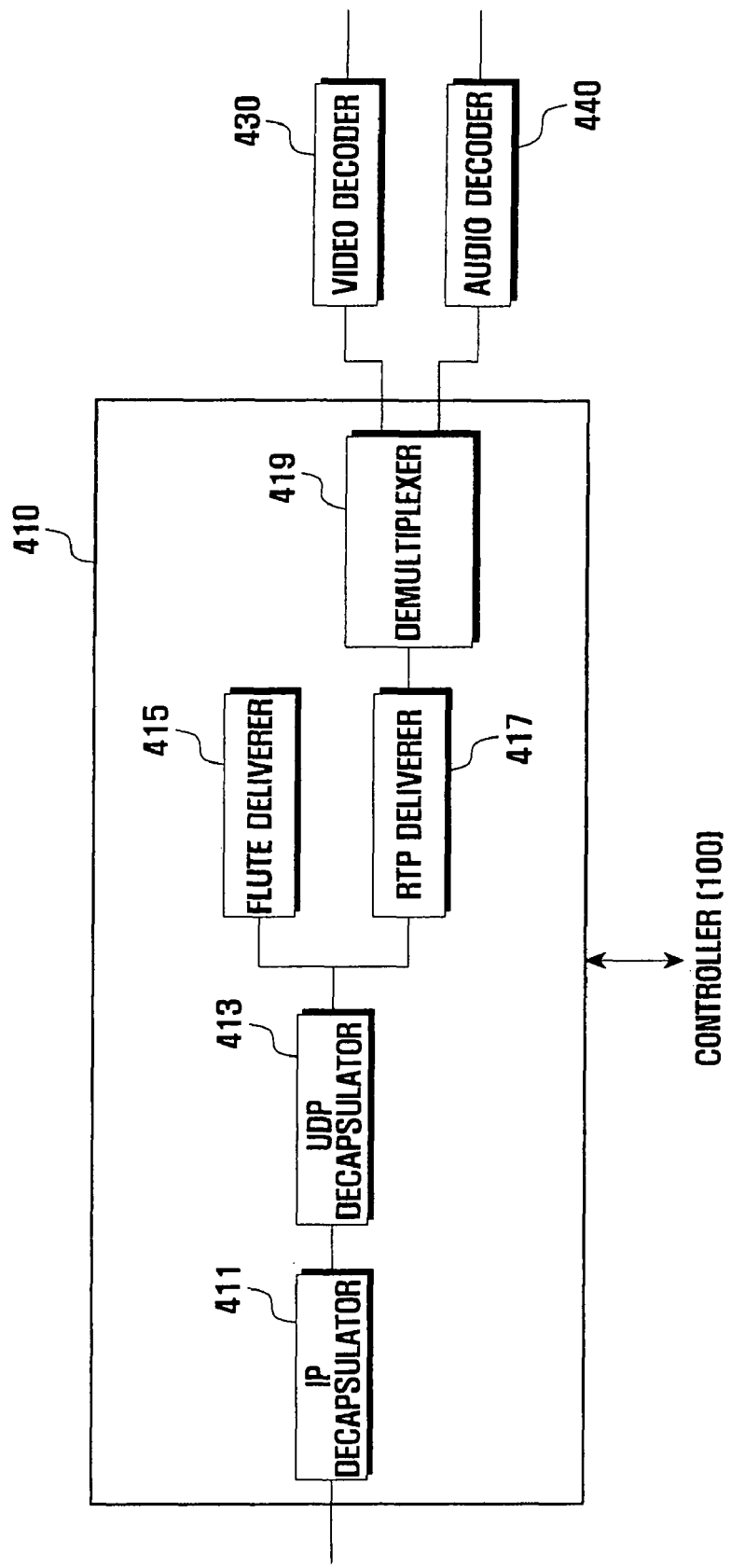
FIG. 4 is a block diagram illustrating a configuration of broadcast decoder of a DVB-H receiver according to an exemplary embodiment of the present invention.

FIG. 4 is a block diagram illustrating a configuration of broadcast decoder of a DVB-H receiver according to an exemplary embodiment of the present invention.

Referring to FIG. 4, the broadcast decoder includes a protocol processing unit 410, a video decoder 430, and an audio decoder 440.

The protocol processing unit 410 decapsulates hierarchal protocol data units and processes the payload of each protocol data unit on the basis of protocol information. The video decoder 430 decodes video data from the protocol processing unit 410 and outputs the decoded video data to the display unit 150. The audio decoder 440 decodes audio data from the protocol processing unit 410 and outputs the decoded audio data to the speaker 155.

The protocol processing unit 410 includes an IP decapsulator 411, a UDP decapsulator 413, a FLUTE deliverer 415, an RTP deliver 417, and a demultiplexer 419.

The IP decapsulator 411 extracts an IP datagram (FIG. 5C) from the MPE section (FIG. 5B) and decapsulates the IP datagram so as to check the source and destination IP addresses.

The UDP decapsulator 413 extracts a UDP unit (FIG. 5E) from the IP datagram and decapsulates the UDP unit to check the source and destination port numbers.

If the data carried by the UDP unit is FLUTE/ALC protocol data, the UDP decapsulator 413 transports the FLUTE/ALC protocol data to the FLUTE deliverer 415. If the data carried by the UDP unit is RTP data, the UDP decapsulator 413 transports the RTP data to the RTP deliverer 417.

The FLUTE/ALC protocol data may include ESG or other type of data such as XML, SDP, HTML, JPG, and POL. The RTP data may include the audio and video data. The RTP deliverer 417 sends the video and audio data to the demodulator 419. The demodulator 419 demodulates the video and audio data, and outputs the demodulated video and audio data to the respective video and audio decoder 430 and 440, respectively.

The protocol processing unit 410 operates under the control of the controller 100. The controller 100 can integrate an ESG engine (XML engine and ESG decoder), an SDP parser, and a PSI/SI decoder. The controller 100 also can integrate a protocol information controller and manager for controlling the protocol process and management. The controller 100 processes the protocol information and data received from the protocol processing unit 410. That is, the controller 100 analyzes the PSI/SI table (NIT, SDT, and EIT) extracted by the broadcast demodulator 120 so as to check the PSI/SI according to the MPEG-2 and DVB-SI standards, parses the ESG data received from the protocol processing unit 410, and then controls the overall operation of the digital broadcast receiver on the basis of these information. The service channels, ESG per service channel, and audio and video data are identified using the PID, IP, and port information. That is, the PSI/SI and SDP is provided with tables defining information on the service channel identifiers, audio and video identifiers, and ESG identifiers. The controller 100 can identify the service channels, audio data, video data, and ESG data with reference to the decoding result of the PSI/SI and the SDT. The controller 100 can include the protocol processing unit 410.

The demodulated video and audio data output from the protocol processing unit 410 are delivered to the video decoder 430 and the audio decoder 440. The video decoder 430 decodes the video data and displays the decoded data on the display unit 150 (not shown) in the form of visual image, and the audio decoder 440 decodes the audio data and outputs the decoded audio data through the speaker (not shown) in the form of audible sound. The video decoder 430 can be implemented with a H.264 decoder or MPEG series decoder, and the audio decoder 440 can be implemented with an AAC decoder.

The above-structured digital broadcast receiver buffers the broadcast data on the service channels in addition to the ongoing service channel in preparation for an expected channel switching, whereby it is possible to smoothly switch between service channels without processing delay. The service channel switching operation of the above-above structured digital broadcast receiver is described hereinafter. The channel switching operation is described with a DVB-H receiver as an exemplary digital broadcast receiver.

Figure 6A:
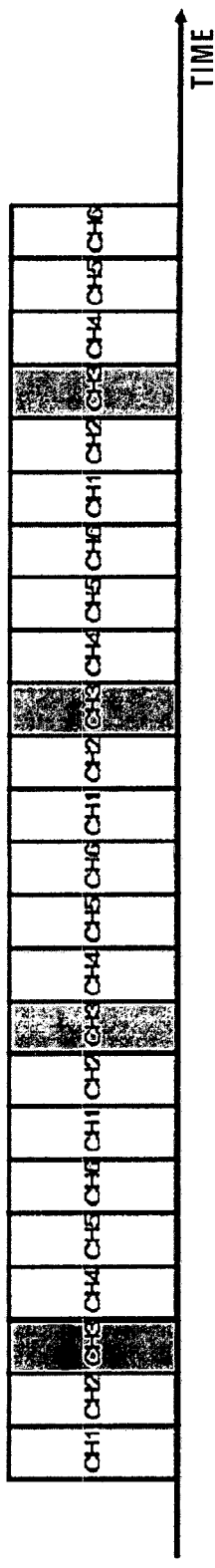
FIG. 6A is a diagram illustrating a conventional frame format adapted to a time slicing scheme.
Figure 6B:
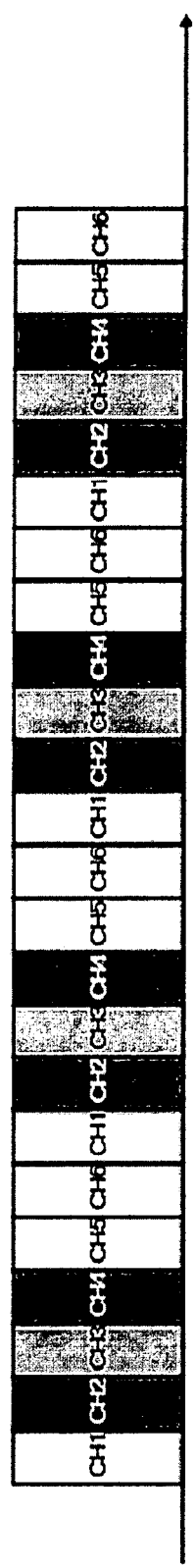
FIGS. 6B to 6D are diagrams illustrating a frame format for a fast channel switching method according to an exemplary embodiment of the present invention.

FIGS. 6A to 6B are diagrams illustrating a format of a time frame adopted to the fast channel switching method and system according to an exemplary embodiment of the present invention.

DVB-H system uses a time slicing mechanism to reduce the average power consumption of the broadcast receiver such that the broadcast receiver is switched on while receiving the burst for the ongoing service channel. FIG. 6A shows a time frame stream in which each time frame consists of 6 timeslots corresponding to six service channels CH1 to CH6. In FIG. 6A, CH3 is an ongoing service channel, for example. The time duration in which the broadcast data are received is called burst time, and the timeslots corresponding to the CH1, CH2, and CH4 to CH6, are called burst-off time. As shown in FIG. 6A, each service channel is periodically repeated such that the broadcast receiver can predict the burst time of the ongoing service channel. Of course, the broadcast receiver can predict the burst time of another channel too. Assuming that 6 service channels are multiplexed in a time frame and the burst time for each service channel is 1 second, the broadcast data of the ongoing service channel is received every 6 seconds. Since the broadcast receiver knows the burst time and burst-off time as well as channel numbers for the timeslots, the demodulation controller 240 can control the receiver to receive the broadcast data at the burst time of the ongoing service channel in accordance with time slicing mechanism. In the same manner, the demodulation controller 240 can control the receiver to receive the broadcast data at the burst times of the standby service channels.

FIG. 6A shows a frame format adapted to a fast channel switching method according to an exemplary embodiment of the present invention.

Referring to FIG. 6A, as the service channel CH3 is the ongoing service channel, for purposes of illustration, channels CH2 and CH4 are neighboring the ongoing service channel CH3 and are selected as the standby service channels according to the neighbor channel-based standby service channel designation scheme. In this case when a channel switching signal is input for switching to the CH2, for example, while playing the ongoing service channel CH3, the broadcast receiver cannot receive the broadcast data of the service channel before the next burst time of the service channel CH2 comes up. Accordingly, delay of the display stream occurs on the display unit 150.

However, in accordance with the principles of the instant invention, the broadcast receiver buffers the broadcast data received at the burst times of standby service channels CH2 and CH4. Accordingly, when the channel switching signal is input for switching to the CH2 channel, the broadcast receiver plays the data buffered during the burst time of the standby service channel CH2 without waiting for the next burst time. Hence, there is no delay of the display stream.

Also, the broadcast receiver can be implemented so as to buffer the broadcast data of all service channels. In this case, if ongoing service channel is changed, the broadcast receiver plays the broadcast data buffered for the switched-to service channel. Accordingly, the channel switching can be performed in seamless manner without a time gap between the old and new ongoing service channel screen images.

Typically, the channel switching occurs frequently for the neighbor service channel, i.e. a lower numbered neighbor service channel or upper numbered neighbor service channel. That is, the probability of the channel switching to one of the neighbor service channels CH2 and CH4 while watching the ongoing service channel CH3 is high. By buffering the broadcast data of the service channels that have the high selection probabilities at the next channel switch and playing the buffered broadcast data of the selected service channel, it is possible to play the broadcast data of the newly selected channel without significant switching delay. The number of the standby service channels of which broadcast data to be buffered can be changed. For example, the neighbor service channels CH1, CH2, CH4, and CH5 can be designated as the standby service channels. Of course, the number of the buffers 331 to 33N should be increased in proportional with the number of the standby service channel.

Figure 6C:
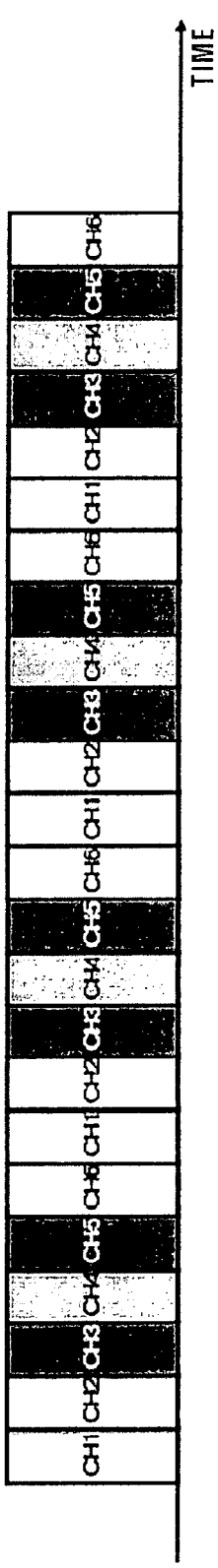

If the upper neighbor service channel CH4 is selected while the playing the broadcast data of the ongoing service channel CH3 (FIG. 6B), the service channel CH4 become the new ongoing service channel. Accordingly, the old ongoing service channel, CH3, and the service channel CH5 neighboring the new ongoing service channel CH4 are set as the new standby service channel, as shown in FIG. 6C, such that the broadcast data of the standby service channels CH3 and CH5 are buffered while the broadcast data of the ongoing service channel CH4 are played on the screen. In order to buffer the broadcast data on the standby service channels, the broadcast receivers should switch on at the burst times of the standby service channel in addition to the ongoing service channel.

Figure 6D:
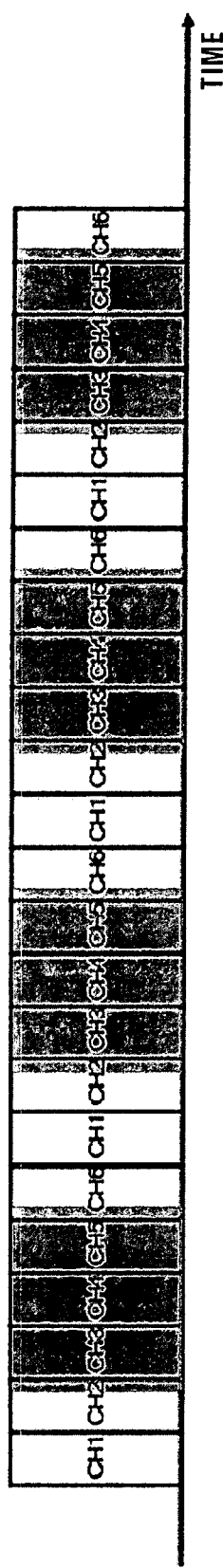
Figure 6E:
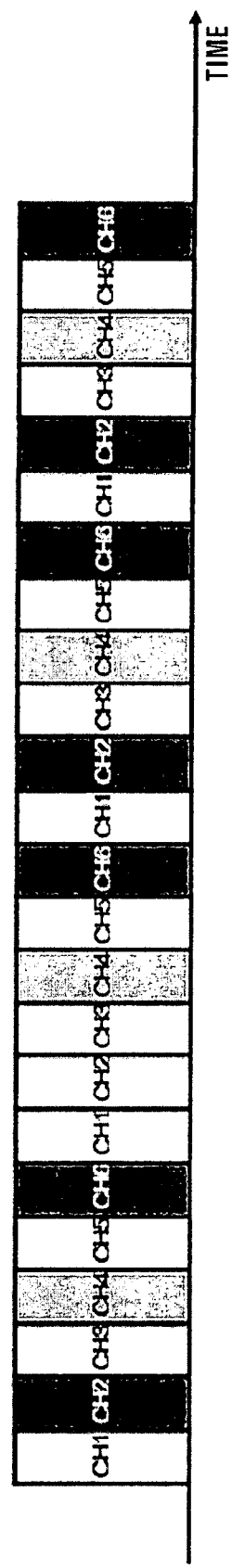
FIG. 6E is a diagram illustrating a frame format for a fast channel switching method according to another exemplary embodiment of the present invention.

FIG. 6E shows a frame format adapted to a fast channel switching method according to another exemplary embodiment of the present invention. Referring to FIG. 6E. the service channel CH4 is a the ongoing service channel and the service channels CH2 and CH6 are designated as the standby service channel of which broadcast data are buffered while the broadcast data of the ongoing service channel are played. In this embodiment, the standby service channels are selected on the basis of the user preference which can be represented by selection frequency or total played time of the service channel. Also, the standby service channels can be selected from a favorite service channels registered by the user. In FIG. 6E, the service channels CH2 and CH6 of which probabilities to be selected are higher than other service channels such that the broadcast data of the service channels CH2 and CH6 are buffered while playing the broadcast data of the ongoing service channel CH4.

Figure 7:
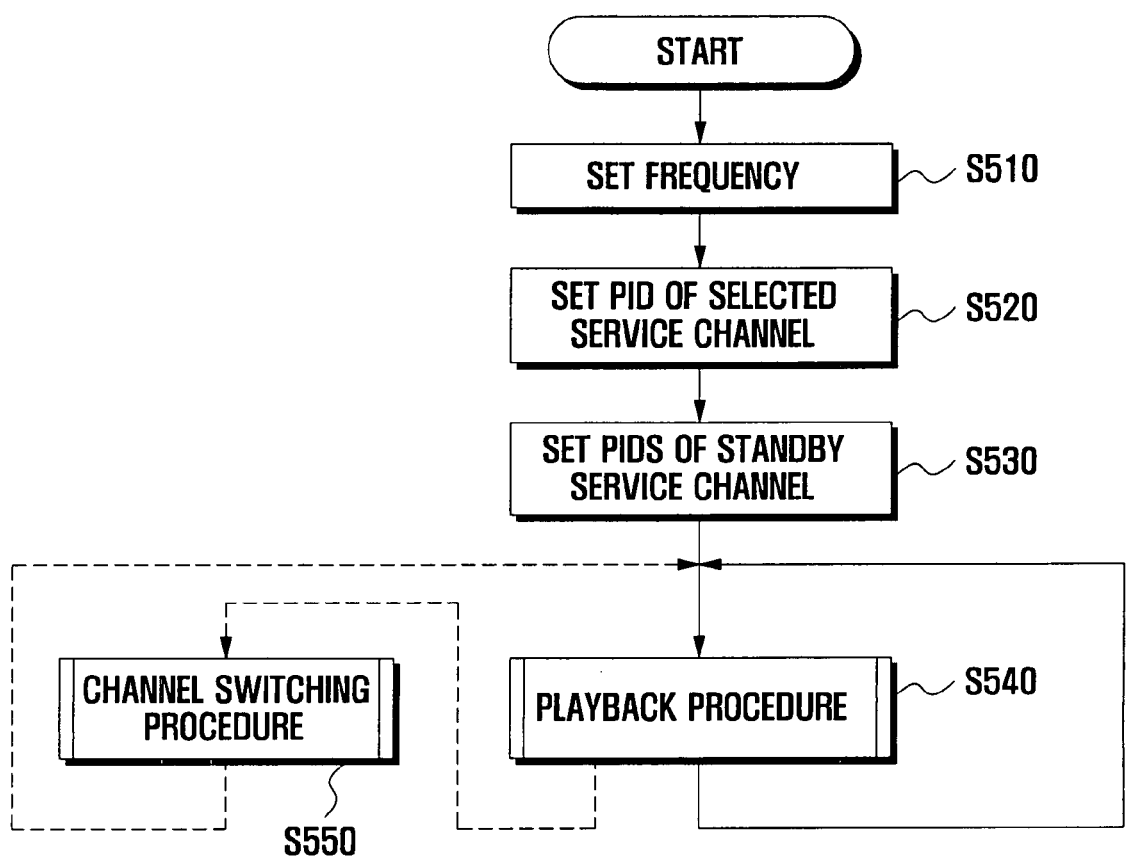
FIG. 7 is a flowchart illustrating a fast channel switching method according to an exemplary embodiment of the present invention.

FIG. 7 is a flowchart illustrating a fast channel switching method according to an exemplary embodiment of the present invention. In this embodiment, the standby service channels are neighbor service channels of the ongoing service channel as shown in FIGS. 6B to 6D.

Referring to FIG. 7, when a channel selection signal is input through the key input unit 170, the controller 100 checks the Service Description Table (SDT) of the PSI/SI or ESG data and sets the frequency of the physical channel with reference to the SDT (S510) and then sets a PID of the selected service channel (S520). Next, the controller 100 sets PIDs of the standby service channels (S530). That is, when a service channel is selected by a user, the controller 100 sets the frequency of the physical channel and then sets the ongoing and standby service channels. The standby service channels are set by checking the PIDs of the standby service channels and assigning buffers for buffering the broadcast data of standby service channels within the storage unit 130. The standby service channels are represented by the neighbor service channels of the ongoing service channel or the user preference channels. The standby service channels can be preset or determined when the ongoing service channel is selected.

In the case of the DVB-H receiver, the controller 100 generates a control signal for setting the frequency for the service channel, the demodulation controller 240 sets the tuner 110 with the physical channel frequency. Next, the demodulation controller 240 configures the coding scheme, coding rate, and guard interval of the demodulation module 220. The demodulation controller 240 also configures the PID filter 230 with the PID of the ongoing service channel. At this time the controller 100 also sets the PIDs of the standby service channels in addition to that of the ongoing service channel.

If an ongoing service channel is selected, the controller 100 determines the physical channel of the ongoing service channel and the standby service channels through steps 510 to 530. Next, the controller 100 operates in a broadcast playback mode (S540). In the broadcast playback mode, the broadcast demodulator 120 converts the output of the tuner 110 into digital data, performs OFDM (or COFDM) demodulation on the digital data, and filters the broadcast data having the PID of the ongoing service channel. If the PID of the broadcast data matches that of the ongoing service channel, the broadcast data are buffered within the corresponding buffer in the storage unit 130. The broadcast data of which PID does not match, the broadcast data are blocked. That is, the demodulation controller 240 controls the tuner 110 and the demodulation module 220 switch-on at the burst times of the ongoing and standby service channels in accordance with the time slicing scheme and performs the MPE-FEC on the demodulated broadcast data so as to output IP datagram (FIG. 5C). The storage unit 130 stores the IP datagrams received through the ongoing and standby service channels within corresponding buffers under the control of the controller 100. The storage unit 130 outputs the IP datagrams to the broadcast decoder 140 such that the broadcast decoder 140 decodes the IP datagrams and outputs the video and audio data decoded from the IP datagrams to the display unit 150 and the speaker 155. Such operations are performed at the burst times of the ongoing and standby service channels, and the tuner 110 and the broadcast demodulator 120 switch off during the burst off time. These processes are repeated until the broadcast playback mode ends.

Figure 8:
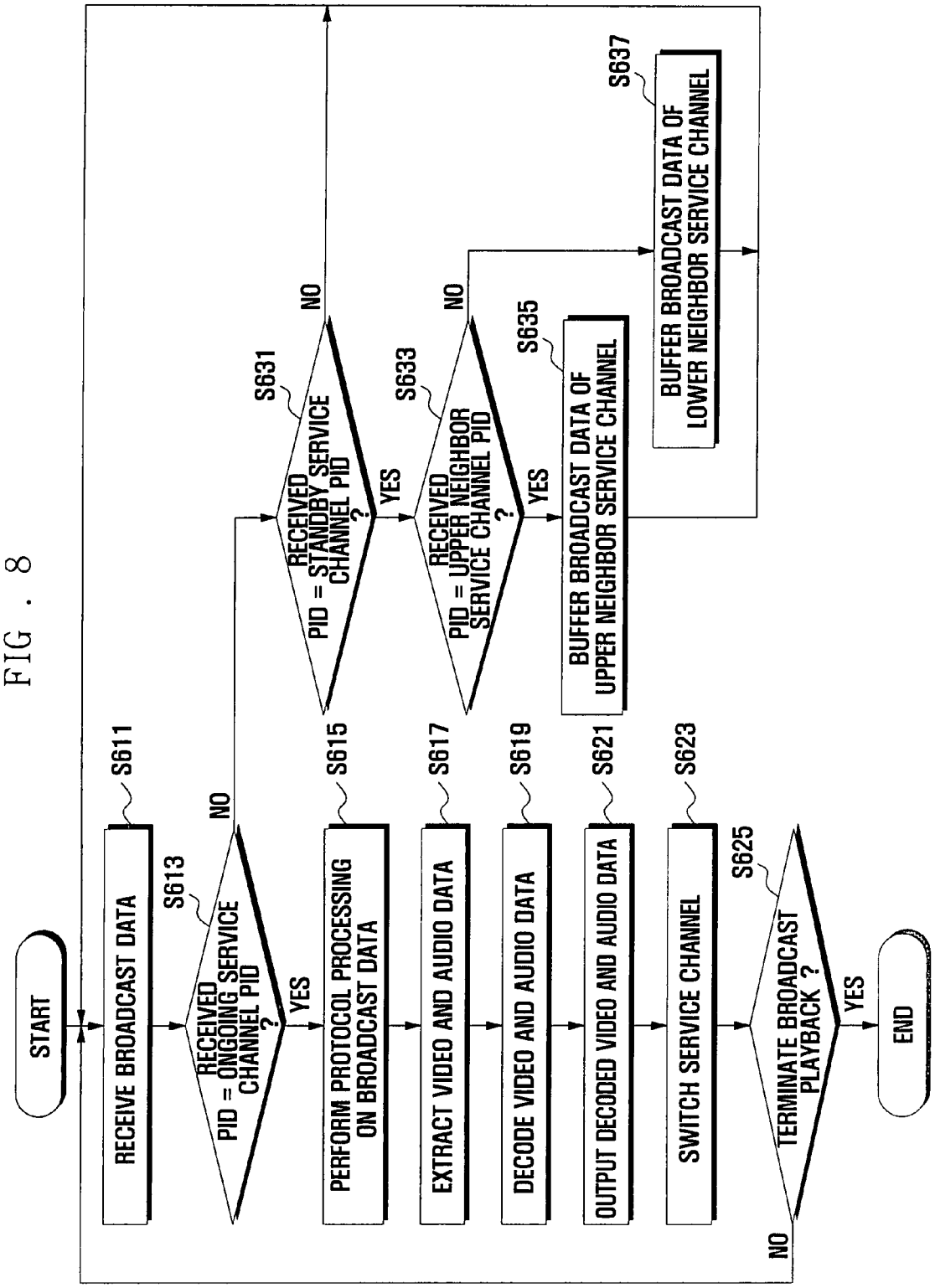
FIG. 8 is a flowchart illustrating a broadcast playback procedure of the fast channel switching method of FIG. 7.

FIG. 8 is a flowchart illustrating a broadcast playback procedure of the fast channel switching method of FIG. 7.

Referring to FIG. 8, if broadcast data are received (S611), the controller 100 determines whether a PID contained in the broadcast data is identical with the PID of the ongoing service channel (S613). If the received broadcast data have the PID of the ongoing service channel, the controller 100 controls the decapsulating an IP datagram from the received broadcast data (S615) and extracts video and audio data from the IP datagram (S617). Next, the controller 100 controls the decoding of the video and audio data (S619) and outputs the decoded video and audio data through the display unit 150 and the speaker 155 (S621). That is, the controller 100 controls to decapsulate, if a received TS packet has the PID assigned to the ongoing service channel, the IP datagram from the TS packet, extract the video and audio data from the IP datagram, and play the extracted video and audio data.

If the PID of the received broadcast data is not identical with the PID assigned to the ongoing service channel at step S613, the controller 100 determines whether the PID of the received broadcast data is identical with one of the PIDs assigned to the standby service channels (S631). In this embodiment, the standby service channels are the neighbor service channels of the ongoing service channel. If the PID of the received broadcast data is identical with one of the PIDs of the standby service channels, the controller 100 determines whether the PID is of the upper neighbor service channel or the lower neighbor service channel (S633). If the PID is of the upper neighbor service channel, the controller 100 controls the buffering of the IP datagram within an upper neighbor service channel buffer (S635). Otherwise, the buffering of the IP datagram within a lower neighbor service channel buffer (S637). For example, assuming that the ongoing service channel is CH3 as in FIG. 6B and the broadcast data contains the PID assigned for the service channel CH4, the controller 100 controls the storage unit 130 to buffer the broadcast data within a buffer assigned for the service channel CH4. If the broadcast data contains the PID assigned for the service channel CH2, i.e. the lower neighbor service channel of the ongoing service channel CH3, the controller 100 controls the storage unit 130 to buffer the broadcast data within a buffer assigned for the service channel CH2. Although two neighbor service channels, i.e., the upper and lower neighbor service channels are designated as the standby service channels of which broadcast data are to be buffered, the number of standby service channel can be changed. For example, more than two service channels (for example, CH6, CH1, CH2 and/or CH4, CH5,) can be designated as the standby service channel.

The controller 100 detects whether a channel switching signal for switching to one of the standby service channel is input while playing the broadcast data of the ongoing service channel and buffering the broadcast data of the standby service channel (S623). If a channel switching signal for switching to standby service channel is detected, the controller 100 switches to the selected standby service channel. If a channel switching signal is not detected, the controller 100 determines whether a broadcast mode termination signal is input (S625). If a broadcast mode termination signal is input, the controller 100 ends the reception of the broadcast data.

Thus, the controller 100 controls the playing of the broadcast data received through the ongoing service channel while buffering the broadcast data of the upper and lower neighbor service channel as the standby service channels, such that the buffered broadcast data are used when one of the neighbor service channels is selected in accordance with the channel switching signal.

At step S540 (FIG. 7), the controller 100 controls the playing the broadcast data of the ongoing service channel and buffer the neighbor service channels of the ongoing service channel (S540). If a channel switching signal for switching to a standby service channel is input by a navigation key (channel up/down or number key) while playing the broadcast data of the ongoing service channel and buffering the broadcast data of the standby service channels, the controller 100 performs a channel switching procedure (S550) and then returns to the broadcast playback procedure for playing the broadcast data of the new ongoing service channel (S540).

Figure 9:
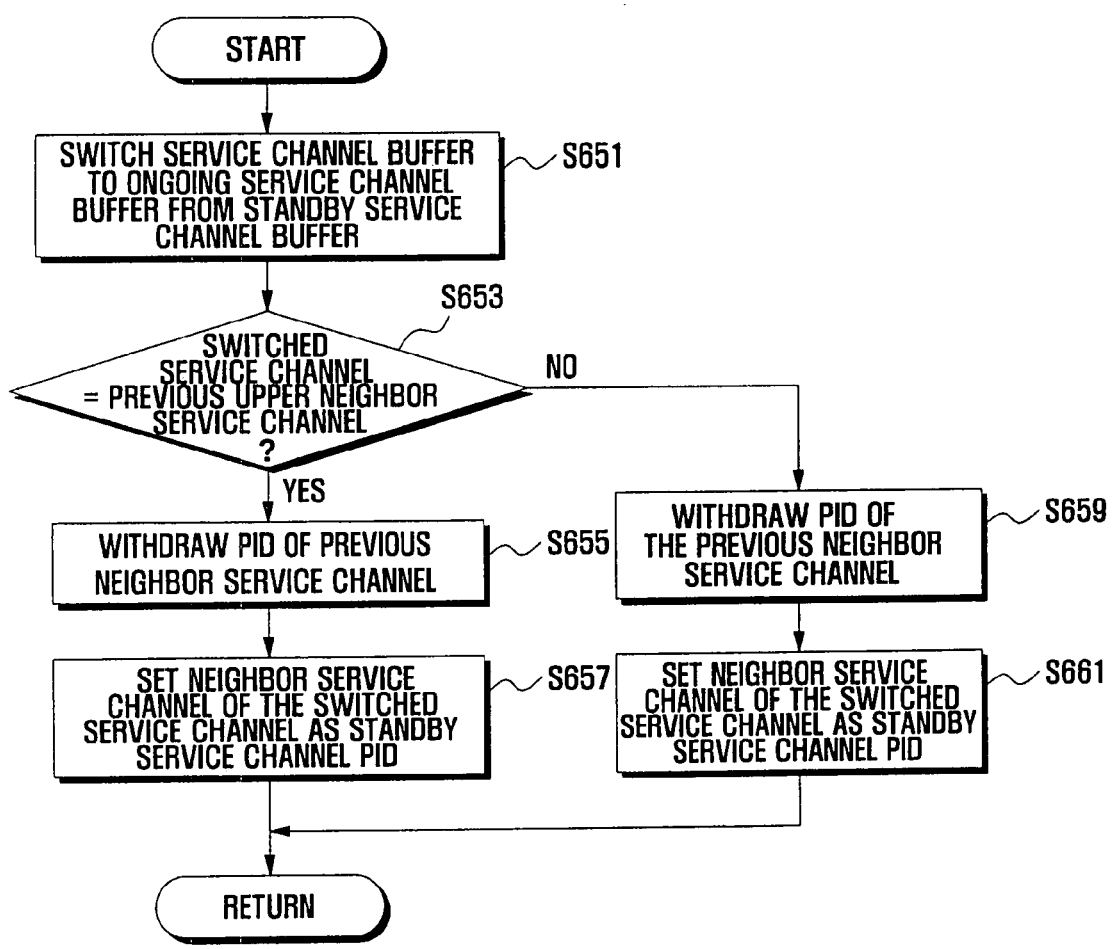
FIG. 9 is a flowchart illustrating a channel switching procedure of a fast channel switching method of FIG. 7.

FIG. 9 is a flowchart illustrating a channel switching procedure of a fast channel switching method shown in FIG. 7.

Referring to FIG. 9, if the channel switching occurs, the controller 100 sets the switched service channel as a new ongoing service channel and changes its buffer from a standby service channel buffer to an ongoing service channel buffer (S651) such that the buffered broadcast data are played as of the ongoing service channel. Accordingly, the broadcast decoder 140 decodes the broadcast data of the new ongoing service channel without delay of the data stream.

Next, the controller 100 determines whether the new ongoing service channel is an upper-numbered service channel to the previous ongoing service channel (S653). If the new ongoing service channel is an upper-numbered service channel to the previous ongoing service channel, the controller 100 withdraws the PID assigned for the previous lower-numbered service channel (S655) and sets a PID of an upper-numbered neighbor service channel of the new ongoing service channel as the PID of a standby service channel (S657). That is, if the new ongoing service channel is an upper-numbered service channel to the previous ongoing service channel, the controller 100 sets the upper and lower neighbor service channels of the new ongoing service channel as new standby service channels.

On the other hand, if the new ongoing service channel is a lower-numbered service channel to the previous ongoing service channel, the controller 100 withdraws the PID assigned for the previous upper-numbered service channel (S659) and sets a PID of a lower-numbered neighbor service channel of the new ongoing service channel as the PID of a standby service channel (S661). That is, if the new ongoing service channel is a lower-numbered service channel to the previous ongoing service channel, the controller 100 sets the upper and low neighbor service channels of the new ongoing service channel as new standby service channels.

Concerning the example of FIG. 6B, if the service channel CH4 is selected while playing the broadcast data of the service channel CH3 and buffering the broadcast data of the neighbor service channels CH2 and CH4, the controller 100 recognizes that the selected channel is the upper neighbor service channel of the ongoing service channel CH3 at step S653, withdraws the PIDs of the lower and upper neighbor service channel at step S655, and sets the PIDs of the new standby service channels CH3 and CH5 neighboring the new ongoing service channel CH4 for buffering the broadcast data thereon. If the service channel CH2 (lower channel) is selected while playing the broadcast data of the service channel CH3 and buffering the broadcast data of the neighbor service channels CH2 and CH4, the controller 100 recognizes that the selected channel is the lower neighbor service channel of the ongoing service channel at step S653, withdraws the PIDs of the lower and upper neighbor service channels CH3 and CH5 at step S659, and sets the PIDs of the new standby service channels CH1 and CH3 neighboring the new ongoing service channel CH2 for buffering the broadcast data thereon at step S661.

After the new standby service channels are set with their PIDs, the broadcast demodulator 120 performs demodulation on the broadcast data of the new ongoing and standby service channels with reference to the their PIDs, and the storage unit 130 reassigns the buffers for buffering the broadcast data of the new ongoing and standby service channels. At this time, the controller 100 changes the buffer of the previous standby service channel that is selected by channel switching operation into a playback buffer for the ongoing service channel, such that the buffered broadcast data is played without processing delay before the next burst time of the new ongoing service channel comes up. After channel switching is completed, the controller 100 performs the broadcast playback procedure at step S540 of FIG. 7.

The channel switching operation of the broadcast receiver in the broadcast mode is described with reference to FIGS. 1 to 4. If a channel switching signal for switching to a standby service channel is detected, the controller 100 controls the storage unit 130 to change the buffer of the selected standby service channel into a playback buffer such that the broadcast data buffered in the buffer are read out. That is, the controller 100 controls the second selector 340 to read the buffer of the selected standby service channel and deliver the broadcast data read out from the buffer to the broadcast decoder 140. At this time, the broadcast decoder 140 continues decoding the broadcast data without recognition of the channel switch. Accordingly, a seamless channel switching is performed without delay of the playback stream.

Before the next data burst of the new ongoing service channel is received, the buffered broadcast data are played, such that the buffer size depends on the number of the service channels and the length of the timeslot. Typically, the burst cycle is 1 to 4 seconds and the buffers 331 to 33N are determined in consideration with the burst cycle. During the playback of the buffered broadcast channel, the controller 100 resets the PIDs of the ongoing and standby service channels and reconfigures the buffers for the new ongoing and standby service channels. Preferably, the buffer size is set to contain an amount of the broadcast data sufficient to be played before the next data burst of the new ongoing service channel is received.

During the playback of the buffered broadcast data, the controller 100 determines whether the new ongoing service channel is an upper-numbered service channel to the previous ongoing service channel. If the new ongoing service channel is an upper-numbered service channel to the previous ongoing service channel, the controller 100 withdraws the PID assigned for the previous lower-numbered service channel and sets the PID of an upper-numbered neighbor service channel of the new ongoing service channel as the PID of a standby service channel. If the new ongoing service channel is a lower-numbered service channel to the previous ongoing service channel, the controller 100 withdraws the PID assigned for the previous upper-numbered service channel and sets a PID of a lower-numbered neighbor service channel of the new ongoing service channel as the PID of a standby service channel.

For example, if the service channel CH4 is selected while playing the broadcast data of the service channel CH3 and buffering the broadcast data of the neighbor service channels CH2 and CH4, the controller 100 generates a control signal for resetting the ongoing and standby service channels. Upon receiving the control signal, the broadcast demodulator 120 discards the PIDs set for the PID filter 230 and resets the PID filter 230 with the PIDs of the new ongoing service channel (CH4) and the new standby service channels (CH3 and CH5). If the service channel CH2 is selected while playing the broadcast data of the service channel CH3 and buffering the broadcast data of the neighbor service channels CH2 and CH4, the controller 100 generates a control signal for resetting the ongoing and standby service channels. Upon receiving the control signal, the broadcast demodulator 120 discards the PIDs set for the PID filter 230 and resets the PID filter 230 with the PIDs of the new ongoing service channels (CH2) and the new standby service channels (CH1 and CH3).

The controller 100 controls the broadcast demodulator 120 to output the broadcast data having the PIDs of the ongoing and standby service channels to the storage unit 130 such that the storage unit 130 buffers the broadcast data to the buffers corresponding to the ongoing and standby service channels.

If the ongoing service channel is switched in this manner, the broadcast demodulator 120 is set with the PIDs of the new ongoing service channels and the new standby service channels neighboring the ongoing service channel, and the buffers 331 to 33N are set to buffer the broadcast data identified with the PIDs such that the storage unit 130 buffers the broadcast data output from the broadcast demodulator 120 within the corresponding buffers and reads out the broadcast data of the ongoing service channel. Accordingly, when the ongoing service channel is switched to one of the standby service channels, the broadcast receiver plays the buffered broadcast data of the switched-to service channel until its next data burst is received, resulting in smooth channel switching without processing delay.

In the former embodiments, the fast channel switching method and apparatus of the present invention have been implemented with the neighbor channel-based standby service channel designation scheme. In other embodiments, the fast channel switching method and apparatus of the present invention are implemented with a favorite channel-based standby service channel designation scheme.

It is assumed that the broadcast receiver has the same structure of FIG. 1 and is a DVB-H receiver characterized with the structures of FIGS. 2 to 4. The main procedure for processing channel switching is identical with that in FIG. 7 except for the broadcast playback procedure (S540) and the channel switching procedure (S550).

Figure 10:
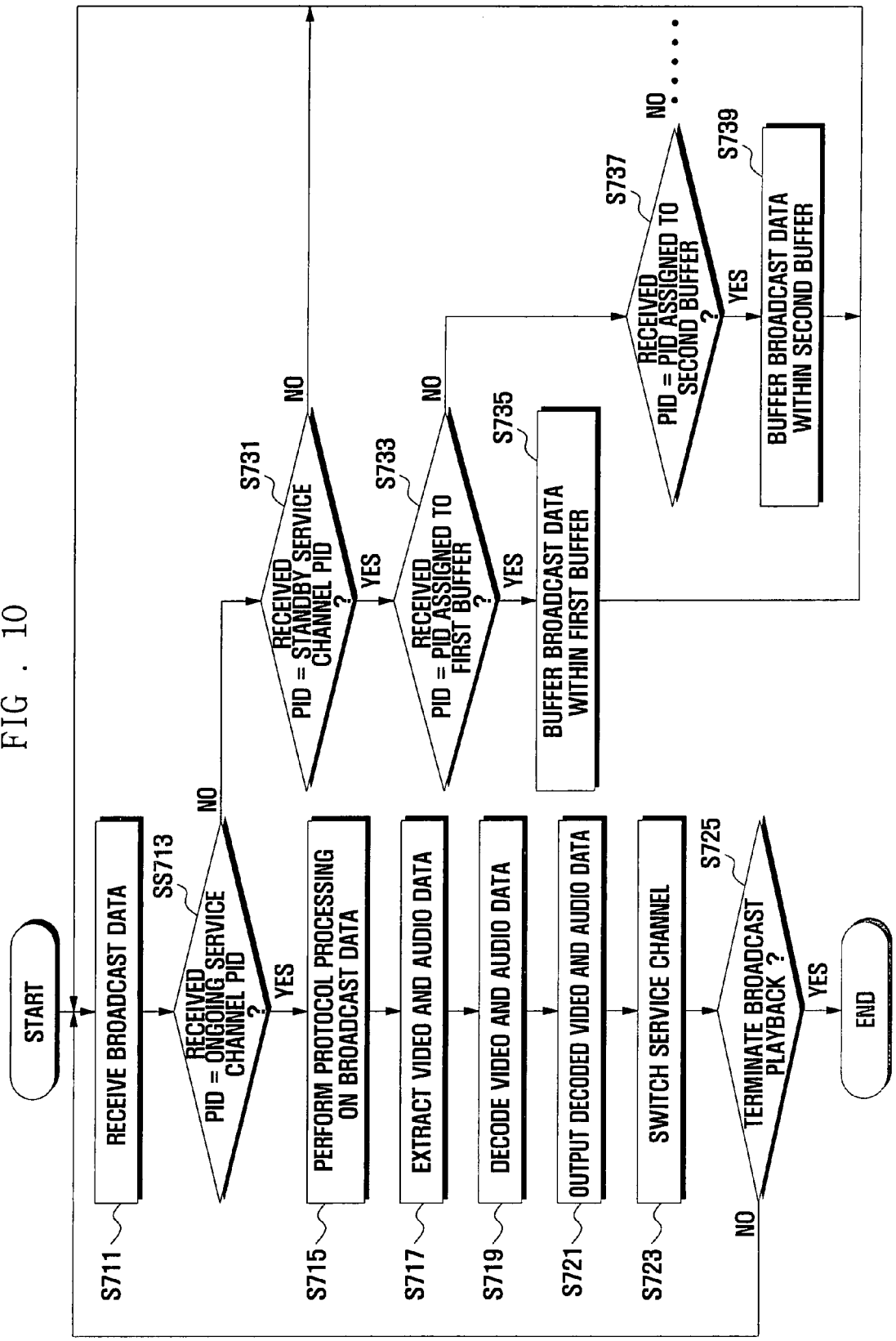
FIG. 10 is a flowchart illustrating a broadcast playback procedure of the fast channel switching method according to another embodiment of the present invention.

FIG. 10 is a flowchart illustrating a broadcast playback procedure of the fast channel switching method according to another embodiment of the present invention.

Typically, people or users have different preferences on service channels. For example, men prefer sports channels, women prefer drama and movie channels, and students prefer music and game channels. Accordingly, it can be considered to register favorite service channels in accordance with the user preference in the form of channel list.

Referring to FIG. 10, if broadcast data are received (S711), the controller 100 determines whether a PID contained in the broadcast data is identical with the PID of the ongoing service channel (S713). If the received broadcast data have the PID of the ongoing service channel, the controller 100 controls the decapsulation of an IP datagram from the received broadcast data (S715) and extracts video and audio data from the IP datagram (S717). Next, the controller 100 controls the decoding of the video and audio data (S719) and outputs the decoded video and audio data through the display unit 150 and the speaker 155 (S721), respectively. If the PID of the received broadcast data is not identical with the PID assigned to the ongoing service channel at step S713, the controller 100 determines whether the PID of the received data is identical with one of the PIDs assigned to the standby service channels (S731). In this embodiment, the standby service channels are the favorite service channels registered in accordance with the user preference. The favorite service channels can be registered by the user or selected on the basis of the analysis of channel switching pattern of the user. Also, the number of the favorite service channel can be changed or determined dependant on the number of the buffers 331 to 33N.

If the PID of the received broadcast data is identical with one of the PIDs assigned to the standby service channels, the controller 100 determines whether the PID is of a first buffer (S733). If the PID is of the first buffer, the controller 100 controls the storing of the broadcast data within the first buffer (S735). If the PID is not of the first buffer at step S733, the controller 100 determines whether the PID is of a second buffer (S737). If the PID is of the second buffer, the controller 100 controls the storing or buffering of the broadcast within a second buffer (S739). That is, the controller 100 controls the broadcast demodulator 120 to output the broadcast data having the PIDs of the ongoing and standby service channels and controls the storage unit 130 to buffer the broadcast data output from the broadcast demodulator within corresponding buffers distinguished by the PIDs. For example, assuming that the ongoing service channel is CH4 and the standby service channels, i.e. favorite channels, are CH2 and CH6 as in FIG. 6E, the controller 100 plays the broadcast data received through the ongoing service channel CH4 (S733 to S735) while buffering the broadcast data received through the standby service channels CH2 and CH6 (S737 to S739).

If a channel switching signal is input through key input unit 170, the controller 100 performs a channel switching procedure (S550, FIG. 7) and then returns to the broadcast playback procedure for playing the broadcast data of the new ongoing service channel (S540).

Figure 11:
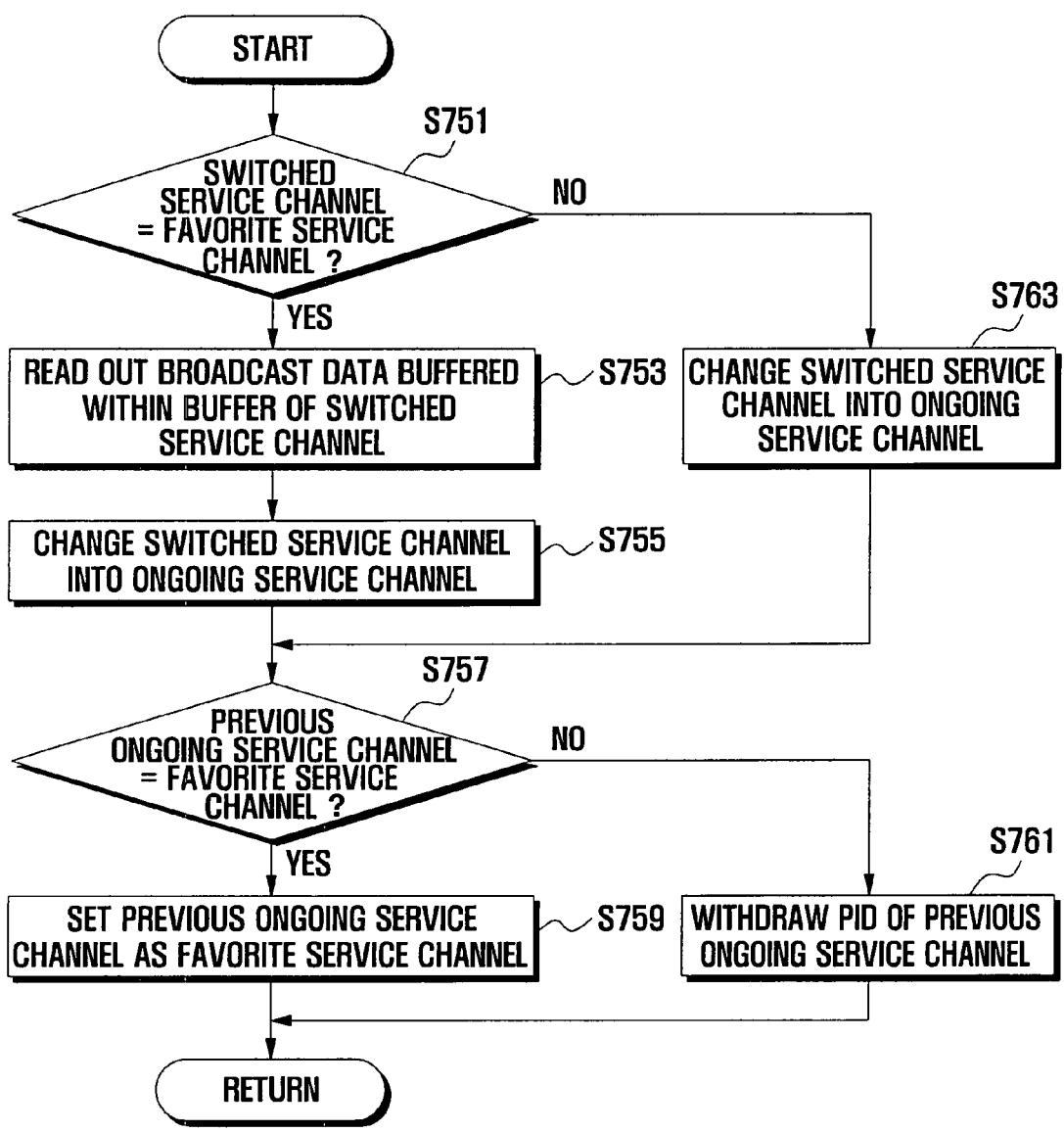
FIG. 11 is a flowchart illustrating a channel switching procedure of a fast channel switching method according to another exemplary embodiment of the present invention.

FIG. 11 is a flowchart illustrating a channel switching procedure of a fast channel switching method according to the exemplary embodiment of the present invention shown in FIG. 10.

Referring to FIG. 11, if a channel switching signal is detected, the controller 100 determines whether a switching target service channel indicated by the channel switching signal is one of the standby service channels, i.e. preset favorite service channels (S751). If the switching target service channel is one of the standby service channels, the controller 100 controls the start of playing the broadcast data buffered within the buffer assigned for the switching target service channel (S753) and sets the switching target service channel as a new ongoing service channel (S755).

After switching to the new ongoing service channel, the controller 100 determines whether the previous ongoing service channel is one of the favorite service channels (S757). If the previous ongoing service channel is one of the favorite service channels, the controller 100 sets the previous ongoing channel as one of the standby service channels (S759), or, the controller 100 withdraws the PID of the previous ongoing service channel (S761). That is, after setting the PID of the new ongoing service channel, the controller 100 sets the PIDs of the standby service channels. Here, the previous ongoing service channel can be one of the standby service channels or not according to whether the previous ongoing service channel is one of the favorite service channels.

If the selected service channel is not one of the standby service channels at step S751, the controller 100 sets the PID of the selected service channel for the ongoing service channel and carries out step S757. In this case, since there is no buffered broadcast data of the new ongoing service channel, the broadcast playback may be delayed until the next data burst is received.

Referring to the example of FIG. 6E, if a channel switching signal is input for selecting the standby service channel CH2 (or CH6), while playing the broadcast data of the ongoing service channel CH4 and buffering the broadcast data of the standby service channels CH2 and CH6, the controller 100 regards the service channel CH2 indicated by the channel switching signal as a target service channel at step S751, provides controls such that the broadcast data buffered for the standby service channel CH2 are read out at step S753, and sets the target service channel CH2 as the new ongoing service channel at step S755. Since the previous ongoing service channel CH4 is one of the favorite service channels, the controller 100 sets the previous ongoing service channel CH4 as one of the new standby service channels. On the other hand, if the channel switching signal indicates the service channel CH3 as a target service channel, the controller 100 sets the service channel CH3 as a new ongoing service channel, and sets the previous ongoing service channel CH4 as a standby service channel. In a case that a channel switching signal indicates a non-standby service channel (for example, CH1) as a target signal while playing the broadcast data of the ongoing service channel (for example, CH3) which is also not registered as one of the favorite service channels, the controller 100 sets the target service channel CH1 as a new ongoing service channel and withdraws the PID of the previous ongoing service channel CH3. At this time, the favorite service channels CH2, CH4, and CH6 are maintained as the standby service channels.

A channel switching operation, when a channel switching signal is input while buffering the broadcast data of the favorite service channels, is described with reference to FIGS. 1 to 4. In this embodiment, the channel switching is performed in consideration of 4 different situations. First situation is a case in which both the ongoing service channel and the switching target service channel are favorite service channels. Second situation is a case in which the ongoing service channel is a non-favorite service channel and the switching target service channel is a favorite service channel. Third situation is a case in which the ongoing service channel is a favorite service channel and the switching target service channel is a non-favorite service channel. And, fourth situation is a case in which both the ongoing and switching target service channels are non-favorite service channels.

In the case of the first situation, if it is determined that both the ongoing service channel and the switching target service channel are favorite service channels, the controller 100 controls the second selector 340 of the storage unit 130 to read out the broadcast data buffered within the buffer set with the PID of the switching target service channel, i.e. a new ongoing service channel. Next, the controller 100 controls the broadcast demodulator 120 to maintain the PIDs of the favorite service channels set for the PID filter 230 such that the first selector 320 writes the broadcast data of the favorite service channels within the buffers 331 to 33N assigned the PIDs of the favorite service channels. Accordingly, the output of the buffer assigned the PID of the new ongoing service channel is delivered to the broadcast decoder 140. The broadcast decoder 140 decodes the broadcast data from the buffer of the new ongoing service channel and outputs the decoded video and audio data through the display unit 150 and speaker 155. If the next data burst of the new ongoing service channel is received while playing the buffered broadcast data, the storage unit 130 stores the broadcast data within the corresponding buffer assigned the PID of the ongoing service channel so as to be output following the buffered broadcast data. At this time, the second selector 340 reads out the broadcast data store in the buffer set with the PID of the ongoing service channel. Accordingly, the broadcast decoder 140 decodes the buffered broadcast data and the broadcast data received at the next burst time of the new ongoing service channel without delay of the broadcast data stream, resulting in seamless channel switching.

In the case of the second situation, if it is determined that the ongoing service channel is a non-favorite service channel and the switching target service channel is a favorite service channel, the controller 100 controls the second selector 340 of the storage unit 130 to read out the broadcast data buffered within the buffer set with the PID of the switching target service channel, i.e. a new ongoing service channel. next the controller 100 controls the broadcast data of the broadcast demodulator 120 to maintain the PIDs of the favorite service channels set for the PID filter 230 such that the first selector 320 writes the broadcast data of the favorite service channels within the buffers 331 to 33N assigned the PIDs of the favorite service channels. Accordingly, the output of the buffer assigned the PID of the new ongoing service channel is delivered to the broadcast decoder 140. The broadcast decoder 140 decodes the broadcast data from the buffer of the new ongoing service channel and outputs the decoded video and audio data through the display unit 150 and speaker 155. If the next data burst of the new ongoing service channel is received while playing the buffered broadcast data, the storage unit 130 stores the broadcast data within the corresponding buffer assigned the PID of the ongoing service channel so as to be output following the buffered broadcast data. Since the previous ongoing service channel is non-favorite service channel, the PID of the previous ongoing service channel is withdrawn from the PID filter 230 and storage unit 130, resulting in no more buffering. In this case, the broadcast decoder 140 also decodes the buffered broadcast data and the broadcast data received at the next burst time of the new ongoing service channel without delay of the broadcast data stream.

In the case of third situation, if it is determined that the ongoing service channel is a favorite service channel and the switching target service channel is a non-favorite service channel, the controller 100 controls the second selector 340 to set a buffer for buffering the broadcast data of the switching target service channel, i.e. a new ongoing service channel. Since there is no buffered broadcast data for the switching target service channel, data streams played on the display 150 and output through the speaker 155 may be interrupted. After setting the buffer, the controller 100 controls the broadcast demodulator 120 to maintain the PIDs of the favorite service channels set for the PID filter 230 and adds the PID of the new ongoing service channel to the PID filter 230 such that the first selector 320 writes the broadcast data of the favorite service channels and the new ongoing service channel within the corresponding buffers assigned the PIDs of the favorite service channels and the new ongoing service channel. In this case, playback of the broadcast data may be delayed until receiving the next data burst of the new ongoing service channel.

In the case of the fourth situation, if it is determined that both the ongoing and switching target service channels are non-favorite service channels, the controller 100 controls the second selector 340 of the storage unit 130 to set a buffer for buffering the broadcast data of the switching target service channel, i.e. a new ongoing service channel. Since there is no buffered broadcast data for the switching target service channel, data streams played on the display 150 and output through the speaker may be interrupted. After setting the buffer, the controller 100 controls the broadcast demodulator 120 to maintain the PIDs of the favorite service channels set for the PID filter 230 and adds the PID of the new ongoing service channel to the PID filter 230 such that the first selector 320 write the broadcast data of the favorite service channels and the new ongoing service channel within the corresponding buffers assigned the PIDs of the favorite service channels and the new ongoing service channel and withdraws the PID of the previous ongoing service channel from the PID filter 230. The controller 100 also controls the first selector 320 of the storage unit 130 to write the broadcast data received through the favorite service channels and the new ongoing service channel into the corresponding buffers. In this case, playback of the broadcast data may be delayed until receiving the next data burst of the new ongoing service channel.

In the cases of the third and fourth situations, channel switching delay may occur. In this embodiment, one of the buffers 331 to 33N can be reserved for storing specific multimedia data which is output when the non-favorite service channel is selected as the switching target service channel. The buffer storing the multimedia data is selected by the second selector 340 when a non-favorite service channel is selected as the switching target service channel such that the multimedia data are played until the next burst data of the new ongoing service channel are received, resulting in avoidance of data stream breakage. The multimedia data can be stored in the separate memory 160 rather than a buffer of the storage unit 130. The size of the multimedia data is determined in consideration of the channel switching delay.

In this embodiment, the favorite channel-based fast channel switching method creates favorite channel list consisting of channels selected by the user or in accordance with a preference analysis, buffers the broadcast data while playing the broadcast data of an ongoing service channel, and plays, if one of the favorite service channels is selected as a new ongoing service channel, the buffered broadcast data, without channel switching delay.

As described above, the standby service channels represent the neighbor service channels in the first embodiment and the favorite service channels in the second embodiment. The broadcast data of the standby service channels are buffered while the broadcast data received through the ongoing channel are played. If a channel switching is detected such that one of the standby service channels is selected, the buffered broadcast data of the selected standby service channel are played until the next data burst of the selected standby service channel. Accordingly, the channel switching is quickly performed with processing delay and a subscriber can watch the display image with delay at the time when the channel switching occurs. In the following embodiment, the fast channel switching method is implemented with both the neighbor channel buffering and favorite channel buffering techniques. Channel switching can be performed with the navigation keys, i.e. the up and down keys, or with the number key or memory keys matched with specific channels. In the case using the navigation keys, the service channels can be sequentially selected when the navigation key is pressed, whereby it is advantageous to use the neighbor channel-based standby service channel designation scheme. In the case using the number keys, however, the favorite channel-based standby service channel designation scheme is advantageous since the channel is randomly selected. Accordingly, by adopting both the neighbor channel-based standby service channel designation scheme and the favorite channel-based standby service channel designation for the fast switching method, the reliability of the fast channel switching method can be improved.

The main procedures of the fast channel switching method according to the third embodiment of the present invention is identical with that of FIG. 7 except for the playback procedure (S540) and the channel switching procedure (S550).

Figure 12:
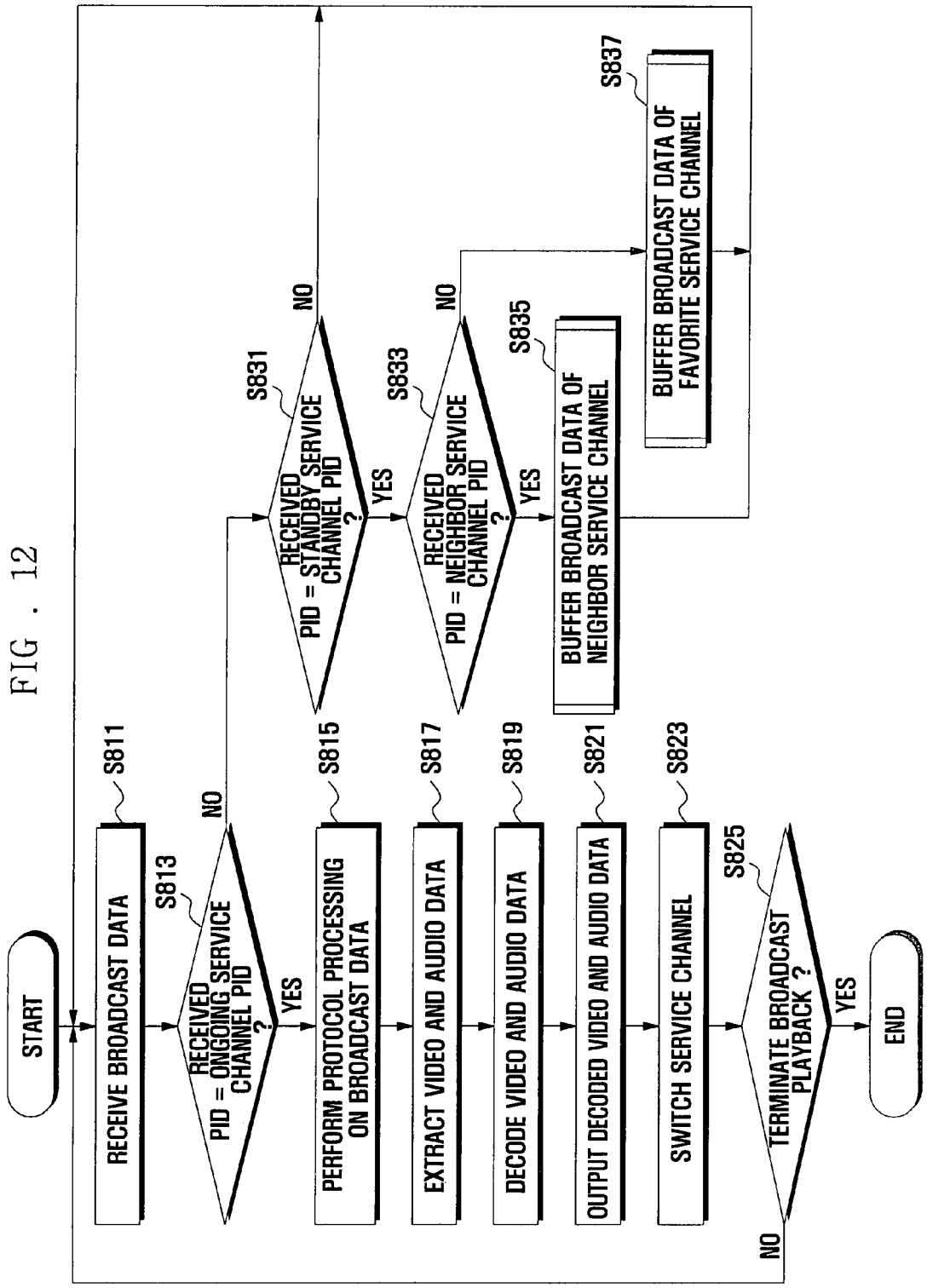
FIG. 12 is a flowchart illustrating a broadcast playback procedure of a fast channel switching method according to another exemplary embodiment of the present invention.

FIG. 12 is a flowchart illustrating a broadcast playback procedure of a fast channel switching method according to this third exemplary embodiment of the present invention. In this embodiment, broadcast data of the neighbor service channels and the favorite service channels are buffered.

Referring to FIG. 12, if broadcast data are received (S811), the controller 100 determines whether a PID contained in the broadcast data is identical with the PID of the ongoing service channel (S813). If the received broadcast data have the PID of the ongoing service channel, the controller 100 controls the decapsulation of an IP datagram from the received broadcast data (S815) and extracts video and audio data from the IP datagram (S817). Next, the controller 100 controls the decoding of the video and audio data (S819) and outputting of the decoded video and audio data through the display unit 150 and the speaker 155 (S821), respectively. If the PID of the received broadcast data is not identical with the PID assigned to the ongoing service channel at step S813, the controller 100 determines whether the PID of the received data is identical with one of the PIDs assigned to one of the standby service channels (S831). If the PID of the received data is identical with one of the PIDs assigned to one of the standby service channels, the controller 100 determines whether the PID is of one of the neighbor service channels (S833). If the PID is of one of the neighbor service channels, the controller 100 buffers the broadcast data within the buffer of the corresponding neighbor service channel (S835). At this time, the broadcast data can be buffered in a manner identical with steps 633 to 637 of FIG. 8. If the PID is not of one of the neighbor service channels, the controller 100 buffers the broadcast data within the buffer of the corresponding favorite service channel (S837).

Figure 13:
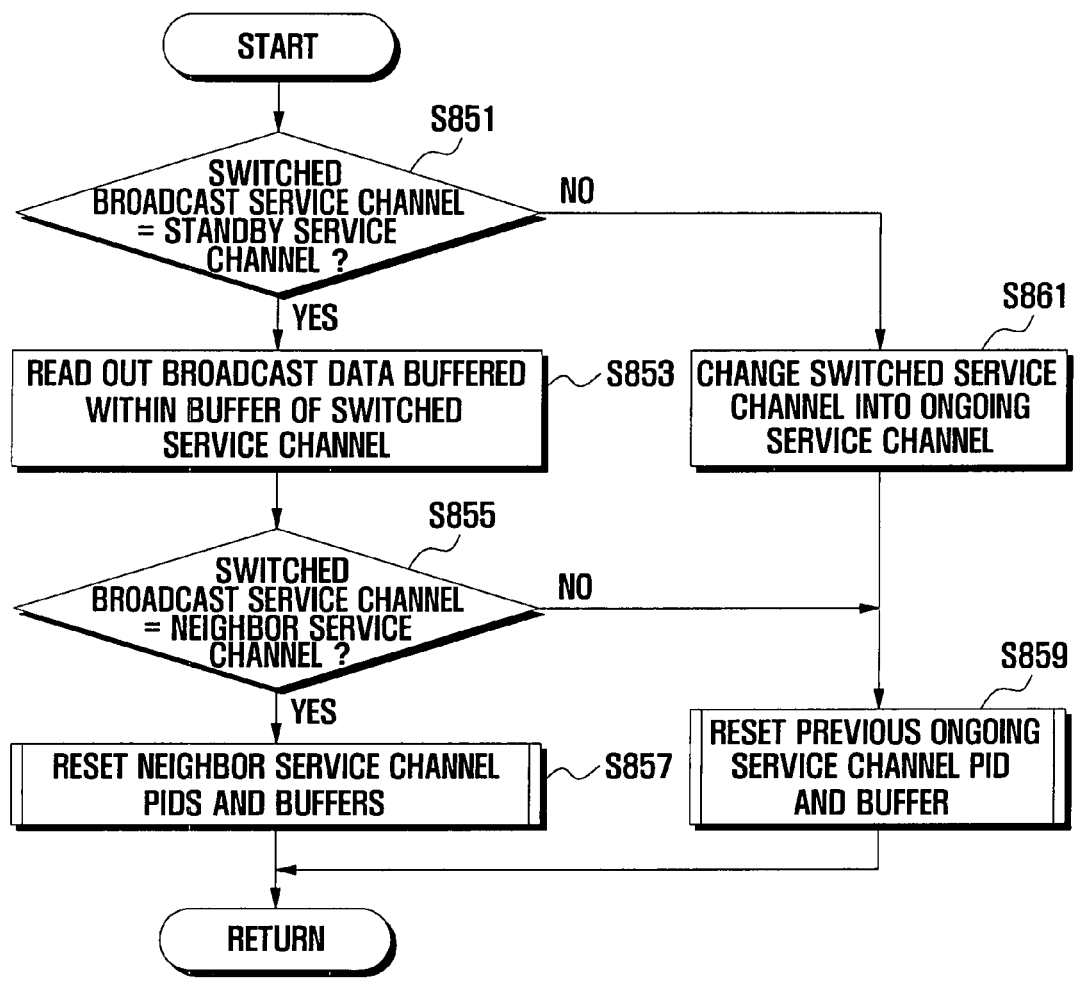
FIG. 13 is a flowchart illustrating a channel switching procedure of a fast channel switching method according to another exemplary embodiment of the present invention.

FIG. 13 is a flowchart illustrating a channel switching procedure of a fast channel switching method according to this third exemplary embodiment of the present invention.

Referring to FIG. 13, when a channel switching signal is detected, the controller 100 determines whether a switching target service channel indicated by the channel switching signal is one of the standby service channels (S851). If the switching target service channel is one of the standby service channels, the controller 100 controls the output of the broadcast data buffered within the buffer assigned for the switching target standby service channel (S853) and determines whether the switching target service channel is one of the neighbor service channels (S855). If the switching target service channel is one of the neighbor service channels, the controller 100 resets PIDs of the PID filter 230 of the broadcast demodulator 120 and the buffers of the storage unit 130 for new neighbor service channels (S857). The PID reset can be performed in a manner identical with steps 653 to 661 of FIG. 9. If the switching target service channel is not one of the neighbor service channels, the controller 100 resets PIDs of the PID filter 230 of the broadcast demodulator 120, particularly the PID of the previous ongoing service channel, and the buffers 331 to 33N of the storage unit 130 for the favorite service channels (S859). At this time, the PID reset can be performed in a manner identical with steps S757 to S761 of FIG. 11. In the meantime, if the switching target service channel is not one of the standby service channels, the controller 100 sets the switching target service channel as a new ongoing service channel (S861) and then resets PIDs of the PID filter 230 of the broadcast demodulator 120 and the buffers 331 to 33N of the storage unit 130 for the favorite service channels (S859).

The neighbor service channels and the favorite service channels may be overlapped. In this case, it is preferred that the controller 100 controls the broadcast data of the overlapped service channel within one buffer of the storage unit 130.

In order to prevent the same broadcast data from being buffered within two buffers, standby service channel designation priorities can be considered. That is, if the favorite service channel has a higher designation priority, the controller 100 checks whether a neighbor service channel is registered as a favorite service channel. If the neighbor service channel is registered as a favorite service channel, the controller 100 manages the service channel as the favorite service channel rather than the neighbor service channel. On the other hand, if the neighbor service channel has a higher designation priority, the controller 100 manages the overlapped service channel as the neighbor service channel rather than the favorite service channel. In the following embodiment, it is assumed that the favorite service channel has a higher designation priority.

Figure 14:
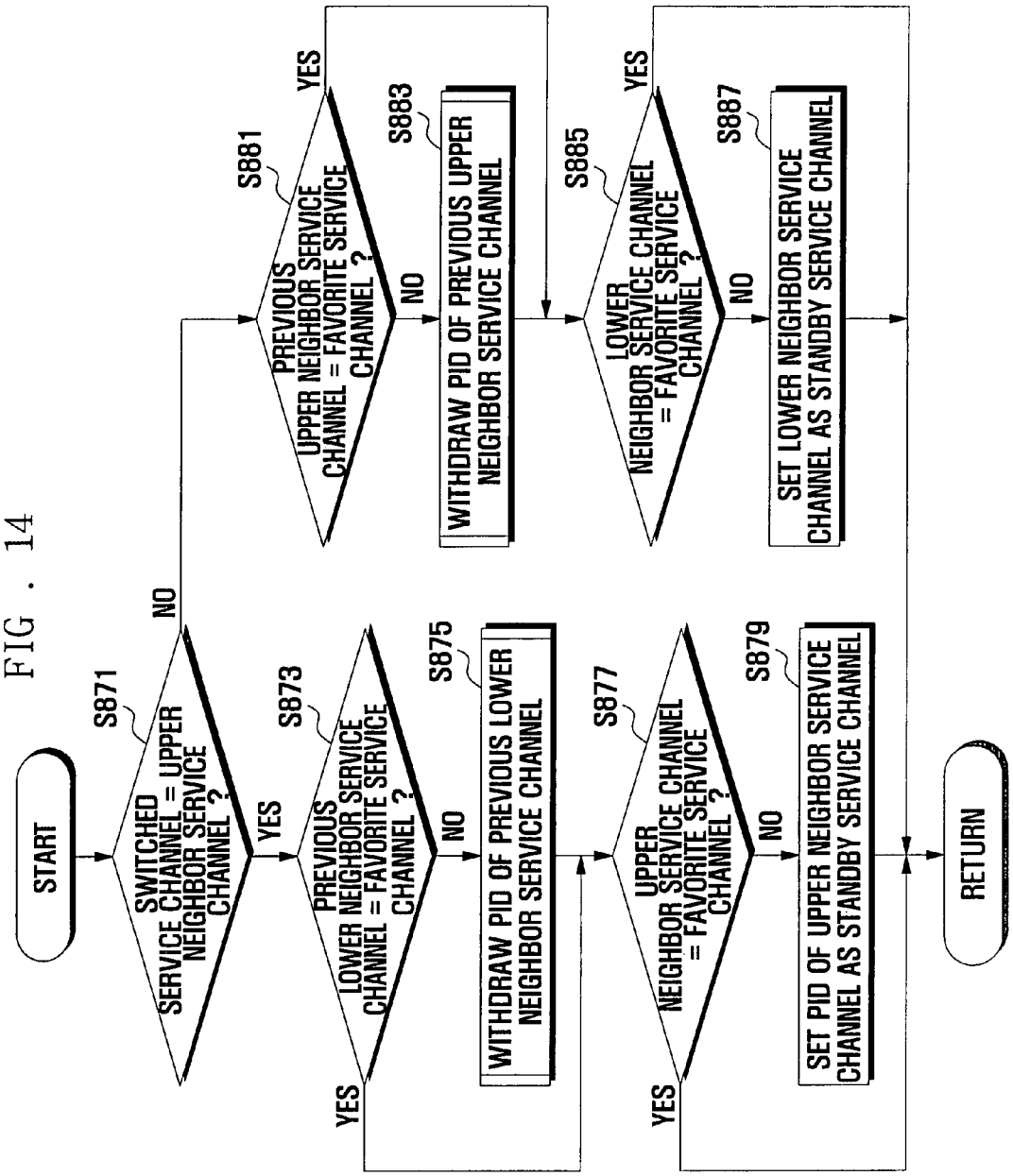
FIG. 14 is a flowchart illustrating a standby service channel setting procedure of the fast channel switching method according to an exemplary embodiment of the present invention.

FIG. 14 is a flowchart illustrating a standby service channel setting procedure of the fast channel switching method according to an exemplary embodiment of the present invention. If it is determined that a switching target service channel is one of the standby service channels, the controller 100 determines whether the switching target service channel is one of the neighbor service channels. If the switching target service channel is one of the neighbor service channels, the controller 100 also checks the switching target service channel is one of the favorite service channels. If the switching target service channel belongs to both the neighbor and favorite service channels, the controller 100 manages the switching target service channel as a favorite service channel so as to maintain the PID and buffer of the favorite service channel corresponding to the switching target service channel. However, if the switching target service channel belongs to only the neighbor service channels, the controller 100 resets the PID filter and the buffers.

Referring to FIG. 14, if a switching control signal is input, the controller 100 determines whether the switching target service channel indicated by the switching control signal is the upper neighbor service channel (S871). If the switching target service channel is the upper neighbor service channel, the controller 100 determines whether the ongoing service channel is one of the favorite service channels (S873). If the ongoing service channel is one of the favorite service channels, the controller 100 maintains the PID and buffer of the ongoing service channels as a favorite service channel, or, the controller 100 withdraws the PID of the previous ongoing service channel from the PID filter 230 and disables the buffer of the previous ongoing service channel in the storage unit 130 (S875). Next, the controller 100 determines whether the upper neighbor service channel of the switched-to target service channel is one of the favorite service channels (S877). If the upper neighbor service channel of the switched-to target service channel is one of the favorite service channels, the controller 100 maintains the PID and buffer of the upper neighbor service channel. Otherwise, the controller 100 adds the PID of the upper neighbor service channel to the PID filter 230 and creates a buffer in the storage unit 130 for the upper neighbor service channel (S879).

If the switched-to target service channel is not the upper neighbor service channel at step S871, the controller 100 regards the switching target service channel as the lower neighbor service channel and determines whether the previous upper neighbor service channel is one of the favorite service channels (S881). If the previous upper neighbor service channel is one of the favorite service channels, the controller 100 maintains the PID and buffer of the previous upper neighbor service channel. Otherwise, the controller 100 disables the PID of the previous upper neighbor service channel in the PID filter 230 and disables the buffer of the previous upper neighbor service channel in the storage unit 130 (S883). Next, the controller 100 determines whether the lower neighbor service channel of the switching target service channel is one of the favorite service channels (S885). If the lower neighbor service channel of the switching target service channel is one of the favorite service channels, the controller 100 maintains the PID and buffer of the lower neighbor service channel. Otherwise, the controller 100 adds the PID of the lower neighbor service channel to the PID filter 230 and creates a buffer for the lower neighbor service channel (S887).

A service channel buffering mechanism is described hereinafter with reference to FIG. 6A. In the embodiment, the broadcast data of the ongoing service channel and the service channels CH1, CH2, and CH4 to CH6 are buffered. Accordingly, when the ongoing service channel is switched to another channel, the broadcast data buffered for the new ongoing service channel are read out to be played, thereby reducing channel switching delay. The buffering operation can be executed in a sequential order or a directional order.

The sequential order-based buffering mechanism is described with reference to FIG. 6A. In FIG. 6A, the ongoing service channel is CH3, a number of the standby service channels is 2, and the buffering is performed in an ascending order.

The controller 100 sets up the broadcast demodulator 120 with the PIDs of the service channels CH3 to CH5 and controls the second selector 340 to read out the broadcast data stored in the buffer of the storage unit 130 assigned for the CH3. In this case, PID filter 230 of the broadcast demodulator 120 filters the broadcast data of CH3, CH4, and CH5. The controller 100 controls the first selector 320 to switch the broadcast data output from the broadcast demodulator 120 to the buffers such that the broadcast data of CH3, CH4, and CH5 are buffered in the buffers assigned for channels CH3, CH4, and CH5. Next, the controller 100 resets the PID filter 230 of the broadcast demodulator 120 with the PIDs of the CH3, CH6, and CH1 for buffering the broadcast data of the corresponding service channels at their burst times. The number of the service channels to be buffered can be changed by the user configuration. Also, the buffering can be performed in a descending order. In this case, the buffering is performed in an order of CH2, CH1, and CH6.

The directional order-based buffering mechanism is described with reference to FIG. 6A. In FIG. 6A, the ongoing service channel is CH3. In the broadcast mode, the controller 100 sets up the PID filter 230 of the broadcast demodulator 120 with the PIDs of the ongoing channels CH3 and the neighbor service channels CH4 and CH2 and controls the second selector 340 to read out the broadcast data stored in the buffer assigned for the ongoing service channel CH3 to the broadcast decoder 140. At this time, the PID filter 230 filters the broadcast data having the PIDs of the service channels CH2, CH3, and CH4. The controller 100 controls the first selector 320 to switch the broadcast data output from the broadcast demodulator 120 to the buffers such that the broadcast data of the CH2, CH3, and CH4 are buffered in the buffers assigned for channels CH2, CH3, and CH4. Next, the controller 100 resets the PID filter 230 of the broadcast demodulator 120 with the PIDs of the CH3, CH1, and CH5 for buffering the broadcast data of the corresponding service channels at their burst times. The number of the service channels can be changed by the user configuration.

In the case that the buffering mechanism operates with the favorite service channels, one of the standby service channel selection can be excluded. That is, if the channel buffering is configured with a sequential order buffering, an ongoing service channel CH1, a favorite service channel CH5, and one (1) standby service channel, the standby service channel can be selected in association with the ongoing service channel, favorite service channel, and sequential ordering. Accordingly, the PID filter 230 is set with the PIDs of CH3, CH4, and CH5 in the first time frame, set with PIDs of CH3, CH5, and CH6 in the second time frame, and set with PIDs of CH3, CH6, and CH1 in the third time frame. This can be adopted with the directional buffering mechanism. In the case that a favorite service channel is set as the standby service channel, the controller 100 sets the PID of the service channel next to the favorite service channel as the standby service channel.

Figure 15:
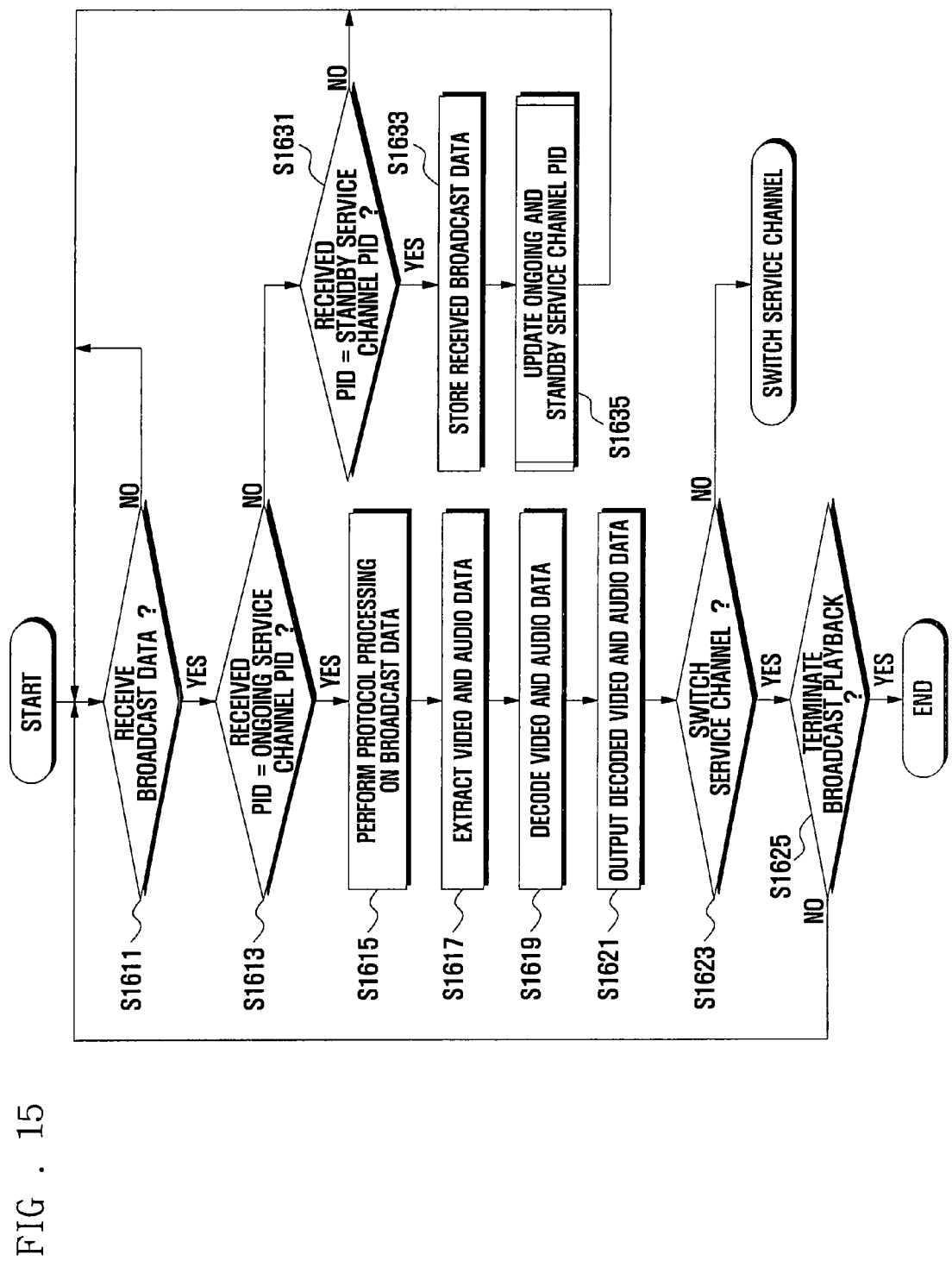
FIG. 15 is a flowchart illustrating a broadcast playback procedure of a fast channel switching method according to another exemplary embodiment of the present invention.

FIG. 15 is a flowchart illustrating a broadcast playback procedure of a fast channel switching method according to an exemplary embodiment of the present invention.

Referring to FIG. 15, if broadcast data are received, the controller 100 detects the broadcast data (S1611), the controller 100 determines whether a PID of the received broadcast data is identical with the PID of the ongoing service channel (S1613). If the PID of the received broadcast data is identical with the PID of the ongoing service channel, the controller 100 controls the decapsulation of an IP datagram from the received broadcast data (S1615) and extraction of video and audio data from the IP datagram (S1617). Next, the controller 100 controls the decoding of the video and audio data (S1619) and outputting of the decoded video and audio data through the display unit 150 and the speaker 155 (S1621).

If the PID of the received broadcast data is not identical with the PID of the ongoing service channel at step S1613, the controller 100 determines whether the PID of the received broadcast data is identical with one of the PIDs of the standby service channels (S1631). If the PID of the received data is identical with one of the PIDs of the standby service channels, the controller 100 stores the broadcast data in the buffer assigned for the corresponding standby service channel (1633) and resets the PID filter and buffers with the PIDs of the service channels to be buffered in the next time frame (S1635).

If the PID of the received data is not identical with one of the PIDs of the standby service channels, the controller 100 continues monitoring the broadcast data.

Figure 16:
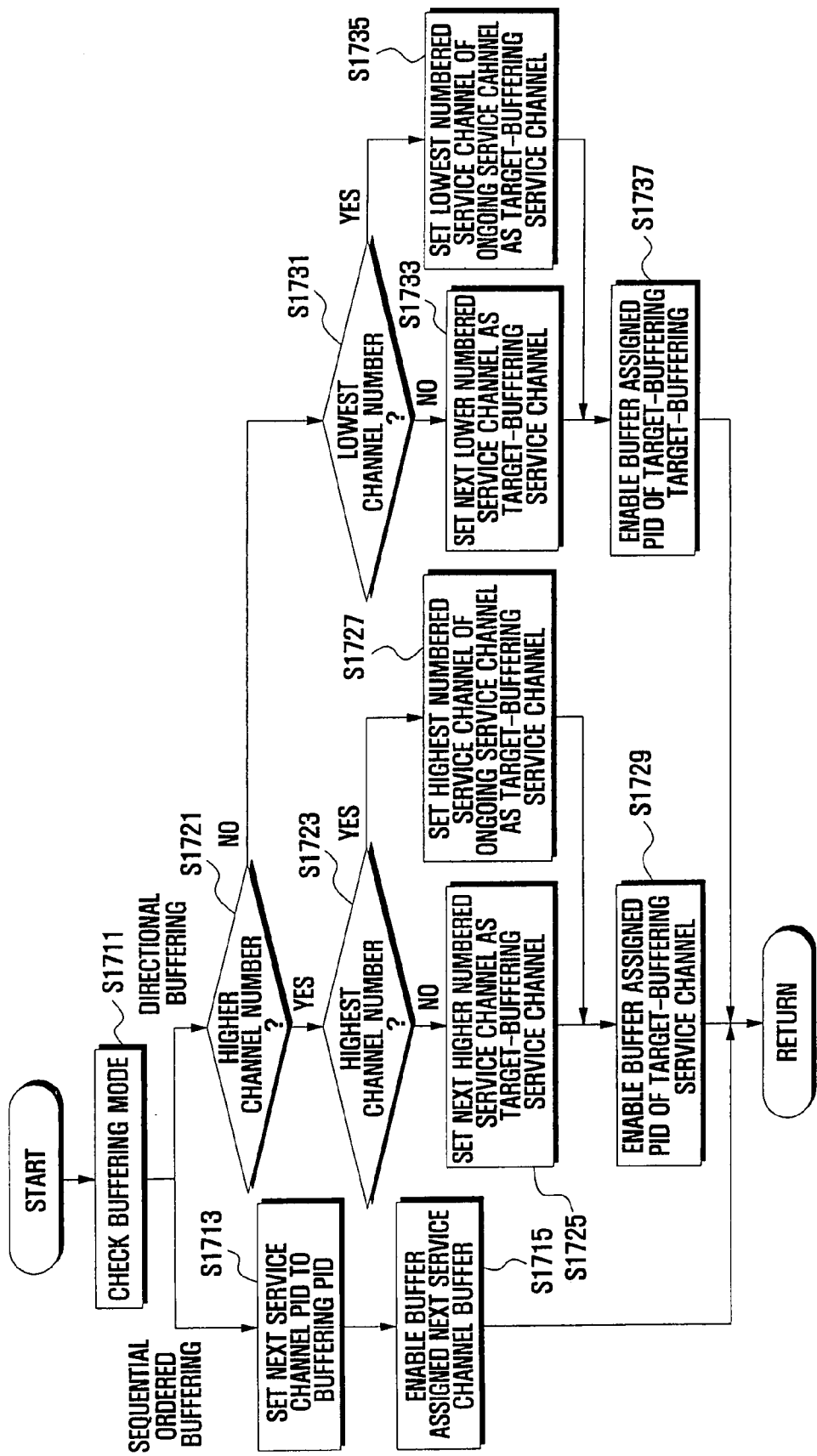
FIG. 16 is a flowchart illustrating a standby channel buffering procedure of FIG. 15 when no favorite service channels are set.
Figure 17:
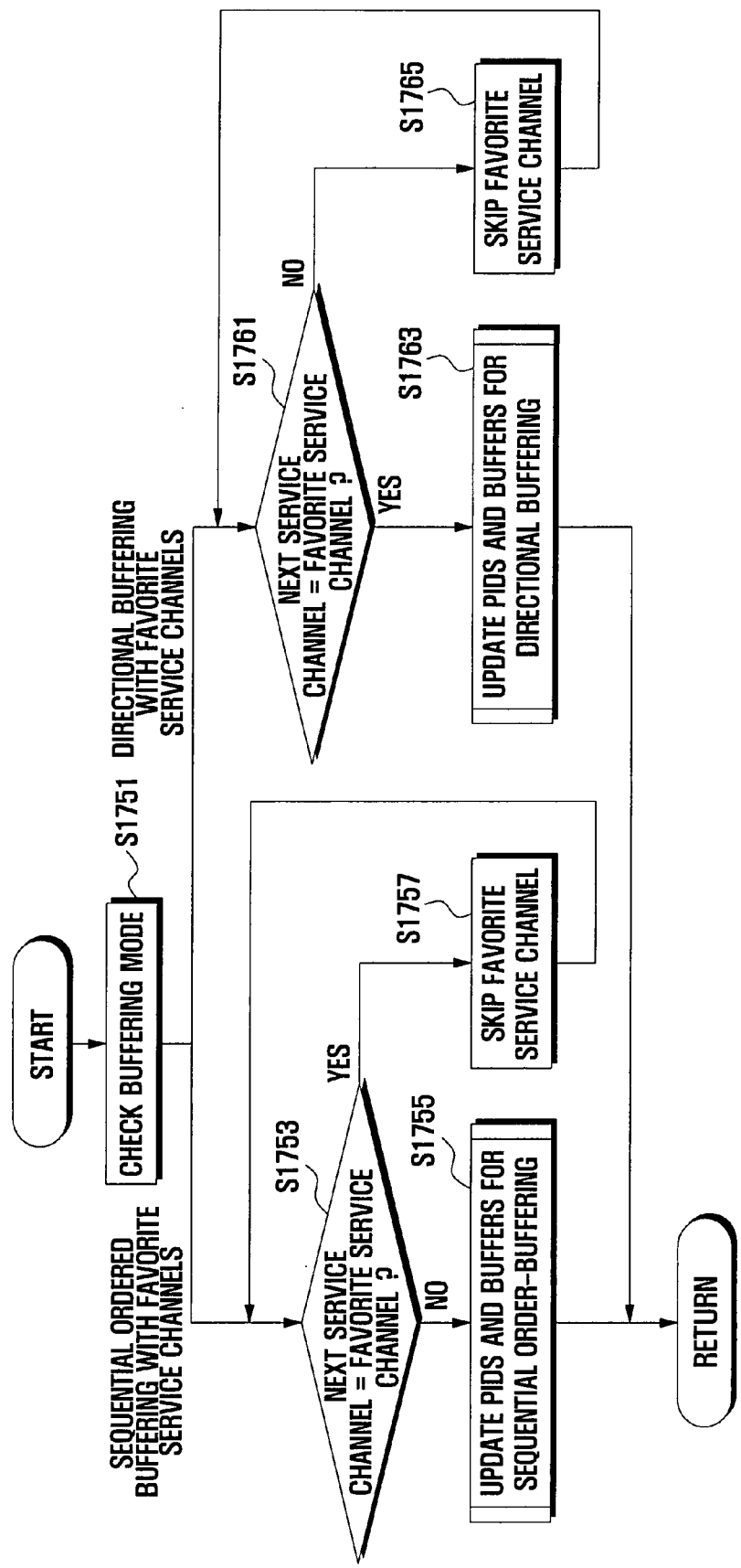
FIG. 17 is a flowchart illustrating a standby channel buffering procedure of FIG. 15 when favorite channels are set.

The PID reset procedure of step S1635 can be performed in accordance with the buffering mechanism determined at step S530 of FIG. 7, which is depicted in FIGS. 16 and 17 in detail.

FIG. 16 is a flowchart illustrating a standby channel buffering procedure of FIG. 15 when no favorite service channels are set.

Referring to FIG. 16, the controller 100 checks a buffering mode of the broadcast receiver (S1711). If the broadcast receiver operates in a sequential order-buffering mode, the controller 100 determines the service channel to be buffered at a next burst time, sets the broadcast demodulator 120 and the storage unit 130 with the PID of the next service channel to be buffered (S1713), and then enables the buffer assigned the PID of the next service channel (S1715). In the sequential order-buffering mode, the channel buffering can be performed in an ascending channel number order or a descending channel number order. Also, the number of the channels to be buffered in a frame time can be changed. Accordingly, the controller 100 determines the PIDs of the service channels to be buffered in consideration of the number of the standby service channels and the buffering mode.

Assuming that the number of the standby service channel is 2, the current-buffering service channel is CH2, and the buffering mode is a descending channel number order mode in the example of FIG. 6A in which a time frame consists of 6 service channels CH1 to CH6 including an ongoing service channel CH3, the controller 100 sets the CH6 as the target-buffering service channel having the low channel number as much as 2. If the current-buffering service channel is CH6, the target-buffering service channel becomes CH4.

If the broadcast receiver is set up with a directional order-buffering mode, the controller 100 determines whether the current-buffering service channel has a higher or lower channel number than the ongoing service channel (S1721). If the current-buffering service channel has a higher channel number than the ongoing service channel, the controller 100 determines whether the channel number of the current-buffering service channel is the highest channel number (S1723). If the channel number of the current-buffering service channel is not the highest channel number, the controller 100 selects the service channel having a next channel number as the target-buffering service channel (S1725). On the other hand, if the channel number of the current-buffering service channel is the highest channel number, the controller 100 selects highest numbered service channel of the ongoing service channel as the target-buffering service channel (S1727). After selecting the target-buffering service channel, the controller 100 enables the buffer assigned the PID of the target-buffering service channel (S1729). If the current-buffering service channel has a lower channel number than the ongoing service channel at step S1721, the controller 100 determines whether the channel number of the current-buffering service channel is the lowest channel number (S1731). If the channel number of the current-buffering service channel is not the lowest channel number, the controller 100 selects the service channel having a next lower channel number as the target-buffering service channel (S1737). On the other hand, if the channel number of the current-buffering service channel is the lowest channel number, the controller 100 sets the lowest numbered service channel of the ongoing service channel as the target-buffering service channel (S1735). After selecting the target-buffering service channel, the controller 100 enables the buffer assigned the PID of the target-buffering service channel (S1737).

Assuming that the buffering mode is the directional buffering mode, the current-buffering service channel is CH5, upper service channels are CH4 to CH6 (or CH4 and CH5), and lower service channels are CH2 and CH1 (or CH2, CH1, and CH6) in the example of FIG. 6A in which a time frame consists of 6 service channels CH1 to CH6 including an ongoing service channel CH3, the controller 100 sets the service channel CH6, which is the service channel having the next higher channel number, as the target-buffering service channel. If the current-buffering service channel is CH2, the target-buffering service channel becomes CH1. In the case that the current-buffering service channel is CH1, the controller 100 sets the next higher numbered service channel CH2 as the target-buffering service channel.

FIG. 17 is a flowchart illustrating a standby channel buffering procedure of FIG. 15 when favorite channels are set.

Typically, people or users have different preferences regarding service channels. For example, men prefer sports channels, women prefer drama and movie channels, and students prefer music and game channels. Accordingly, it can be considered to register favorite service channels in accordance with the user preference in the form of favorite channel list.

Referring to FIG. 17, the controller 100 checks a buffering mode of the broadcast receiver (S1751). If the broadcast receiver 100 operates in a sequential order-buffering mode, the controller 100 determines whether a next ordered service channel is a favorite service channel (S1753). If the next ordered service channel is not a favorite service channel, the controller 100 performs the service channel buffering in the same manner of steps S1713 to S1715 of FIG. 16 (S1755). In contrast, if a next ordered service channel is a favorite service, the controller 100 skips the service channel (S1757) and repeats step S1753.

Concerning the example of FIG. 6A in which a time frame consists of 6 service channels CH1 to CH6 including an ongoing service channel CH3, a favorite service channel CH5, and a current buffering service channel CH4, and the target buffering channel number increases by 1 in an ascending order, the controller 100 detects that the next service channel CH5 is a favorite service channel at step S1753 so skips the service channel CH5 and then repeats the favorite channel checking process with the next service channel CH6 at step 1753.

If the broadcast receiver 100 operates in a directional order-buffering mode, the controller 100 determines whether a next ordered service channel is a favorite service channel (S1761). If the next ordered service channel is not a favorite service channel, the controller 100 performs the service channel buffering in the same manner of steps S1721 to S1737 of FIG. 16 (S1763). In contrast, if a next ordered service channel is a favorite service channel, the controller 100 skips the service channel (S1765) and repeats step S1761.

Concerning the example of FIG. 6A in which a time frame consists of 6 service channels CH1 to CH6 including an ongoing service channel CH3, a favorite service channel CH5, and a current buffering service channel CH4, and the target buffering channel number increases by 1 in a ascending order, the controller 100 detects that the next service channel CH5 is a favorite service channel at step S1761 so as to skips the service channel CH5 at step S1765 and then repeats the favorite channel checking process with the next service channel CH6 at step S1761.

If a channel switching command is detected while operating in such buffering mode, the controller 100 detects the channel switching command at step S1623 of FIG. 15 and performs the channel switching procedure S550 of FIG. 7. The controller 100 can thus perform seamless channel switching by playing, when the ongoing service channel is switched to another service channel, the broadcast data buffered in the buffer assigned the PID of the new ongoing service channel. If a key input for ending the broadcast playback mode while playing the broadcast data of the ongoing service channel is detected, the controller 100 ends the broadcast playback mode.

In this embodiment, the broadcast data of all service channels are buffered while the broadcast data of the ongoing service channel is played, whereby the channel switching to another channel can be quickly performed without displaying a blank or black screen between the video screens of the old and new ongoing service channels by playing the buffered broadcast data of the new ongoing service channel.

The controller 100 controls the buffering of the broadcast data of all the service channels while playing the broadcast data of the ongoing service channel as described with reference to FIG. 15 at step S540 of FIG. 7. The buffered data are used for quick and seamless channel switching. At step S540, if a channel selection command input through the key input unit 170 (using channel up/down key or number keys) is detected, the controller 100 performs the channel switching procedure of step S550 and then enters the broadcast playback procedure S540 for playing the broadcast data of the new ongoing service channel.

Figure 18:
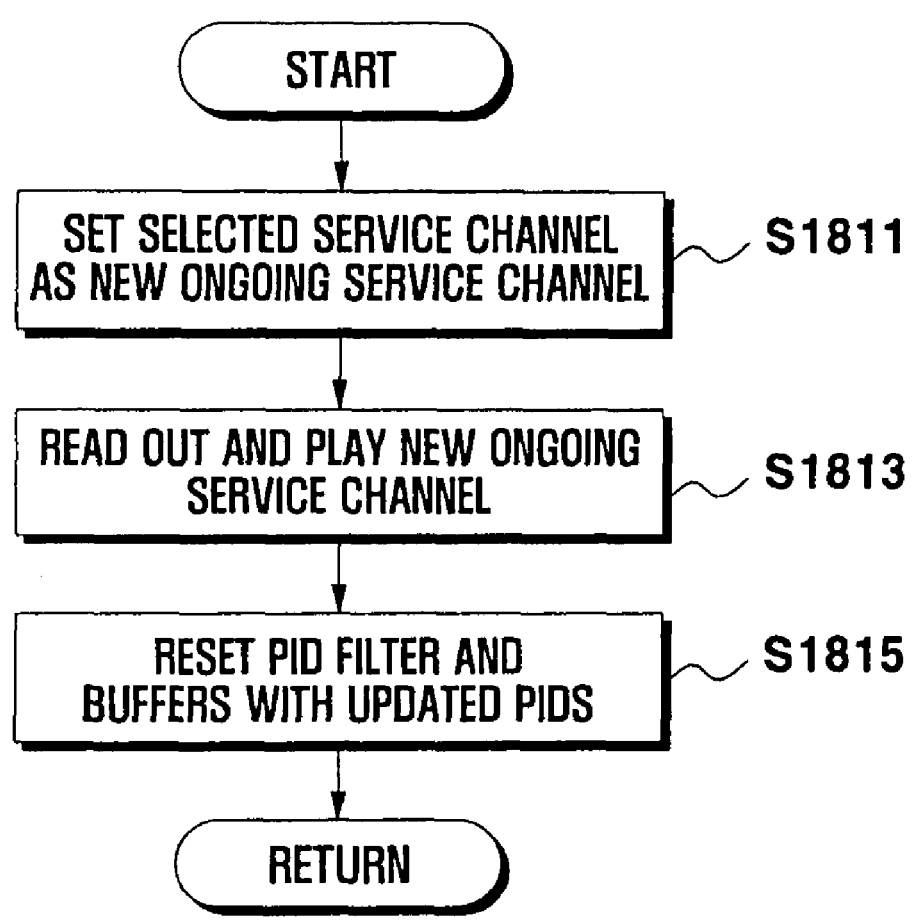
FIG. 18 is a flowchart illustrating a channel switching procedure of fast channel switching method according to another exemplary embodiment of the present invention.

FIG. 18 is a flowchart illustrating a channel switching procedure of fast channel switching method according to another exemplary embodiment of the present invention.

Referring to FIG. 18, if a channel selection command is detected, the controller 100 checks the selected service channel and registers the selected service channel as the ongoing service channel (S1811). Next, the controller 100 controls the distribution of the broadcast data buffered in the buffer assigned the PID of the new ongoing service channel that are read out to be played (S1813). That is, the controller 100 controls the second selector to read out the broadcast data buffered for the new ongoing service channel to the broadcast decoder 140 that decodes the broadcast data of the new ongoing service channel without delay of the data stream. Next, the controller 100 resets the PID filter of the broadcast demodulator 120 and the buffers of the storage unit 130 with new PIDs selected on the basis of the standby service channel configuration scheme (S1815), enters the broadcast playback mode at step S540 of FIG. 7. At this time, the controller 100 enables the buffer of the selected service channel as the ongoing service channel buffer such that the broadcast data buffered in the buffer assigned the PID of the new ongoing service channel is played until its next data burst is received. After the channel switching is completed, the controller 10 controls the broadcast receiver to enter the broadcast playback mode (S540) of FIG. 7.

Since the broadcast data buffered for the newly selected service channel is played before the next data burst of the service channel being received, no empty frame is displayed during the channel switching process, resulting in seamless channel switching.

A channel switching operation, when a channel selecting command is detected while buffering the broadcast data of the service channels, is described with reference to FIGS. 1 to 4. If a channel selecting command is detected, the controller 100 sets up the broadcast demodulator 120 with the PID of the service channel indicated by the channel selecting command as the ongoing service channel PID and controls the second selector 340 of the storage unit 130 to read out the broadcast data buffered in the buffer assigned the PID of the selected service channel to the broadcast decoder 140. Thus, the broadcast receiver can play the broadcast data of the old and new ongoing service channel without a decoding gap therebetween.

The broadcast data played during the switching process are the broadcast data buffered in the buffer assigned the PID of the newly selected service channel. Since the data burst of each service channel is received during a 1 to 4 second cycle, the buffer size is preferably determined in consideration of the data burst reception cycle. While the buffered broadcast data are played, the controller 100 updates the ongoing and standby service channels and resets the broadcast demultiplexer 120 and the storage unit 130 with the updated ongoing and standby service channels.

Concerning the example of FIG. 6A in which a time frame consists of 6 service channels CH1 to CH6 including an ongoing service channel CH3, the controller 100 controls such that the broadcast data buffered in the buffer assigned the PID of the CH3 is read out to be played. If a channel selection command indicating the service channel CH5 is detected while playing the broadcast data of the service channel CH3, the controller 100 resets the ongoing service channel PID of the broadcast demodulator 120 to the PID of the service channel CH5 (S1811). At this time, the controller 100 checks whether the CH3 is a favorite service channel. If the PID is a favorite service channel, the controller 100 controls the broadcast demodulator 120 to maintain the PID of the CH3, and otherwise, the controller 100 controls the deletion of the PID. Next, the controller 100 controls the second selector 340 of the storage unit 130 to read out the broadcast data buffered in the buffer assigned the PID of the CH5 to the broadcast decoder 140 (S1813). The broadcast decoder 140 starts decoding the broadcast of the service channel CH5 without recognition of a channel switch such that the decoded broadcast data are output through the display 150 and speaker 155 in a seamless manner.

During the channel switching process, the controller 100 updates the PIDs of the ongoing and standby service channels to be buffered. In the case of using the ascending-sequential order buffering in which the channel number increases by 1, the controller 100 sets the broadcast demodulator 120 with the PID of the service channel CH6 and controls the first selector 320 to store the broadcast data of the service channel CH6 in the buffer assigned the PID of the CH6 (S1815). In the case of using the directional-order buffering, the controller 100 checks the buffering order direction (for example, upward direction in an order of CH6, CH1, and CH2; or downward direction in an order of CH4 and CH3), and determines the next service channel CH6 or CH4 to be buffered on the basis of the buffering order direction. Next, the controller 100 sets the broadcast demodulator 120 with the PID of the CH6 or CH4 and controls the first selector 320 to store the broadcast data of the CH6 or CH4 in the buffer assigned the PID of the CH6 or CH4.

Since all the service channels are buffered in this embodiment, the PID reset process can be omitted. In this case, the buffering operation (the sequential ordered buffering or directional ordered buffering operation) is executed without PID update.

Although the fast channel switching method and apparatus of FIGS. 1 to 14 are described with regard to a DVB-H receiver, the present invention is not limited thereto. For example, the fast channel switching method and apparatus can be adopted to other digital broadcast receivers.

Figure 19:
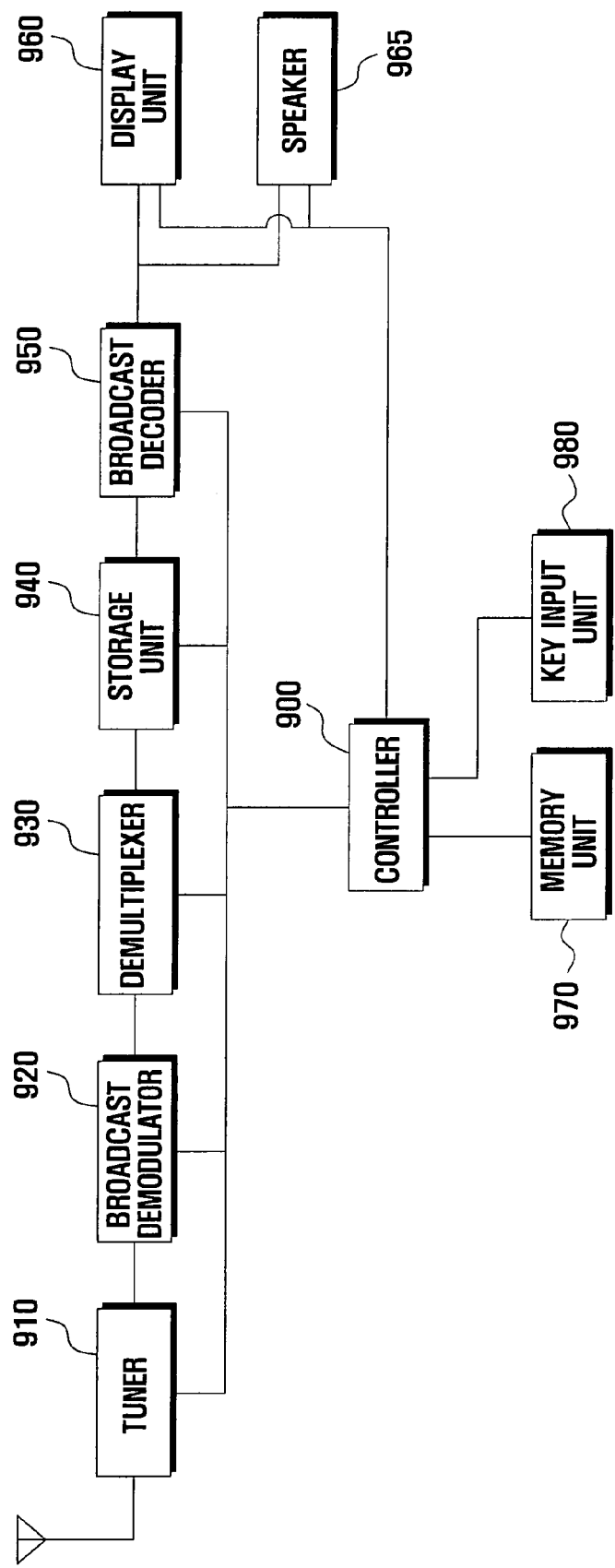
FIG. 19 is a block diagram illustrating a digital broadcast receiver including a fast channel switching apparatus and method according to an exemplary embodiment of the present invention.

FIG. 19 is a block diagram illustrating a digital broadcast receiver adopting a fast channel switching apparatus and method according to an exemplary embodiment of the present invention.

Referring to FIG. 19, the digital broadcast receiver includes a controller, 900, a tuner 910, a broadcast demodulator 920, a demultiplexer 930, a storage unit 940, a broadcast decoder 950, a display unit 960, a speaker 965, a memory unit 970, and a key input unit 980.

The controller 900 controls general operations of the digital broadcast receiver. The key input unit 980 generates key signals and transfers the key signals to the controller 900. The memory unit 970 includes a program memory for storing application programs for controlling the operation of the digital broadcast receiver and a data memory for storing application data generated while executing the application programs. Particularly, program memory of the memory unit 970 can store the application program for buffering the broadcast service channels. The controller 900 also controls the channel switching procedure according to an embodiment of the present invention. That is, the controller 900 controls playback, recording, and channel selection and switching operations of the digital broadcast receiver.

The tuner 910 sets a physical channel, i.e. the frequency, of the service channel selected by the user, and receives broadcast signals through the physical channel. The broadcast demodulator 920 demodulates the broadcast signal received through the tuner 910. The broadcast demodulator 920 demodulates the broadcast data of multiple service channels. The demultiplexer 930 performs demultiplexing on the broadcast data having a PID of a selected service channel. The storage unit 940 buffers the broadcast data output from the demultiplexer 930 under the control of the controller 900. The broadcast decoder 950 decodes the broadcast data read out from the storage unit 940. The broadcast data can be implemented with video and audio decoders such that video and audio data decoded from the broadcast data are output through the display unit 960 and the speaker 965.

As depicted in FIG. 19, the DVB-T and DMB differ from DVB-H in some technical features. Unlike the DVB-H, the DVB-T and DMB do not user IP information, and the broadcast demodulator 920 of the DVB-H or DMB receiver do not perform PID filtering. Accordingly, the demultiplexer 930 of the digital broadcast receiver in FIG. 19 should perform PID filtering, and the storage unit 940 buffers the broadcast data of the ongoing and standby service channels output from the demultiplexer 930. The DVB-T and DMB do not user the time slicing scheme and thus the digital broadcast receiver checks the ongoing and standby service channel using the service channel identifier of the broadcast data. In the case of DVB-T and DMB that do not use the time slicing scheme, the digital broadcast receiver always checks the ongoing service channel such that the standby service channels are checked whenever the ongoing service channel is updated in a predetermined time interval. In this case, the standby service channels are updated in a predetermined time interval (for example, 1 second, 2 seconds, 3 seconds, etc.).

The demultiplexer 930 selects the ongoing and standby service channels and demodulates the broadcast data per the service channel. The demultiplexing operation of the demultiplexer 930 of the DVB-T receiver is described hereinafter.

The broadcast data are received in the form of MPEG2-TS packet streams. The TS packets can be classified into a video packet and audio packet. The video and audio packets are multiplexed to be transmitted. Each packet includes a packet header and a payload containing at least one of supplementary information, a Packet Elementary Stream header (PES), and audio or video data. The TS packet has a length of 188 bytes consisting of 4-byte header and 184-byte payload. Table 1 shows parameters containing in the packet header.

TABLE 1

| Parameter | Description | Bits |
| --- | --- | --- |
| Sync byte | Synchronization byte, 0X47 | 8 |
| Transport error indicator | Error occurrence in current packet: 1 | 1 |
| Payload start indicator | Current packet starts PES: 1 | 1 |
| Transport priority | Using in decoder | 1 |
| PID | Identifier for distinguishing packet type | 13 |
| Scrambling control | Set scrambling mode | 2 |
| Adaptation field control | 01: no supplementary information/only payload<br>10: only supplementary information/no payload<br>11: supplementary information & payload<br>00: reserved | 2 |
| Continuity counter | 4 byte counter, increase by 1 for same PID | 4 |

A packet header starts a synchronization byte such that the packets can be distinguished using the synchronization byte. The demultiplexer 930 is set with the PIDs of the ongoing and standby service channels by the controller 100. Accordingly, the demultiplexer 930 checks the synchronization byte of the packet, analyzes the rest of the packet header, and processes the broadcast data of the ongoing and standby service channels. That is, the demultiplexer 930 compares the PID of the received broadcast data with the PIDs set for the ongoing and standby service channels and performs demultiplexing of the broadcast data having the PID of the ongoing or standby service channels.

If the PID of the received broadcast data is identical with one of the PIDs set in the demultiplexer 930, the controller 100 checks the adaptation field control parameter for determining whether supplementary information exists. If no supplementary information is included, i.e. the packet contains only the PES header and/or audio and video (A/V) data, the multiplexer 930 skips the supplementary information processing operation. The packet having no supplementary information carries only the PES header and A/V data in the payload.

The controller 100 sets the demultiplexer 930 with the PIDs of the ongoing and standby service channels such that the demultiplexer 930 checks the TS packets output from the demodulator 920 and performs demultiplexing on the TS packets having one of the PIDs. The demultiplexer 930 performs demultiplexing on the TS packets so as to output video and audio data.

The controller 100 controls the storage unit 940 to buffer the broadcast data of the ongoing and standby service channels. At this time, the storage unit 940 can be implemented with the configuration of FIG. 3. In this case, the controller 100 controls the first selector 320 to write the broadcast data of the ongoing and standby service channels output from the demultiplexer 930 into the corresponding buffers 331 to 33N, and controls the second selector 340 to read out the broadcast data of the service channel from the storage unit 940 to the broadcast decoder 950. The demultiplexer 930 outputs demultiplexed video and audio data for corresponding service channels. Accordingly, it is preferred to configure the storage unit 940 to buffer the video and audio data of the respective service channels into the buffers 331 to 33N separately. The second selector 340 reads out the video and audio data of the ongoing service channel to respective video and audio decoders of the broadcast decoder 950, such that the video and audio data decoded by the video and audio decoders are output through the display unit 960 and the speaker 965. That is, the storage unit 940 buffers the broadcast data of the ongoing and standby service channels and outputs only the broadcast data of the ongoing service channel, the broadcast decoder 950 decodes the broadcast data output from the storage unit 940 and outputs decoded video and audio data through the display unit 960 and the speaker 965.

The broadcast playback and channel switching operations of the above-structured digital broadcast receiver can be performed as shown in FIG. 7. The digital broadcast receiver sets standby service channels with the ongoing service channel, buffers the broadcast data of the standby service channels while playing the broadcast data of the ongoing service channel, and plays, when one of the standby service channels is selected as a switching target service channel, the buffered broadcast data of the switching target service channel without processing delay. This procedure can be performed as shown in FIGS. 8 to 14. Since the broadcast data received by the digital broadcast receiver of FIG. 19 are not IP datagrams, the IP decapsulation process is not required. Accordingly, the IP decapsulation related processes should be skipped in the broadcast playback and channel switching procedures for the digital broadcast receiver of FIG. 19.

The digital broadcast receiver includes digital broadcast reception-enabled mobile phones. Recently, mobile phones integrate a digital broadcast receiver.

Figure 20:
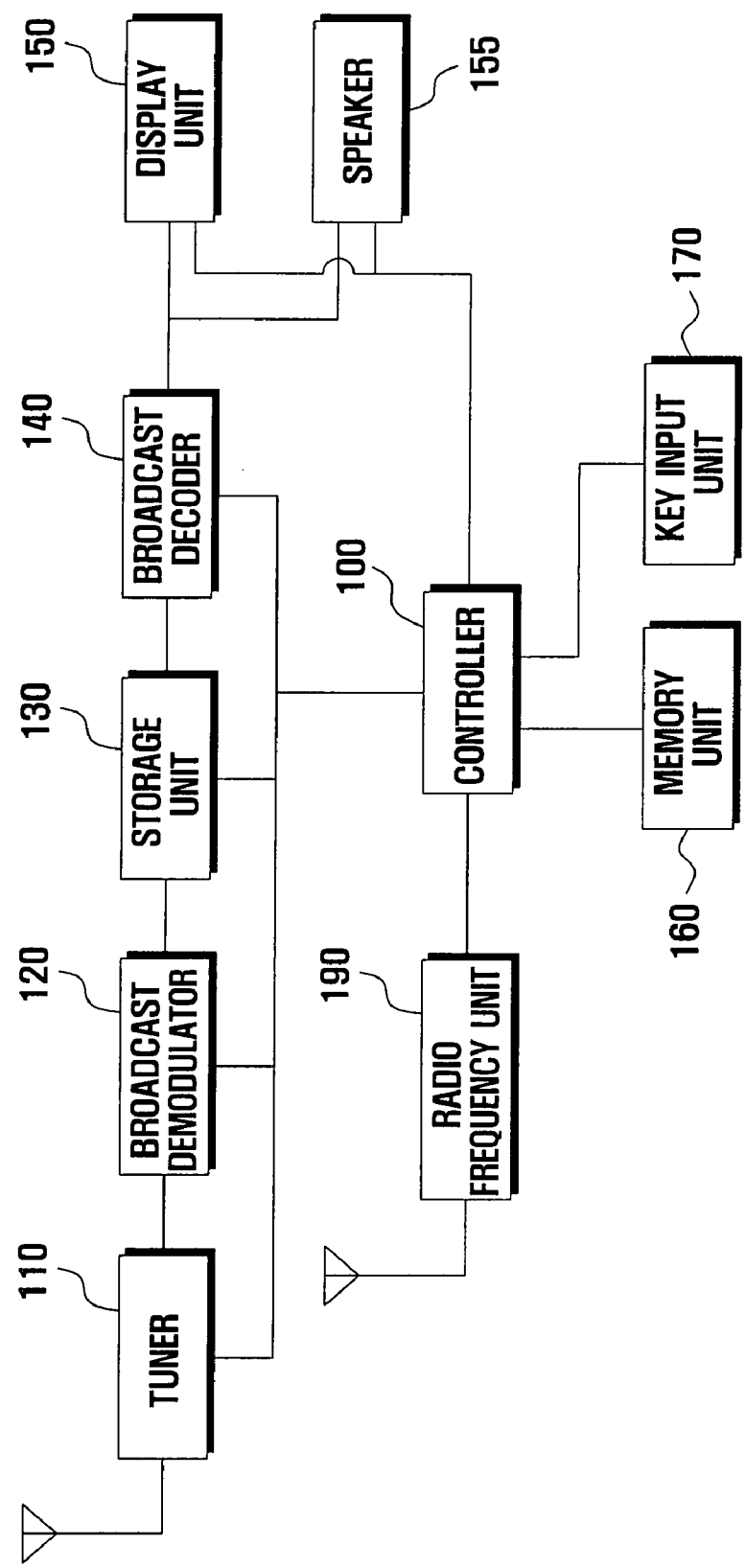
FIG. 20 is a block diagram illustrating a mobile terminal equipped with a DVB-H receiver including a fast channel switching apparatus according to another exemplary embodiment.
Figure 21:
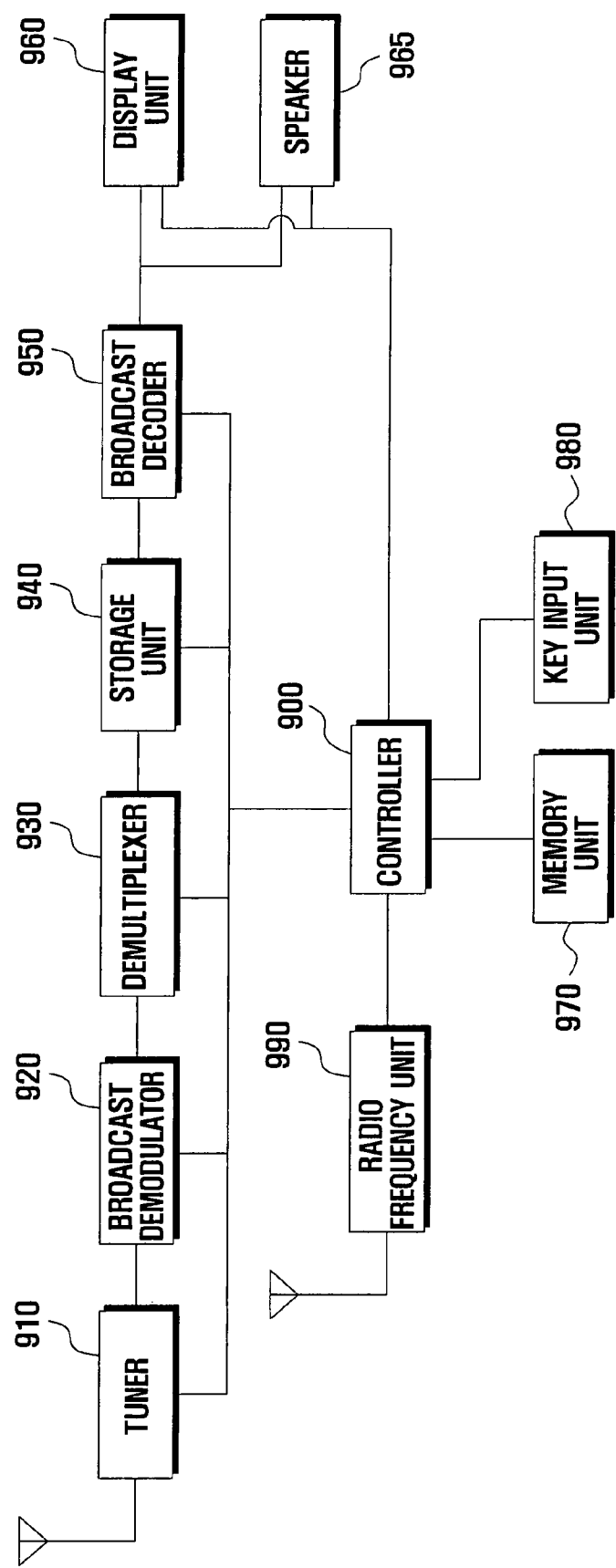
FIG. 21 is a block diagram illustrating a mobile terminal equipped with a DVB-T receiver including a fast channel switching apparatus according to another exemplary embodiment of the present invention.

FIG. 20 is a block diagram illustrating a mobile terminal equipped with a DVB-H receiver adopted a fast channel switching apparatus according to an exemplary embodiment, and FIG. 21 is a block diagram illustrating a mobile terminal equipped with a DVB-T receiver adopting a fast channel switching apparatus according to another exemplary embodiment of the present invention.

Referring to FIG. 20, the mobile phone includes a configuration of the digital broadcast receiver of which memory unit 160, key input unit 170, display unit 150, and speaker 155 are shared by communication functions of the mobile phone. The controller 100 controls digital broadcast-related operations as well as the mobile communication-related operation. A radio frequency (RF) unit 190 can be implemented with a frequency converter for up-converting the baseband signal into RF signal and down-converting the RF signal into the baseband signal. A data processing unit incorporating a modulation/demodulation module for modulating/demodulating the RF signal and a codec for perform coding/decoding functions can be integrated into the RF unit 190 or the controller 100.

The digital broadcast receiver switches off when the mobile phone operates in a communication mode. When the mobile phone operates in a broadcast reception mode, the communication function of the mobile phone is disabled and the digital broadcast receiver switches on so as to play the broadcast data received through the tuner 110.

If an incoming call is received while operating in the communication mode, the controller 100 alerts the user of the incoming call. An incoming call alert mode can be set by the user. The incoming call alert operates in a normal alert mode or a mute alert mode. In the normal alert mode, the controller 100 causes the output of an incoming alert sound (for example, melody, bell, or music) and displays caller information on the display unit 150. In the mute alert mode, the controller 100 causes a motor (not shown) to vibrate the mobile phone and display the caller information on the display unit 150. If an incoming call is received, the controller 100 displays the caller information together with an incoming call alert message. The incoming call alert message can be displayed in a blinking mode to capture the user's attention. Preferably, the incoming call alert message and the caller information are displayed on the broadcast screen as an image.

The mobile phone allows requesting an outgoing call while operating in the broadcast reception mode. Since the digital broadcast receiver supports the unidirectional communication, it is preferred to configure the RF unit 190 to transmit signals even in the broadcast reception mode. For example, while viewing a home shopping channel, the user can transmit an order signal for buying a product promoted on the home shopping channel. In this case, the mobile phone establishes a communication channel to a home shopping center and transmits the order signal to the home shopping center. With such convergence of the broadcast reception and communication functions, a user can easily order for a product in real time while viewing the home shopping channel.

In order to solve the channel switching delay problem of the conventional digital broadcast receiver, the fast channel switching method and apparatus buffers broadcast data of some standby service channels that are likely to be selected at the next channel switching while playing the broadcast of the ongoing service channel and displays, when one of the candidate services is selected, the buffered broadcast data of the selected standby service channel, resulting in seamless channel switching. In the present invention, the standby service channels can be set in accordance with a channel selection pattern. The standby service channels are set with the neighbor service channels of the ongoing service channel for a navigation key-based channel selection, and with preset favorite service channels for a number key-based channel selection, resulting in reliable fast channel switching.

Although the fast channel switching method and apparatus are implemented with a single tuner, the present invention is not limited to the single tuner equipped broadcast receiver. For example, the present invention can be adopted to the broadcast receiver having more than one tuners. In the case of multi-tuner broadcast receiver, the controller controls to buffer the broadcast data received through the multiple tuners for fast channel switching as the single-tuner broadcast receiver. The multi-tuner broadcast receiver is composed of a primary tuner for receiving an ongoing service channel and at least one secondary tuner for receiving at least one standby service channel. The ongoing service channel and standby service channels can be set by key input through the key input unit. The tuners of the fast channel switching apparatus of the broadcast receiver can be tuned for different frequency channel and operate with the favorite service channels preset for the respective tuners. That is, the digital broadcast receiver of the present invention can operate in such a manner that the tuners are tuned for the reception of favorite service channels, thereby quickly switching to another service channel in response to a channel switching command by changing the corresponding tuner. As described above, the fast channel switching method and apparatus of the present invention can perform channel switching operation without delay between broadcast streams regardless of the number of tuners. Particularly, since the predetermined channels such as favorite service channels are buffered while an ongoing playback service channel is playing, it is possible to quickly switch the ongoing service channel to another service channel by playing the buffered broadcast data of switched service channel.

Also, the fast channel switching apparatus and method of the digital broadcast receiver can be configured such that only the I frames or I and P frames of corresponding service channels are buffered. In this case, the video data of the service channels are classified into I frames containing entire video data, P frames generated with reference to the variation of the video data associated with I frame, and B frames generated with reference to the values predicted from the I frames. The fast channel switching method and apparatus of the digital broadcast receiver can be configured to store only the I frame, or I and P frames. In this case, if a channel switching command is input such that a new ongoing service channel is selected, the fast channel switching method and apparatus buffers the frames following the I frame or I and P frames and plays the frames. By buffering some parts of the broadcast data, the fast channel switching method and apparatus can reduce processing load and improve memory utilization efficiency. Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the fast channel switching method and apparatus of the present invention buffers broadcast data of predetermined standby service channels that have high probability to be selected at the next channel switching and plays, when one of the standby service channel is selected, the buffered broadcast data of the selected standby service channel without waiting for receiving the next data burst of the selected service channel, resulting in fast channel switching. Since the buffered broadcast data of the selected service channel are played until the next data burst are received, no breakage of display image stream occurs, resulting in smooth channel display switching.

What is claimed is:

1. A fast channel switching apparatus for a digital broadcast receiver, comprising:
a tuner for receiving a plurality of service channels of a frequency channel;
a broadcast demodulator for demodulating the service channels and outputting an ongoing service channel and at least one standby service channel among the service channels;
a storage unit for storing broadcast data of the ongoing and standby service channels output from the broadcast demodulator into corresponding buffers and reading out the broadcast data buffered in a buffer of the ongoing service channel;
a decoder for decoding the broadcast data read out of the storage unit into video and audio data;
a display for displaying the video data output from the decoder; and
a speaker for outputting the audio data output from the decoder,
wherein the storage unit reads out, when the ongoing service channel is switched to one of the standby service channels, the broadcast data buffered for the standby service channel,
wherein reception of a broadcast signal is turned on at burst times of both of the ongoing service channel and each of the respective standby service channels;
wherein the standby service channels comprise channels having a higher probability for selection as an ongoing service channel during a subsequent channel switching;
a channel switching controller for resetting, when the ongoing service channel is switched to another service channel, the broadcast demodulator and storage with new ongoing and standby service channels; and
wherein the channel switching controller controls, when the ongoing service channel is switched to one of the standby service channels, the storage unit to read out the buffered broadcast data of the standby service channel as a new ongoing service channel, controls the broadcast demodulator and the storage unit if the standby service channel is the upper neighbor service channel, to delete a Program Identifier (PID) of the lower neighbor service channel and add a PID of the upper neighbor service channel of the new ongoing service channel; and controls the broadcast demodulator and the storage unit, if the standby service channel is the lower neighbor service channel, to delete the PID of the upper neighbor service channel of the ongoing service channel and add the PID of the lower neighbor service channel of the new ongoing service channel.

2. The fast channel switching apparatus of claim 1, wherein the broadcast demodulator comprises:
a demodulator for demodulating the service channels; and
an identifier filter set with identifiers of the ongoing and standby service channels for filtering the demodulated broadcast data of the ongoing and candidate service channels.

3. The fast channel switching apparatus of claim 2, wherein the identifier is a program identifier (PID).

4. The fast channel switching apparatus of claim 1, wherein the storage unit comprises:
a plurality of buffers for buffering the broadcast data of the ongoing and standby service channels;
a first selector for writing the broadcast data of the ongoing and standby service channels into corresponding buffers; and a second selector for reading out the broadcast data of the ongoing service channel buffered in the corresponding buffer.

5. The fast channel switching apparatus of claim 1, wherein the standby service channels include a lower neighbor service channel and an upper neighbor service channel of the ongoing service channel in channel number.

6. The fast channel switching apparatus of claim 1, wherein the standby service channels include favorite service channels selected in consideration of a user preference.

7. The fast channel switching apparatus of claim 6, wherein the channel switching controller controls, when the ongoing service channel is switched to one of the favorite service channels, the storage to read out the buffered broadcast data of the favorite service channel as a new ongoing service channel; and controls, if the ongoing service channel is one of the favorite service channel, the broadcast demodulator and the storage unit to maintain the ongoing service channel as a favorite service channel.

8. The fast channel switching apparatus of claim 1, wherein the standby service channels include neighbor service channels of the ongoing service channel and favorite service channels selected in consideration of a user preference.

9. A fast channel switching apparatus for a digital broadcast receiver, comprising:
a tuner for receiving service channels of a frequency channel;
a broadcast demodulator for demodulating the service channels;
a demultiplexer set with identifiers of an ongoing service channel and at least one standby service channel for demultiplexing broadcast data of the ongoing and standby service channels service channels;
a storage unit for buffering the broadcast data output from the demultiplexer into buffers corresponding to the service channels and reading out the broadcast data buffered within the buffer of the ongoing service channel;
a broadcast decoder for decoding the broadcast data read out of the storage unit;
a display for displaying video data output from the decoder; and
a speaker for outputting audio data output from the decoder,
wherein the storage unit reads out, when the ongoing service channel is switched to one of the standby service channels, the broadcast data buffered for the standby service channel,
wherein reception of a broadcast signal is turned on at burst times of both of the ongoing service channel and each of the respective standby service channels;
wherein the standby service channels comprise channels having a higher probability for selection as an ongoing service channel during a subsequent channel switching;
a channel switching controller for resetting, when the ongoing service channel is switched to another service channel, the demultiplexer and storage with new ongoing and standby service channels; and
wherein the channel switching controller controls, when the ongoing service channel is switched to one of the standby service channels, the storage unit to read out the buffered broadcast data of the standby service channel as a new ongoing service channel; controls the demultiplexer and the storage unit, if the standby service channel is the upper neighbor service channel, to delete the PID of the lower neighbor service channel and add a PID of the upper neighbor service channel of the new ongoing service channel; and controls the demultiplexer and the storage unit, if the standby service channel is the lower neighbor service channel, to delete the PID of the upper neighbor service channel of the ongoing service channel and add the PID of the lower neighbor service channel of the new ongoing service channel.

10. The fast channel switching apparatus of claim 9, wherein the demultiplexer checks an identifier contained a header of a packet carrying the broadcast data of the service channel, and performs, if the identifier is one of the identifier set in the demultiplexer, demultiplexing on the broadcast data so as to output video and audio data.

11. The fast channel switching apparatus of claim 10, wherein the identifier is a program identifier (PID).

12. The fast channel switching apparatus of claim 9, wherein the storage unit comprises:
a plurality of buffers for buffering the broadcast data of the ongoing and standby service channels;
a first selector for writing the broadcast data of the ongoing and standby service channels into corresponding buffers; and
a second selector for reading out the broadcast data of the ongoing service channel buffered in the corresponding buffer.

13. The fast channel switching apparatus of claim 9, wherein the standby service channels include a lower neighbor service channel and an upper neighbor service channel of the ongoing service channel in channel number.

14. The fast channel switching apparatus of claim 9, wherein the standby service channels include favorite service channels selected in consideration of a user preference.

15. The fast channel switching apparatus of claim 14, wherein the channel switching controller controls, when the ongoing service channel is switched to one of the favorite service channels, the storage unit to read out the buffered broadcast data of the favorite service channel as a new ongoing service channel; and controls, if the ongoing service channel is one of the favorite service channel, the demultiplexer and the storage unit to maintain the ongoing service channel as a favorite service channel.

16. The fast channel switching apparatus of claim 9, wherein the standby service channels include neighbor service channels of the ongoing service channel and favorite service channels selected in consideration of a user preference.

17. A fast channel switching method for a digital broadcast receiver, comprising the steps of:
setting an ongoing service channel and at least one standby service channel;
buffering broadcast data received through the ongoing and standby service channels;
outputting the buffered broadcast data of the ongoing service channel;
determining whether the ongoing service channel is switched to one of the standby service channels;
outputting, if the ongoing service channel is switched to one of the standby service channels, the buffered broadcast data of the switched standby service channel; and
resetting the ongoing and standby service channels,
wherein reception of a broadcast signal is turned on at burst times of both of the ongoing service channel and each of the respective standby service channels;
wherein the standby service channels comprise channels having a higher probability for selection as an ongoing service channel during a subsequent channel switching;

wherein the standby service channels include an upper neighbor service channel and a lower neighbor service channel of the ongoing service channel in channel number; and wherein resetting the ongoing and standby service channels comprises the steps of:
setting the switched standby service channel as a new ongoing service channel;
deleting, if the switched service channel is the upper neighbor service channel of the previous ongoing service channel, the lower neighbor service channel of the previous ongoing service channel from the standby service channels;
deleting, if the switched service channel is the lower neighbor service channel of the previous ongoing service channel, the upper neighbor service channel of the previous ongoing service channel from the standby service channels.

18. The fast channel switching method of claim 17, wherein the step of buffering broadcast data received through the ongoing and standby service channels, comprises the steps of:
checking an identifier attached to the broadcast data;
determining whether the identifier is of the ongoing service channel or one of standby service channels; and
buffering the broadcast data associated with the identified ongoing service channel or one of the standby service channels.

19. The fast channel switching method of claim 17, wherein the standby service channels include favorite service channels selected in accordance with a user preference.

20. The fast channel switching method of claim 19, the step of resetting the ongoing and standby service channels comprises the steps of:
setting, if the ongoing service channel is switched to a non-standby service channel, the non-standby service channel as a new ongoing service channel;
stopping, if the previous ongoing service channel is not one of the favorite service channels, buffering the broadcast data of the previous ongoing service channel; and
maintaining, if the previous ongoing service channel is one of the favorite service channels, buffering the broadcast data of the previous ongoing service channel as one of the standby service channels.

21. The fast channel switching method of claim 20, wherein the step of buffering broadcast data received through the ongoing and standby service channels, comprises the steps of:
checking an identifier attached to the broadcast data;
determining whether the identifier is of the ongoing service channel or one of standby service channels; and
buffering, if the identifier is of the ongoing service channel or one of the standby service channels, the broadcast data.

22. The fast channel switching method of claim 17, wherein the standby service channels include neighbor service channels of the ongoing service channel and favorite service channels selected in consideration of a user preference.

23. The fast channel switching method of claim 22, wherein the step of resetting the ongoing and standby service channels comprises the step of:
setting the switched standby service channel as a new ongoing service channel;
determining, if the switched service channel is a neighbor service channel of the previous ongoing service channel, whether the switched service channel is the lower or upper neighbor service channel;
deleting, if the switched service channel is the upper neighbor service channel of the previous ongoing service channel, the lower neighbor service channel of the previous ongoing service channel from the standby service channels;
deleting, if the switched service channel is the lower neighbor service channel of the previous ongoing service channel, the upper neighbor service channel of the previous ongoing service channel from the standby service channels;
determining, if the switched service channel is not a neighbor service channel of the previous ongoing service channel, whether the switched service channel is one of the favorite service channels;
determining, if the switched service channel is one of the favorite service channels, whether the previous ongoing service channel is one of the favorite service channels;
stopping, if the previous ongoing service channel is not one of the favorite service channels, buffering the broadcast data of the previous ongoing service channel; and
maintaining, if the previous ongoing service channel is one of the favorite service channels, buffering the broadcast data of the previous ongoing channel as one of the standby service channels,
wherein reception of a broadcast signal is turned on at burst times of both of the ongoing service channel and each of the respective standby service channels.

24. The fast channel switching method of claim 22, wherein the step of resetting the ongoing and standby service channels comprises the step of:
setting the switched standby service channel as a new ongoing service channel;
determining, if the switched service channel is a neighbor service channel of the previous ongoing service channel, whether the switched service channel is the lower or upper neighbor service channel;
determining, if the switched service channel is the upper neighbor service channel, whether the lower neighbor service channel of the previous ongoing service channel is one of the favorite service channels;
stopping, if the lower neighbor service channel of the previous ongoing service channel is not one of the favorite service channels, buffering the broadcast data of the lower neighbor service channel;
determining whether the upper neighbor service channel of the switched service channel is one of the favorite service channel;
setting, if the upper neighbor service channel of the switched service channel is not one of the favorite service channel, the upper neighbor service channel as a standby service channel;
determining, if the lower neighbor service channel is the lower neighbor service channel, whether the upper neighbor service channel of the previous ongoing service channel is one of the favorite service channels;
stopping, if the upper neighbor service channel of the previous ongoing service channel is not one of the favorite service channels, buffering the broadcast data of the upper neighbor service channel;
determining whether the lower neighbor service channel of the switched service channel is one of the favorite service channel;

setting, if the lower neighbor service channel of the switched service channel is not one of the favorite service channel, the lower neighbor service channel as a standby service channel;

determining, if the switched service channel is not a neighbor service channel of the previous ongoing service channel, whether the previous ongoing service channel is one of the favorite service channels;

stopping, if the previous ongoing service channel is not one of the favorite service channels, buffering the broadcast data of the previous ongoing service channel; and maintaining, if the previous ongoing service channel is one of the favorite service channels, buffering the broadcast data of the previous ongoing service channels as the favorite service channel.

25. A fast channel switching apparatus of a broadcast receiver, comprising:

a tuner for receiving service channels of a frequency channel;

a broadcast demodulator for demodulating the service channels and outputting an ongoing service channel and at least one standby service channel identified by preset identifiers;

a storage unit for storing broadcast data of the ongoing and standby service channels output from the broadcast demodulator in corresponding buffers and reading out the broadcast data if the buffer set with the identifier of the ongoing service channel;

a broadcast decoder for decoding the broadcast data read out from the storage unit;

a display for displaying the video data output from the decoder; and a speaker for outputting the audio data output from the decoder, wherein the fast channel apparatus sets, if a channel switching command indicating a service channel is detected, the service channel as a new ongoing service channel and playing the broadcast data buffered in the buffer assigned the identifier of the new ongoing service channel, wherein reception of a broadcast signal is turned on at burst times of both of the ongoing service channel and each of the respective standby service channels;

wherein the standby service channels comprise channels having a higher probability for selection as an ongoing service channel during a subsequent channel switching;

a channel switching controller for controlling, when the channel switching command is detected, the storage unit to read out the broadcast data of the ongoing service channel, updating the identifiers of the ongoing and standby service channels set in the broadcast demodulator and the storage unit, and playing the broadcast data of a new ongoing service channel and buffering broadcast data of the standby service channel on the basis of the updated identifiers.

26. A fast channel switching apparatus of a broadcast receiver, comprising:

a tuner for receiving service channels of a frequency channel;

a broadcast demodulator for demodulating the service channels;

a demultiplexer for set up with identifiers of an ongoing service channel and at least one standby service channel for demultiplexing broadcast data received with the identifiers;

a storage unit for buffering the broadcast data output from the demultiplexer in buffers set with corresponding identifiers and reading out the broadcast data buffered in the buffer assigned the identifier of the ongoing service channel;

a broadcast decoder for decoding the broadcast data read out from the storage unit;

a display for displaying video data output from the decoder; and a speaker for outputting audio data output from the decoder, wherein the storage unit reads out, when a channel switching command is detected, the broadcast data buffered in the buffer assigned the identifier of switched service channel;

wherein reception of a broadcast signal is turned on at burst times of both of the ongoing service channel and each of the respective standby service channels;

wherein the standby service channels comprise channels having a higher probability for selection as an ongoing service channel during a subsequent channel switching;

a channel switching controller for controlling, when the channel switching command is detected, the storage unit to read out the broadcast data of the ongoing service channel, updating the identifiers of the ongoing and standby service channels set in the demultiplexer, resetting the buffers of the storage unit, playing the broadcast data of a new ongoing service channel and buffering broadcast data of the standby service channels on the basis of the updated identifiers.

27. A fast channel switching method for a broadcast receiver, comprising:

checking service channels received through a frequency channel on the basis of identifiers attached to the service channels;

buffering ongoing and standby service channels, of which identifiers are set as ongoing and standby service channel identifiers, in corresponding buffers, respectively;

playing the ongoing service channel;

switching, if a channel switching command is detected, the ongoing service channel to the a new ongoing service channel indicated by the channel switching command;

playing the new ongoing service channel buffered in the corresponding buffer; and updating the ongoing and standby service channel identifiers, wherein reception of a broadcast signal is turned on at burst times of both of the ongoing service channel and each of the respective standby service channels;

wherein the standby service channels comprise channels having a higher probability for selection as an ongoing service channel during a subsequent channel switching;

controlling by the channel switching controllers, when the ongoing service channel is switched to one of the standby service channels, the storage unit to read out the buffered broadcast data of the standby service channel as a new ongoing service channel; controlling the demultiplexer and the storage unit, if the standby service channel is the upper neighbor service channel, to delete the PID of the lower neighbor service channel and add a PID of the upper neighbor service channel of the new ongoing service channel; and controls the demultiplexer and the storage unit, if the standby service channel is the lower neighbor service channel, to delete the PID of the upper neighbor service channel of the ongoing service channel and add the PID of the lower neighbor service channel of the new ongoing service channel.

* * * * *

UNITED STATES PATENT AND TRADEMARK OFFICE
CERTIFICATE OF CORRECTION

PATENT NO. : 8,326,291 B2  
APPLICATION NO. : 11/811430  
DATED : December 4, 2012  
INVENTOR(S) : Jeong-Wook Seo et al.

Page 1 of 1

It is certified that error appears in the above-identified patent and that said Letters Patent is hereby corrected as shown below:

In the Claims

Column 43, Claim 9, Line 33 should read as follows:  
--...standby service channels;...--

Signed and Sealed this  
Seventh Day of May, 2013

Teresa Stanek Rea  
*Acting Director of the United States Patent and Trademark Office*